United States Patent
Gan

(10) Patent No.: US 12,284,521 B2
(45) Date of Patent: Apr. 22, 2025

(54) IoT DEVICE AND IoT DEVICE AUTHORIZATION METHOD

(71) Applicant: Huawei Technologies Co., Ltd., Shenzhen (CN)

(72) Inventor: Lu Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 232 days.

(21) Appl. No.: 18/043,463

(22) PCT Filed: Jul. 26, 2021

(86) PCT No.: PCT/CN2021/108486
§ 371 (c)(1),
(2) Date: Feb. 28, 2023

(87) PCT Pub. No.: WO2022/042170
PCT Pub. Date: Mar. 3, 2022

(65) Prior Publication Data
US 2023/0336994 A1    Oct. 19, 2023

(30) Foreign Application Priority Data
Aug. 31, 2020   (CN) .......................... 202010901711.1

(51) Int. Cl.
*H04W 12/08*     (2021.01)
*H04W 12/0431*   (2021.01)
*H04W 12/40*     (2021.01)

(52) U.S. Cl.
CPC ....... *H04W 12/08* (2013.01); *H04W 12/0431* (2021.01); *H04W 12/40* (2021.01)

(58) Field of Classification Search
CPC . H04W 12/08; H04W 12/0431; H04W 12/40; H04W 4/80; H04W 48/16; H04L 12/2803; H04L 12/2809; H04L 12/2807; H01Q 3/26; H04B 7/043
See application file for complete search history.

(56) References Cited

U.S. PATENT DOCUMENTS

| | | | |
|---|---|---|---|
| 2014/0049365 A1* | 2/2014 | Ahearn | G07C 9/00309 340/5.51 |
| 2018/0054854 A1* | 2/2018 | Liu | H04W 12/06 |
| 2020/0169460 A1* | 5/2020 | Bartlett | H04W 12/50 |

* cited by examiner

*Primary Examiner* — Paul E Callahan
(74) *Attorney, Agent, or Firm* — Conley Rose, P.C.

(57) ABSTRACT

An Internet of Things (IoT) device authorization method includes an IoT device that wirelessly communicates with a first electronic device and a second electronic device. The IoT device includes a processor, a memory, a first antenna, and a second antenna. A transmit distance of the second antenna is less than a transmit distance of the first antenna. When instructions stored in the memory are executed by the processor, the IoT device is configured to receive a first message indicating to add a shared control device for the IoT device; send, through the second antenna, a second message including device information of the IoT device; receive, in response to the second message, a third message including device information of the second electronic device; and send, through the first antenna, a fourth message including the device information of the second electronic device to the first electronic device.

20 Claims, 33 Drawing Sheets

CONT.
FROM
FIG. 6B

China Mobile 08:08

607

CONT.
FROM
FIG. 6C

Adding a shared control device for the smart speaker...

608

Home | Vmall | Smart | Me

FIG. 6D

| CONT. FROM FIG. 10C-2 | CONT. FROM FIG. 10C-2 | CONT. FROM FIG. 10C-2 | CONT. FROM FIG. 10C-2 |

S1016": Send the sixth message including the temporary control duration and/or the quantity of temporary control times and the control key S1017": Receive the sixth message, to obtain the control key and the temporary control duration and/or the quantity of temporary control times S1018": Receive the sixth message, to obtain the control key and the temporary control duration and/ or the quantity of temporary control times S1019": Determine whether the temporary control duration and/or the quantity of temporary control times are/is reached Yes S1020": Delete the control key S1021": Send a control message encrypted by using the control key S1022": Receive the control message S1023": Send a response message indicating that the control key expires S1024": Receive the response message, and delete the control key

FIG. 10C-3

IoT DEVICE AND IoT DEVICE AUTHORIZATION METHOD

CROSS-REFERENCE TO RELATED APPLICATIONS

This is a U.S. National Stage of International Patent Application No. PCT/CN2021/108486 filed on Jul. 26, 2021, which claims priority to Chinese Patent Application No. 202010901711.1 filed on Aug. 31, 2020. Both of the aforementioned applications are hereby incorporated by reference in their entireties.

This application claims priority to Chinese Patent Application No. 202010901711.1, filed with the China National Intellectual Property Administration on Aug. 31, 2020 and entitled "IoT DEVICE AND IoT DEVICE AUTHORIZATION METHOD", which is incorporated herein by reference in its entirety.

TECHNICAL FIELD

This application relates to the field of the Internet of things (Internet of things, IoT), and in particular, to an IoT device and an IoT device authorization method.

BACKGROUND

Each IoT device in a network having a plurality of IoT devices, for example, a home network or an office network, may correspond to one bound account, and an electronic device logging in to the bound account can control the IoT device. If an electronic device logging in to another account is intended to control the IoT device, authorization needs to be first obtained from the electronic device logging in to the bound account. In the foregoing authorization, how to ensure security and further provide convenience becomes a requirement.

SUMMARY

To resolve the foregoing technical problem, this application provides an IoT device and an IoT device authorization method, to ensure security, further provide convenience, and simplify a user operation.

According to a first aspect, an IoT device is provided. The IoT device wirelessly communicates with a first electronic device and a second electronic device. The first electronic device is a control device of the IoT device, and the second electronic device is different from the first electronic device. The IoT device includes: one or more processors; one or more memories; one first antenna; one second antenna, where a transmit distance of the second antenna is less than or equal to a preset secure transmit distance; the first antenna and the second antenna are different antennas, and the transmit distance for transmitting a wireless signal through the second antenna is less than a transmit distance for transmitting a wireless signal through the first antenna; or the first antenna and the second antenna are a same antenna, and a transmit power configured for the second antenna is less than a transmit power configured for the first antenna; and one or more computer programs, where the one or more computer programs are stored in the one or more memories, and when the computer programs are executed by the one or more processors, the IoT device performs the following steps: receiving a first message of the first electronic device, where the first message is used to indicate to add a shared control device for the IoT device; switching, by the IoT device, to the second antenna in response to the first message, and sending a second message through the second antenna, where the second message includes device information of the IoT device; receiving a third message sent by the second electronic device, where the third message includes device information of the second electronic device; and switching to the first antenna in response to the third message, and sending a fourth message to the first electronic device through the first antenna, where the fourth message includes the device information of the second electronic device, and permission of the control device on the IoT device is higher than permission of the shared control device on the IoT device. In this way, a user operation is simplified and a user is more convenient. In addition, in this embodiment of this application, a secure distance of very-short-distance wireless communication is used, to physically ensure security of communication between the IoT device and the second electronic device.

According to the first aspect, the device information of the IoT device includes a transmission parameter, and the transmission parameter includes at least one of a connection protocol and a session identifier. In this way, the device information of the IoT device is further specifically refined.

According to the first aspect, the IoT device further performs the following step: after the sending a fourth message to the first electronic device through the first antenna, receiving an addition success message. The addition success message is used to indicate that the second electronic device is added as the shared control device of the IoT device. In this way, the IoT device can perform further display or processing based on the addition success message. For example, a text of the addition success message is displayed, and/or a voice of the addition success message is played, to provide a prompt.

According to any one of the first aspect or the foregoing implementations of the first aspect, the first message further includes temporary control duration or a quantity of temporary control times for which the second electronic device controls the IoT device. After the sending a fourth message to the first electronic device through the first antenna, a message is received. The message includes at least one of a key corresponding to the second electronic device and an identity credential of the second electronic device. The key corresponding to the second electronic device and the identity credential of the second electronic device are used to control the IoT device by the second electronic device. After the temporary control duration or the quantity of temporary control times is reached, the IoT device deletes at least one of the key corresponding to the second electronic device and the identity credential of the second electronic device. In this way, temporary control permission and a determining process are provided, and the solution is refined.

According to any one of the first aspect or the foregoing implementations of the first aspect, the IoT device further performs the following steps: after the sending a fourth message to the first electronic device through the first antenna, receiving a message, where the message includes a randomly generated control key; and in response to the message including a randomly generated control key, obtaining the control key, where a key corresponding to the second electronic device includes the control key. In this way, a specific manner of using the control key is provided for subsequent use.

According to any one of the first aspect or the foregoing implementations of the first aspect, the IoT device further performs the following steps: receiving a message including a first random number; in response to the message including a first random number, randomly generating a second random number; generating a communication key based on the first random number, the second random number, and the control key, and sending a message including the second random number to the second electronic device; receiving a control message of the second electronic device; and decrypting, in response to the control message, the control message based on the communication key, to obtain a control instruction, and executing the control instruction, where the key corresponding to the second electronic device includes the communication key. In this way, a specific communication mode between the second electronic device and the IoT device is provided. The communication mode is more secure, and only simple input of the user is needed, which is more convenient.

According to any one of the first aspect or the foregoing implementations of the first aspect, the IoT device further performs the following step: After receiving the addition success message, the IoT device obtains at least one of a key corresponding to the second electronic device and an identity credential of the second electronic device. The key corresponding to the second electronic device and the identity credential of the second electronic device are used to control the IoT device by the second electronic device. In this way, a specific manner is provided for subsequent identity authentication.

According to any one of the first aspect or the foregoing implementations of the first aspect, the IoT device further performs the following steps: receiving a cancellation message of the first electronic device, where the cancellation message is used to indicate to cancel authorization for the second electronic device. In response to the cancellation message, the IoT device deletes at least one of the key corresponding to the second electronic device and the identity credential of the second electronic device. In this way, an authorization cancellation manner is provided, so that the first electronic device can cancel authorization for the second electronic device, to facilitate authorization control of the first electronic device on the second electronic device.

According to any one of the first aspect or the foregoing implementations of the first aspect, the second message further includes a session key, and the session key is randomly generated by the IoT device. The third message is a response message of the second electronic device for the second message. The key corresponding to the second electronic device includes at least one of the session key, the control key, and the communication key. The receiving a first message of the first electronic device includes: receiving the first message of the first electronic device by using one or more servers. The sending a fourth message to the first electronic device through the first antenna includes: sending the fourth message to the first electronic device by using one or more servers through the first antenna. In this way, a communication mode between the first electronic device and the IoT device is refined.

According to a second aspect, an IoT device is provided. The IoT device wirelessly communicates with a first electronic device and a second electronic device. The first electronic device is a control device of the IoT device, and the second electronic device is different from the first electronic device. The IoT device includes: one or more processors; one or more memories; one first antenna; one second antenna, where a transmit distance of the second antenna is less than or equal to a preset secure transmit distance; the first antenna and the second antenna are different antennas, and the transmit distance for transmitting a wireless signal through the second antenna is less than a transmit distance for transmitting a wireless signal through the first antenna; or the first antenna and the second antenna are a same antenna and a transmit power configured for the second antenna is less than a transmit power configured for the first antenna and one or more computer programs, where the one or more computer programs are stored in the one or more memories, and when the computer programs are executed by the one or more processors, the IoT device performs the following steps: receiving a first message of the first electronic device, where the first message is used to indicate to add a shared control device for the IoT device; switching, by the IoT device, to the second antenna in response to the first message, and sending a second message through the second antenna, where the second message includes device information of the IoT device; receiving a third message sent by the second electronic device, where the third message includes device information of the second electronic device; and adding the device information of the second electronic device to device information of the shared control device of the IoT device in response to the third message, and switching to the first antenna, where permission of the control device on the IoT device is higher than permission of the shared control device on the IoT device. In this way, the IoT device can locally store the shared control device of the IoT device, and does not need to store the shared control device of the IoT device in the server, to simplify a communication procedure and facilitate execution. This ensures security, simplifies a user operation, and further facilitates a user.

According to the second aspect, the IoT device further performs the following steps: The first message further includes temporary control duration or a quantity of temporary control times for which the second electronic device controls the IoT device. After the temporary control duration or the quantity of temporary control times is reached, the IoT device sends an addition failure message to at least one of the second electronic device and the first electronic device. In this way, temporary control permission and a determining process that are localized to the IoT device are provided, and the solution is refined.

According to any one of the second aspect or the foregoing implementations of the second aspect, the receiving a first message of the first electronic device includes: receiving the first message of the first electronic device by using one or more servers. That the IoT device sends an addition failure message to the first electronic device includes: The IoT device sends the addition failure message to the first electronic device by using the one or more servers. In this way, a communication mode between the first electronic device and the IoT device is refined.

According to a third aspect, an IoT device authorization method is provided. The method is applied to an IoT device. The IoT device wirelessly communicates with a first electronic device and a second electronic device. The first electronic device is a control device of the IoT device, and the second electronic device is different from the first electronic device. The IoT device includes one first antenna and one second antenna. A transmit distance of the second antenna is less than or equal to a preset secure transmit distance. The first antenna and the second antenna are different antennas, and the transmit distance for transmitting a wireless signal through the second antenna is less than a transmit distance for transmitting a wireless signal through the first antenna. Alternatively, the first antenna and the second antenna are a same antenna, and a transmit power configured for the second antenna is less than a transmit power configured for the first antenna. The method includes:

The IoT device receives a first message of the first electronic device. The first message is used to indicate to add a shared control device for the IoT device. The IoT device switches to the second antenna in response to the first message, and sends a second message through the second antenna. The second message includes device information of the IoT device. The IoT device receives a third message sent by the second electronic device. The third message includes device information of the second electronic device. The IoT device switches to the first antenna in response to the third message, and sends a fourth message to the first electronic device through the first antenna. The fourth message includes the device information of the second electronic device. Permission of the control device on the IoT device is higher than permission of the shared control device on the IoT device.

According to the third aspect, the device information of the IoT device includes a transmission parameter, and the transmission parameter includes at least one of a connection protocol and a session identifier.

According to the third aspect, the method further includes: After sending the fourth message to the first electronic device through the first antenna, the IoT device receives an addition success message. The addition success message is used to indicate that the second electronic device is added as the shared control device of the IoT device.

According to any one of the third aspect or the foregoing implementations of the third aspect, the first message further includes temporary control duration or a quantity of temporary control times for which the second electronic device controls the IoT device. After sending the fourth message to the first electronic device through the first antenna, the IoT device receives a message. The message includes at least one of a key corresponding to the second electronic device and an identity credential of the second electronic device. The key corresponding to the second electronic device and the identity credential are used to control the IoT device by the second electronic device. After the temporary control duration or the quantity of temporary control times is reached, the IoT device deletes at least one of the key corresponding to the second electronic device and the identity credential of the second electronic device.

According to any one of the third aspect or the foregoing implementations of the third aspect, the method further includes: After sending the fourth message to the first electronic device through the first antenna, the IoT device receives a message. The message includes a randomly generated control key. In response to the message including a randomly generated control key, the IoT device obtains the control key. A key corresponding to the second electronic device includes the control key.

According to any one of the third aspect or the foregoing implementations of the third aspect, the method further includes: The IoT device receives a message including a first random number. In response to the message including a first random number, the IoT device randomly generates a second random number. The IoT device generates a communication key based on the first random number, the second random number, and the control key, and sends a message including the second random number to the second electronic device. The IoT device receives a control message of the second electronic device. In response to the control message, the IoT device decrypts the control message based on the communication key, to obtain a control instruction, and executes the control instruction. The key corresponding to the second electronic device includes the communication key.

According to any one of the third aspect or the foregoing implementations of the third aspect, the method further includes: After receiving the addition success message, the IoT device obtains at least one of a key corresponding to the second electronic device and an identity credential of the second electronic device. The key corresponding to the second electronic device and the identity credential of the second electronic device are used to control the IoT device by the second electronic device.

According to any one of the third aspect or the foregoing implementations of the third aspect, the method further includes: The IoT device receives a cancellation message of the first electronic device. The cancellation message is used to indicate to cancel authorization for the second electronic device. In response to the cancellation message, the IoT device deletes at least one of the key corresponding to the second electronic device and the identity credential of the second electronic device.

According to any one of the third aspect or the foregoing implementations of the third aspect, the second message further includes a session key, and the session key is randomly generated by the IoT device. The third message is a response message of the second electronic device for the second message. The key corresponding to the second electronic device includes at least one of the session key, the control key, and the communication key. That the IoT device receives a first message of the first electronic device includes: The IoT device receives the first message of the first electronic device by using one or more servers. That the IoT device sends a fourth message to the first electronic device through the first antenna includes: The IoT device sends the fourth message to the first electronic device by using one or more servers through the first antenna.

Any one of the third aspect or the implementations of the third aspect corresponds to any one of the first aspect or the implementations of the first aspect. For technical effects corresponding to any one of the third aspect or the implementations of the third aspect, refer to technical effects corresponding to any one of the first aspect or the implementations of the first aspect. Details are not described herein again.

According to a fourth aspect, an IoT device authorization method is provided. The method is applied to an IoT device. The IoT device wirelessly communicates with a first electronic device and a second electronic device. The first electronic device is a control device of the IoT device, and the second electronic device is different from the first electronic device. The IoT device includes one first antenna and one second antenna. A transmit distance of the second antenna is less than or equal to a preset secure transmit distance. The first antenna and the second antenna are different antennas, and the transmit distance for transmitting a wireless signal through the second antenna is less than a transmit distance for transmitting a wireless signal through the first antenna. Alternatively, the first antenna and the second antenna are a same antenna, and a transmit power configured for the second antenna is less than a transmit power configured for the first antenna. The method includes: The IoT device receives a first message of the first electronic device. The first message is used to indicate to add a shared control device for the IoT device. The IoT device switches to the second antenna in response to the first message, and sends a second message through the second antenna. The second message includes device information of the IoT device, The IoT device receives a third message sent by the second electronic device. The third message includes device information of the second electronic device. The IoT device adds the device information of the second electronic device to device information of the shared control device of the IoT device in response to the third message, and switches to the first antenna. Permission of the control device on the IoT device is higher than permission of the shared control device on the IoT device.

According to the fourth aspect, the method further includes: The first message further includes temporary control duration or a quantity of temporary control times for which the second electronic device controls the IoT device. After the temporary control duration or the quantity of temporary control times is reached, the IoT device sends an addition failure message to at least one of the second electronic device and the first electronic device.

According to any one of the fourth aspect or the foregoing implementations of the fourth aspect, that the IoT device receives a first message of the first electronic device includes: The IoT device receives the first message of the first electronic device by using one or more servers. That the IoT device sends an addition failure message to the first electronic device includes: The IoT device sends the addition failure message to the first electronic device by using the one or more servers.

Any one of the fourth aspect or the implementations of the fourth aspect corresponds to any one of the second aspect or the implementations of the second aspect. For technical effects corresponding to any one of the fourth aspect or the implementations of the fourth aspect, refer to technical effects corresponding to any one of the second aspect or the implementations of the second aspect. Details are not described herein again.

According to fifth aspect, a server is provided. The server wirelessly communicates with one first electronic device, one or more second electronic devices, and one or more IoT devices. The first electronic device is a control device of the IoT device, and the second electronic device is different from the first electronic device. The server includes one or more processors, one or more memories, and one or more computer programs. The one or more computer programs are stored in the one or more memories. When the computer programs are executed by the one or more processors, the server is enabled to perform the following steps: receiving a first message of the first electronic device, where the first message is used to indicate to add a shared control device for the IoT device; sending, by the server, the first message to the IoT device in response to the first message; receiving a fourth message of the IoT device, where the fourth message includes device information of the second electronic device; sending, by the server, the fourth message to the first electronic device in response to the fourth message; receiving a fifth message of the first electronic device, where the fifth message includes the device information of the second electronic device; and registering, by the server, the device information of the second electronic device in device information of the shared control device of the IoT device in response to the fifth message, where permission of the control device on the IoT device is higher than permission of the shared control device on the IoT device. In this way, a process is improved from the perspective of the server, so that a user operation is simplified and a user is more convenient. In addition, in this embodiment of this application, a secure distance of very-short-distance wireless communication of the IoT device is used, to physically ensure security of communication between the IoT device and the second electronic device.

According to the fifth aspect, the server sends an addition success message to at least one of the IoT device and the second electronic device. The addition success message is used to indicate that the second electronic device is added as the shared control device of the IoT device. In this way, the IoT device can perform further display or processing based on the addition success message. For example, a text of the addition success message is displayed, and/or a voice of the addition success message is played, to provide a prompt.

According to any one of the fifth aspect or the foregoing implementations of the fifth aspect, the server further performs the following steps: receiving a cancellation message of the first electronic device. The cancellation message is used to indicate to cancel authorization for the second electronic device. In response to the cancellation message, the server deletes the device information of the second electronic device from the device information of the shared control device of the IoT device. In this way, an authorization cancellation process is specifically executed on the server, so that the first electronic device can cancel authorization for the second electronic device, to facilitate authorization control of the first electronic device on the second electronic device.

According to any one of the fifth aspect or the foregoing implementations of the fifth aspect, the server further performs the following steps: receiving a cancellation message of the first electronic device. The cancellation message is used to indicate to cancel authorization for the second electronic device. The server sends the cancellation message to the IoT device in response to the cancellation message. In this way, another cancellation manner is provided. In this case, the server is configured to forward the cancellation message to the IoT device. Specifically, the IoT device performs a related cancellation process, so that the first electronic device can cancel authorization for the second electronic device, to facilitate authorization control of the first electronic device on the second electronic device.

According to any one of the fifth aspect or the foregoing implementations of the fifth aspect, the first message further includes temporary control duration or a quantity of temporary control times for which the second electronic device controls the IoT device. After the temporary control duration or the quantity of temporary control times is reached, the server deletes the device information of the second electronic device from the device information of the shared control device of the IoT device. In this way, temporary control permission and a determining process are provided, and the solution is refined and specifically executed on the server. In this case, the IoT device does not need to store or delete the device information of the shared control device of the IoT device.

According to a sixth aspect, an IoT device authorization method is provided. The method is applied to a server. The server wirelessly communicates with one first electronic device, one or more second electronic devices, and one or more IoT devices. The first electronic device is a control device of the IoT device, and the second electronic device is different from the first electronic device. The method includes: The server receives a first message of the first electronic device. The first message is used to indicate to add a shared control device for the IoT device. The server sends the first message to the IoT device in response to the first message. The server receives a fourth message of the IoT device. The fourth message includes device information of the second electronic device. The server sends the fourth message to the first electronic device in response to the fourth message. The server receives a fifth message of the first electronic device. The fifth message includes the device information of the second electronic device. The server registers the device information of the second electronic device in device information of the shared control device of the IoT device in response to the fifth message. Permission of the control device on the IoT device is higher than permission of the shared control device on the IoT device.

According to the sixth aspect, the server sends an addition success message to at least one of the IoT device and the second electronic device. The addition success message is used to indicate that the second electronic device is added as the shared control device of the IoT device.

According to any one of the sixth aspect or the foregoing implementations of the sixth aspect, the method further includes: The server receives a cancellation message of the first electronic device. The cancellation message is used to indicate to cancel authorization for the second electronic device. In response to the cancellation message, the server deletes the device information of the second electronic device from the device information of the shared control device of the IoT device.

According to any one of the sixth aspect or the foregoing implementations of the sixth aspect, the method further includes: The server receives a cancellation message of the first electronic device. The cancellation message is used to indicate to cancel authorization for the second electronic device. The server sends the cancellation message to the IoT device in response to the cancellation message.

According to any one of the sixth aspect or the foregoing implementations of the sixth aspect, the first message further includes temporary control duration or a quantity of temporary control times for which the second electronic device controls the IoT device. After the temporary control duration or the quantity of temporary control times is reached, the server deletes the device information of the second electronic device from the device information of the shared control device of the IoT device.

Any one of the sixth aspect or the implementations of the sixth aspect corresponds to any one of the fifth aspect or the implementations of the fifth aspect. For technical effects corresponding to any one of the sixth aspect or the implementations of the sixth aspect, refer to technical effects corresponding to any one of the fifth aspect or the implementations of the fifth aspect. Details are not described herein again.

According to a seventh aspect, a computer-readable storage medium is provided. The computer-readable storage medium includes a computer program. When the computer program is run on an IoT device, the IoT device is enabled to perform the method according to any one of the second aspect or the implementations of the second aspect.

Any one of the seventh aspect or the implementations of the seventh aspect corresponds to any one of the second aspect or the implementations of the second aspect. For technical effects corresponding to any one of the seventh aspect or the implementations of the seventh aspect, refer to technical effects corresponding to any one of the second aspect or the implementations of the second aspect. Details are not described herein again.

According to an eighth aspect, a computer-readable storage medium is provided. The computer-readable storage medium includes a computer program. When the computer program is run on a server, the server is enabled to perform the method according to any one of the fourth aspect or the implementations of the fourth aspect.

Any one of the eighth aspect or the implementations of the eighth aspect corresponds to any one of the fourth aspect or the implementations of the fourth aspect. For technical effects corresponding to any one of the eighth aspect or the implementations of the eighth aspect, refer to technical effects corresponding to any one of the fourth aspect or the implementations of the fourth aspect. Details are not described herein again.

According to a ninth aspect, a chip system is provided. The chip system includes one or more processors. When the one or more processors execute a computer program, the one or more processors are enabled to perform the method according to any one of the second aspect, the fourth aspect, the implementations of the second aspect, or the implementations of the fourth aspect.

Any one of the ninth aspect or the implementations of the ninth aspect corresponds to any one of the second aspect or the implementations of the second aspect or any one of the fourth aspect or the implementations of the fourth aspect. For technical effects corresponding to any one of the ninth aspect or the implementations of the ninth aspect, refer to technical effects corresponding to any one of the second aspect or the implementations of the second aspect or any one of the fourth aspect or the implementations of the fourth aspect. Details are not described herein again.

According to a tenth aspect, a computer program product is provided. When the computer program product runs on a computer, the computer is enabled to perform the method according to any one of the second aspect or the implementations of the second aspect, or the method according to any one of the fourth aspect or the implementations of the fourth aspect.

Any one of the tenth aspect or the implementations of the tenth aspect corresponds to any one of the second aspect or the implementations of the second aspect or any one of the fourth aspect or the implementations of the fourth aspect. For technical effects corresponding to any one of the tenth aspect or the implementations of the tenth aspect, refer to technical effects corresponding to any one of the second aspect or the implementations of the second aspect or any one of the fourth aspect or the implementations of the fourth aspect. Details are not described herein again.

BRIEF DESCRIPTION OF DRAWINGS

FIG. 4A-1 and FIG. 4A-2 are a schematic flowchart of an IoT device authorization method according to an embodiment of this application;

FIG. 6A to FIG. 6D are schematic diagrams of some user interfaces of an electronic device according to an embodiment of this application;

FIG. 10A-1 to FIG. 10A-3 are a schematic flowchart of an IoT device authorization method according to an embodiment of this application;

FIG. 10B-1 to FIG. 10B-3 are a schematic flowchart of an IoT device authorization method according to an embodiment of this application;

FIG. 10C-1 to FIG. 10C-3 are a schematic flowchart of an IoT device authorization method according to an embodiment of this application;

FIG. 12A-1 and FIG. 12A-2 are a schematic flowchart of an IoT device authorization method according to an embodiment of this application;

FIG. 12B-1 and FIG. 12B-2 are a schematic flowchart of an IoT device authorization method according to an embodiment of this application;

DESCRIPTION OF EMBODIMENTS

Figure 1:
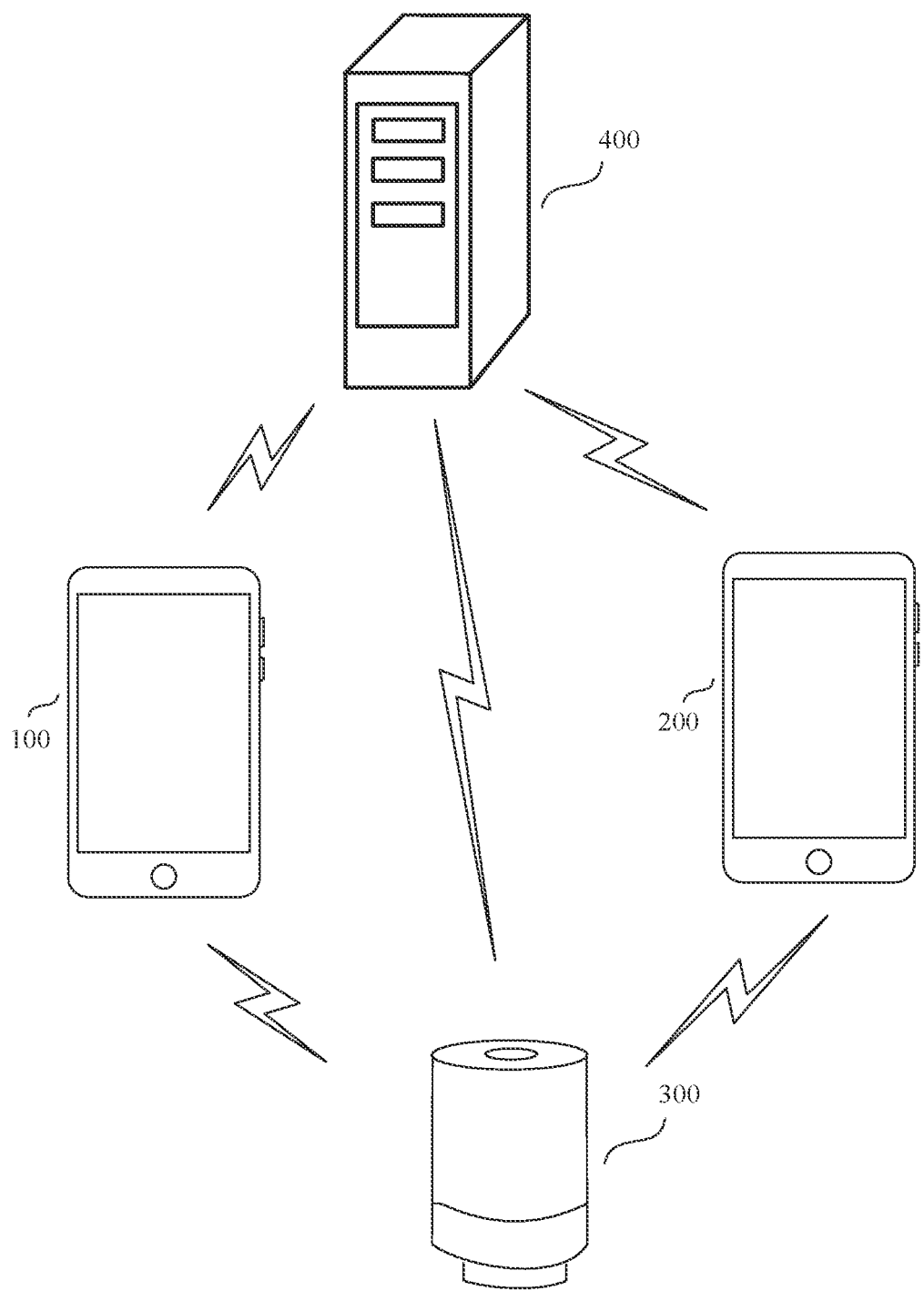
FIG. 1 is a diagram of a system architecture of an application scenario according to an embodiment of this application.

The following describes the technical solutions in embodiments of this application with reference to the accompanying drawings in embodiments of this application. In descriptions in embodiments of this application, "/" means "or" unless otherwise specified. For example, A/B may represent A or B. In this specification, the term "and/or" describes only an association relationship for describing associated objects and represents that three relationships may exist. For example, A and/or B may represent the following three cases: Only A exists, both A and B exist, and only B exists. In addition, in the descriptions in embodiments of this application, "a plurality of" means two or more.

The terms "first" and "second" mentioned below are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of embodiments, unless otherwise specified, "a plurality of" means two or more.

In embodiments of this application, the word "example", "for example", or the like is used to represent giving an example, an illustration, or a description. Any embodiment or design scheme described as "example" or for "example" in embodiments of this application should not be explained as being more preferred or having more advantages than another embodiment or design scheme. Exactly, use of the word "example", "for example", or the like is intended to present a relative concept in a specific manner.

The Internet of things collects required information in real time, for example, sound, light, heat, electricity, mechanics, chemistry, biology, and a location by using various apparatuses and technologies such as various information sensors, radio frequency identification technologies, a global positioning system, an infrared sensor, and a laser scanner, implements ubiquitous connections between things, and between things and people through various possible network access, and implements intelligent sensing, identification, and management of objects and processes. The Internet of things is an information carrier based on the Internet and conventional telecommunications networks, and enables all common physical objects that can be independently addressed to form an interconnected network.

With development of Internet of things technologies, an increasing quantity of IoT devices (such as an IoT lamp, an IoT speaker, and an IoT refrigerator) is connected to a network. An IoT device is an electronic device that is remotely or locally controlled and/or monitored by using the IoT. Typically, smart appliances are typical IoT devices. A household scenario is used as an example. An electronic device A is bound to an IoT device, and the IoT device is connected to a home network. In this case, the electronic device A has operation permission on the IoT device. When an electronic device B is intended to operate the IoT device, the electronic device A needs to first add the electronic device B as a shared user, and then grant the electronic device B permission to operate the IoT device. The electronic device A may authorize the electronic device B as an authorized user in the following manner: The electronic device A shares a sharing link with the electronic device B by using an IoT device management application or another application. Alternatively, after logging in to the IoT device management application, an owner of the electronic device A scans a QR code of the electronic device B, and obtains and is bound to account information of the electronic device B on the IoT device management application. Alternatively, after logging in to the IoT device management application, an owner of the electronic device A manually enters login account information of an owner of the electronic device B on the IoT device management application, even password information corresponding to the login account information, and the like. However, in the foregoing manner, there is a problem of a high security risk, or there is a problem of poor user convenience, and security and convenience are not considered. Therefore, this application provides an IoT device authorization method, an IoT device, and an electronic device, to ensure security, further provide convenience, and simplify a user operation.

FIG. 1 is a diagram of a system architecture of an application scenario according to an embodiment of this application. As shown in FIG. 1, a first electronic device 100, a second electronic device 200, and an IoT device 300 are separately communicatively connected to one or more network servers 400. The first electronic device 100 is bound to the IoT device 300. The first electronic device 100 may control the IoT device 300 to perform a corresponding operation, and may further authorize another electronic device to control the IoT device 300, or the like. The first electronic device 100 may be referred to as a control device of the IoT device 300. In some examples, the first electronic device 100 may first establish a wired or wireless local connection to the IoT device 300, and then perform network configuration on the IoT device 300, so that the IoT device 300 is connected to the server 400. Then, the first electronic device 100 may send a control instruction to the IoT device 300 by using the server 400, so that the IoT device 300 performs the corresponding operation. In some other examples, the first electronic device 100 may first establish a wired or wireless local connection to the IoT device 300, and then directly control, by using the local connection, the IoT device 300 to perform the corresponding operation. A manner of establishing a wired connection between the first electronic device 100 and the IoT device 300 may be, for example, connecting by using a data cable or an optical fiber, and a manner of establishing a wireless connection may be, for example, connecting by using Bluetooth, Wi-Fi, NFC, or ZigBee (ZigBee).

The second electronic device 200 is a to-be-authorized device. To be specific, the second electronic device 200 cannot control the IoT device 300 to perform the corresponding operation before being authorized, and may control the IoT device 300 to perform the corresponding operation after being authorized. The second electronic device 200 may be referred to as a shared control device of the IoT device. For example, the IoT device 300 is an IoT lamp. After the second electronic device 200 is authorized to use the IoT device 300, the second electronic device 200 may receive a user operation (for example, a touch input or a voice input), and directly control the IoT lamp (for example, turn on or off the lamp, or adjust parameters such as light intensity and color temperature of the lamp) or control the IoT lamp by using the server 400. In some examples, the first electronic device 100 may first add the second electronic device 200 as a sharing member, and then the first electronic device 100 may authorize the second electronic device 200 to operate the IoT device 300. In some other examples, the first electronic device 100 may directly add the second electronic device 200 as the shared control device of the IoT device.

The IoT device 300 may be a smart home device, including a mobile terminal, a household appliance, and the like. Specifically, the IoT device 300 may be a smartphone, a smart speaker, a smart refrigerator, a smart air conditioner, a smart washing machine, a smart robot, a smart door, a smart window, a smart television, a smart lamp, a smart socket, a smart air purifier, a smart humidifier, a smart cooker hood, a smart lock, a smart curtain, a smart power strip, a smart electromagnetic oven, a smart camera, or the like.

In some embodiments, the server 400 may be a cloud server (for example, a home cloud server) or the like, or may be a server cluster including a plurality of servers. The server 400 stores control information of the IoT device 300, including at least one of an account of the control device that controls the IoT device 300, a device identifier of the IoT device 300, an account of the shared control device that controls the IoT device 300, a correspondence between the IoT device 300 and the control device, a correspondence between the IoT device 300 and the shared control device, and the like. In this way, after receiving the control instruction for controlling the IoT device 300, the server 400 may determine, based on the stored control information, whether a device sending the control instruction has permission to control the IoT device 300. If the device sending the control instruction has the permission to control the IoT device 300, the device delivers the control instruction to the IoT device 300.

Table 1 is an example of an information list of the IoT device 300 stored in the server 400. It can be learned from Table 1 that the device identifier of the IoT device 300 is a device ID 1, and an identifier of the control device of the IoT device 300 is "Account A". To be specific, an electronic device corresponding to Account A has a binding relationship with the IoT device 300, and the electronic device corresponding to Account A can control the IoT device 300 and authorize another electronic device to control the IoT device 300. An identifier of the shared control device of the IoT device 300 is "Account B". To be specific, the electronic device corresponding to Account B can control the IoT device 300, but cannot authorize another device to control the IoT device 300. Certainly, the server 400 may further maintain a device identifier of an IoT device bound to each account.

TABLE 1

| Device identifier of an IoT device | Identifier of a control device | Identifier of a shared control device |
| --- | --- | --- |
| Device ID 1 | Account A | Account B |

In addition, in some other examples, the server 400 may provide a cloud service for the IoT device 300. The server 400 may further communicate with another server (for example, a content provide server), to provide diversified services for the IoT device 300. The content provide server may be, for example, a weather server, a music server, an intent recognition server, or a voice recognition server. In this case, the server 400 may provide services such as weather forecast, music playing, and voice recognition for the IoT device 300 by-using the content provide server.

For example, both the first electronic device 100 and the second electronic device 200 may be a mobile phone, a tablet computer, a personal computer (Personal Computer, PC), a personal digital assistant (personal digital assistant, PDA), a netbook, a wearable device (for example, a smartwatch or a smart band), or the like. Specific forms of the first electronic device 100 and the second electronic device 200 may be the same or different. Specific forms of the first electronic device 100 and the second electronic device 200 are not limited in this embodiment of this application.

Figure 2:
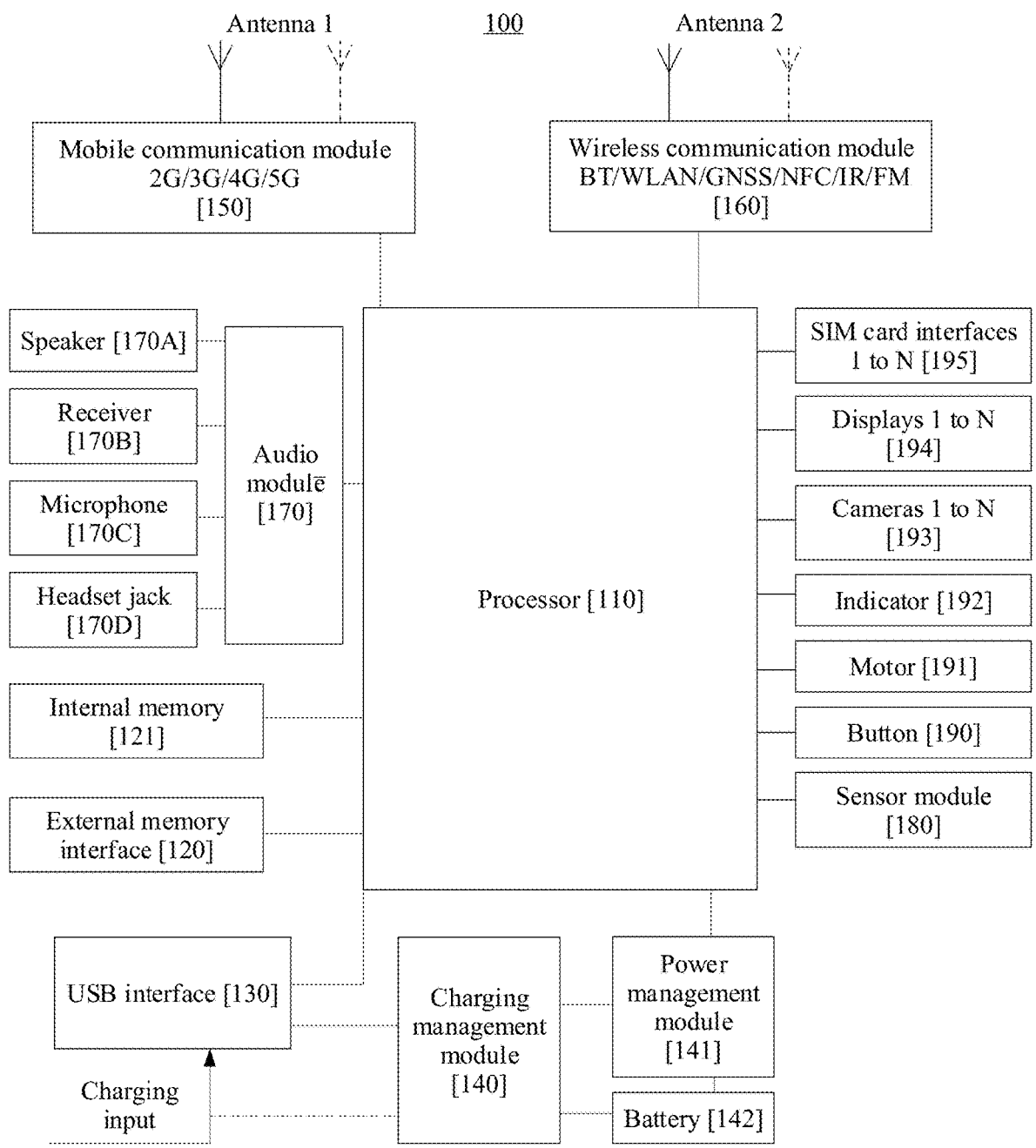
FIG. 2 is a schematic diagram of a structure of an electronic device according to an embodiment of this application.

FIG. 2 is a schematic diagram of a structure of an electronic device according to an embodiment of this application. For a structure of the first electronic device 100, refer to FIG. 2. As shown in FIG. 2, the first electronic device 100 may include a processor 110, an external memory interface 120, an internal memory 121, a universal serial bus (universal serial bus, USB) interface 130, a charging management module 140, a power management module 141, a battery 142, an antenna, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like.

It can be understood that the structure shown in this embodiment of the present invention does not constitute a specific limitation on the first electronic device 100. In some other embodiments of this application, the first electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors. The controller may generate an operation control signal based on instruction operation code and a time sequence signal, to complete control of instruction fetching and instruction execution.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identification module, SIM) interface, a universal serial bus (universal serial bus, USB) interface, and/or the like. It may be understood that an interface connection relationship between the modules that is shown in this embodiment of the present invention is merely an example for description, and constitutes no limitation on the structure of the first electronic device 100. In some other embodiments of this application, the first electronic device 100 may alternatively use an interface connection mode different from that in the foregoing embodiment, or use a combination of a plurality of interface connection modes.

A wireless communication function of the first electronic device 100 may be implemented by using the antenna, the mobile communication module 150, the wireless communication module 160, the modem processor, the baseband processor, and the like.

The antenna is configured to transmit and receive an electromagnetic wave signal. Each antenna in the first electronic device 100 may be configured to cover one or more communication bands. Different antennas may be further multiplexed, to improve antenna utilization. For example, the antenna may be multiplexed as a diversity antenna in a wireless local area network. In some other embodiments, the antenna may be used in combination with a tuning switch.

The mobile communication module 150 can provide a wireless communication solution that is applied to the first electronic device 100 and that includes 2G/3G/4G/5G or the like. The mobile communication module 150 may include at least one filter, a switch, a power amplifier, a low noise amplifier (low noise amplifier, LNA), and the like. The mobile communication module 150 may receive an electromagnetic wave through the antenna, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna In some embodiments, at least some function modules in the mobile communication module 150 may be disposed in the processor 110. In some embodiments, at least some function modules in the mobile communication module 150 may be disposed in a same component as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency base-band signal obtained through demodulation to the base-band processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same component as the mobile communication module 150 or another function module.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna.

In some embodiments, in the first electronic device 100, the antenna and the mobile communication module 150 are coupled, and the antenna and the wireless communication module 160 are coupled, so that the first electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The first electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), flexible light-emitting diode (flexible light-emitting diode, FLED), a mini-LED, a micro-LED, a micro-OLED, a quantum dot light emitting diode (quantum dot light emitting diode, QLED), or the like. In some embodiments, the first electronic device 100 may include one or N displays 194, where N is a positive integer greater than 1.

The external memory interface 120 may be configured to connect to an external memory card, for example, a micro SD card, to expand a storage capability of the first electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions.

The first electronic device 100 may implement a photographing function by using the ISP, the camera 193, the video codec, the GPU, the display 194, the application processor, and the like.

The first electronic device 100 may implement audio functions such as music playing and recording by using the audio module 170, the speaker 170A, the receiver 170B, the microphone 170C, the headset jack 170D, the application processor, and the like.

It should be noted that, the second electronic device 200 may be of a same structure as the first electronic device 100. The second electronic device 200 may also include more or fewer components than the first electronic device 100, or combine some components, or split some components, or have different component arrangements.

Figure 3A:
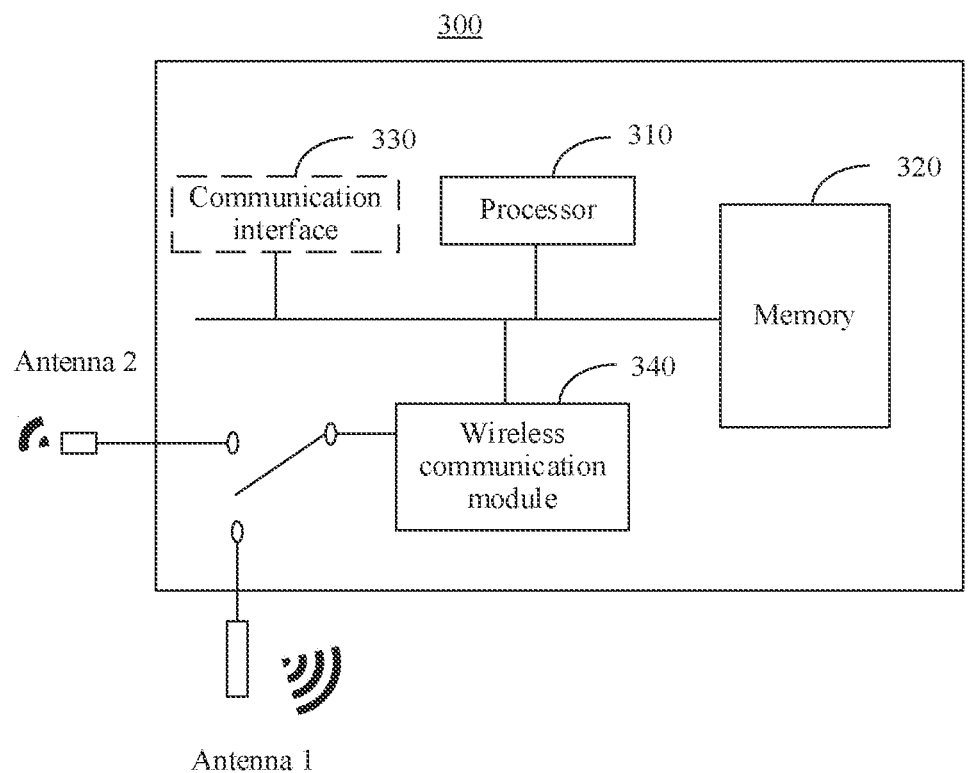
FIG. 3A is a schematic diagram of a structure of an IoT device according to an embodiment of this application.

FIG. 3A is a schematic diagram of a structure of an IoT device 300 according to an embodiment of this application. The IoT device 300 may include one or more processors 310, one or more memories 320, a wireless communication module 340, and one or more antennas. The processor 320, the memory 320, and the wireless communication module 340 are connected through a bus. In some embodiments, the IoT device 300 may further include one or more communication interfaces 330. The communication interface 330 is also connected to the processor 310, the memory 320, and the wireless communication module 340 through a bus.

The processor 310 may be a microcontroller unit (microcontroller unit, MCU), an application-specific integrated circuit (application-specific integrated circuit, ASIC), an integrated circuit configured to control program execution of the solutions in this application, or the like. In an example, the processor 310 may alternatively include one or more MCUs. The MCU herein may be one or more devices, circuits, or processing cores configured to process data (for example, computer program instructions).

The memory 320 may be configured to store computer-executable program code. The executable program code includes instructions. The internal memory may include a program storage area and a data storage area. The program storage area may store a program or instructions that need to be used in this embodiment of this application, an operating system, and the like.

The communication interface 330 may be configured to communicate with another device or a communication network, for example, Ethernet and a wireless local area network (wireless local area network, WLAN). In some examples, the IoT device 300 may alternatively not include the communication interface 330. This is not limited in this embodiment of this application.

The wireless communication module 340 can provide a wireless communication solution that is applied to the IoT device 300 and that includes a MILAN (for example, Wi-Fi), Bluetooth, and the like. The wireless communication module 340 may be one or more components integrating at least one communication processor module. The wireless communication module 340 receives an electromagnetic wave through the antenna, performs frequency modulation and filtering processing on the electromagnetic wave signal, and sends a processed signal to the processor 310. The wireless communication module 340 may further receive a to-be-sent signal from the processor 310, perform frequency modulation and amplification on the signal, and convert the signal into an electromagnetic wave for radiation through the antenna.

In some embodiments, as shown in FIG. 3A, the IoT device 300 includes at least two antennas, such as an antenna 1 (a first antenna, also referred to as a strong antenna) and an antenna (a second antenna, also referred to as a weak antenna). The wireless communication module 340 may switch between the antenna 1 and the antenna 2. A transmit power applied to the antenna 1 or the antenna 2 is the same. A transmit distance of the antenna 1 is a first distance. A transmit distance of the antenna 2 is a second distance. The second distance is less than the first distance. For example, when the wireless communication module 340 switches to the antenna 1 to send a wireless signal, a wireless device in the first distance (for example, the first distance is 6 m, 8 m, or 10 m) of the IoT device 300 may receive the wireless signal. When the wireless communication module 340 switches to the antenna 2 to send a wireless signal, a wireless device in the second distance (for example, the second distance is 30 cm) of the IoT device 300 may receive the wireless signal. The second distance is less than or equal to the preset secure distance. The preset secure distance is less than the first distance. The first distance, the second distance, and the preset secure distance each may be adjusted and set by the user based on a requirement. In an implementation, the second distance may be the preset secure distance. In other words, when the IoT device 300 needs to send a very-short-distance wireless signal, the IoT device 300 may control the wireless communication module 340 to connect to the antenna 2, to send the very-short-distance wireless signal. When the IoT device 300 does not need to send a very-short-distance wireless signal, the IoT device 300 may control the wireless communication module 340 to connect to the antenna 1, to send a normal wireless signal.

Figure 3B:
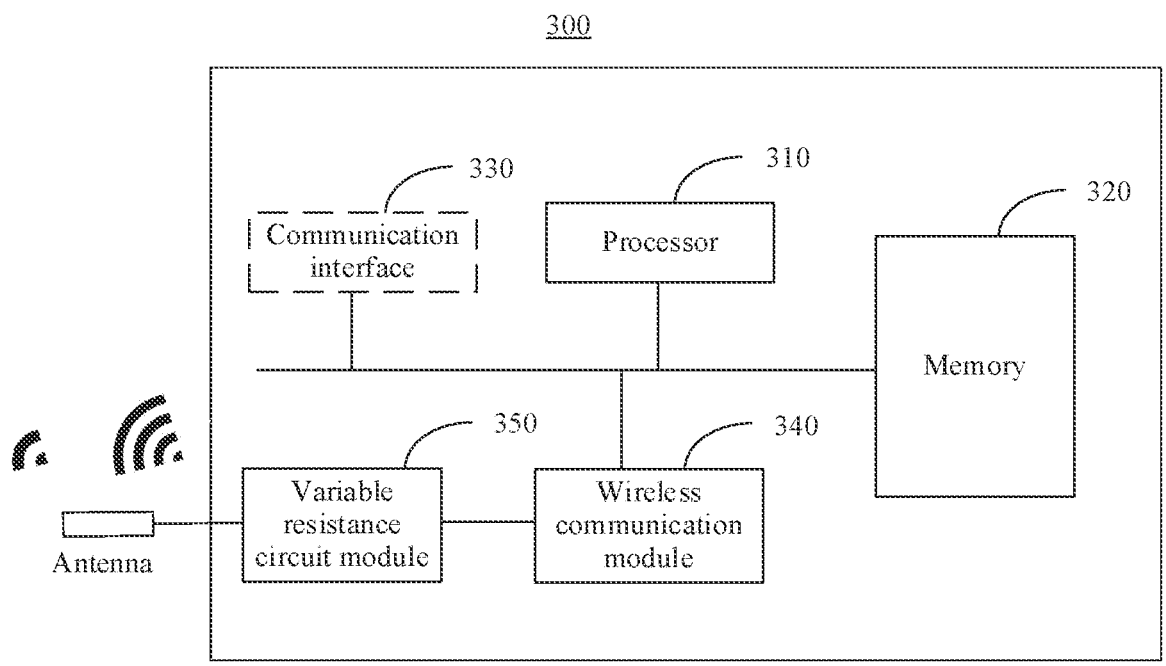
FIG. 3B is a schematic diagram of a structure of an IoT device according to an embodiment of this application.

In some other embodiments, as shown in FIG. 3B, the IoT device 300 may include a variable resistance circuit module 350 and one antenna. The variable resistance circuit module 350 may change a resistance value under control of the wireless communication module 340, to change a transmit distance of a same antenna. In other words, when the resistance value of the variable resistance circuit module 350 is adjusted to a resistance value of 1, a transmit power of the antenna is a first transmit power (a high transmit power), and the transmit distance of the antenna is the first distance. In this case, the wireless device in the first distance (for example, the first distance is 6 m, 8 m, or 10 m) of the IoT device 300 may receive the wireless signal. When the resistance value of the variable resistance circuit module 350 is adjusted to a resistance value of 2, the transmit power of the antenna is a second transmit power (a low transmit power), and the transmit distance of the antenna is the second distance. The second transmit power is less than the first transmit power. The second distance is less than or equal to the preset secure distance. The preset secure distance is less than the first distance. The first distance, the second distance, and the preset secure distance each may be adjusted and set by the user based on a requirement. In an implementation, the second distance may be the preset secure distance. In other words, when the ToT device 300 needs to send a very-short-distance wireless signal, the IoT device 300 may control the resistance value of the variable resistance circuit module 350 to be adjusted to a resistance value of 2, to send the very-short-distance wireless signal. When the IoT device 300 does not need to send the very-short-distance wireless signal, the IoT device 300 may control the resistance value of the variable resistance circuit module 350 to be adjusted to a resistance value of 1, to send a normal wireless signal. In other words, in the other embodiments, when the resistance value of the variable resistance circuit module 350 is adjusted to the resistance value of 1, the IoT device 300 is connected to the first antenna. When the resistance value of the variable resistance circuit module 350 is adjusted to the resistance value of 2, the IoT device 300 is connected to the second antenna. The first antenna is the same as the second antenna, but a transmit distance of the first antenna is greater than a transmit distance of the second antenna. The transmit distance of the second antenna is less than or equal to the preset secure distance, and the transmit distance of the first antenna is greater than the preset secure distance. The transmit distance of the first antenna and the transmit distance of the second antenna are respectively the first distance and the second distance.

For example, a wireless communication mode used by the wireless communication module 340 may be specifically Bluetooth low energy (Bluetooth low energy, BLE), Wi-Fi aware (Wi-Fi aware) or the like. In other words, in an entire communication process, only one wireless communication mode, for example, Wi-Fi aware or BLE, is used. The wireless communication mode is based on a computer network medium access control (medium access control, MAC) layer, and is also referred to as interaction performed by protocol extension at a data link layer, and complete data interaction can be implemented at the data link layer without upper-layer network communication related to the MAC layer. The BLE is an ultra-low power consumption near field wireless communication solution that is launched by a Bluetooth Special Interest Group in 2016 and that is applied to a device B, and may implement communication by using the MAC layer. Wi-Fi aware (Wi-Fi Neighborhood Aware Network, Wi-Fi neighborhood aware network, NAN for short) is a new low-power consumption Wi-Fi Mesh communications technology with point-to-point interconnection and interworking. This technology can bypass a network infrastructure (such as an AP (Access Point, access point) or a cellular network), to implement one-to-one, one-to-many, or many-to-many connection communication between devices, and can also implement communication by using the MAC layer. It may be understood that a larger quantity of layers of a related computer network makes it more difficult to ensure security of the computer network. In this embodiment, wireless MAC layer-based communication is used, so that data can be exchanged based on data link layer protocol extension. This can significantly improve security in an IoT device authorization process, and effectively ensure sensitive information such as an IoT device identifier sent by the IoT device, protocol information related to communication with the IoT device, and a transmission key.

In conclusion, in this embodiment of this application, the IoT device 300 has a wireless communication capability in a very short distance (very short distance). To be specific, another device can receive the very-short-distance wireless signal sent by the IoT device 300 only in a very short distance (for example, 30 cm, 20 cm, or 10 cm). In this case, in a real application scenario, if a device can receive the very-short-distance wireless signal sent by the IoT device 300, it indicates that the device is very close to a location of the IoT device 300. A distance at which the very-short-distance wireless signal sent by the IoT device 300 can be received may be referred to as a secure distance. In other words, in this embodiment of this application, a secure distance of very-short-distance wireless communication is used, to physically ensure security of communication between the IoT device 300 and the second electronic device 200.

Figures 1, 4A:
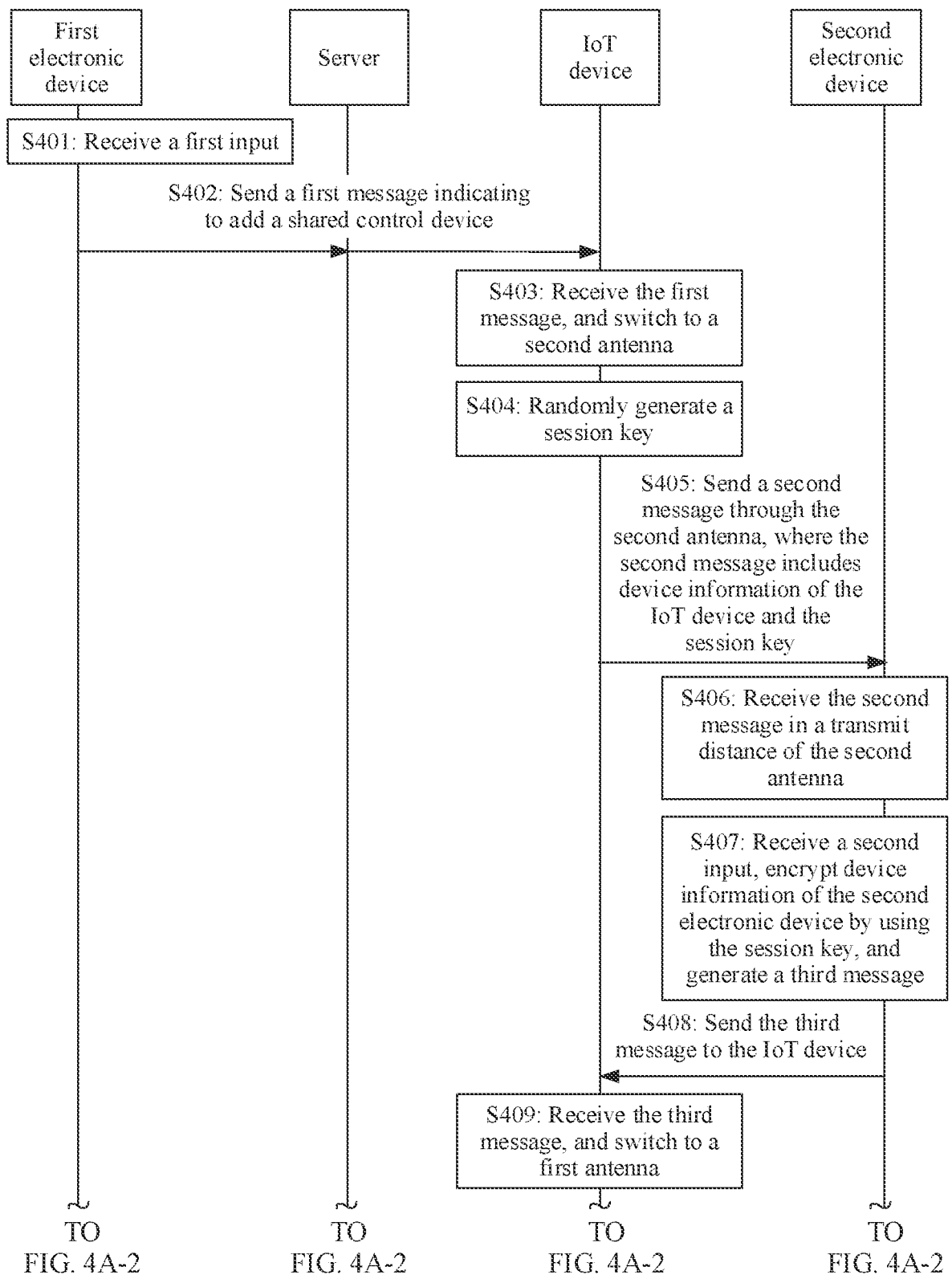
Figures 2, 4A:
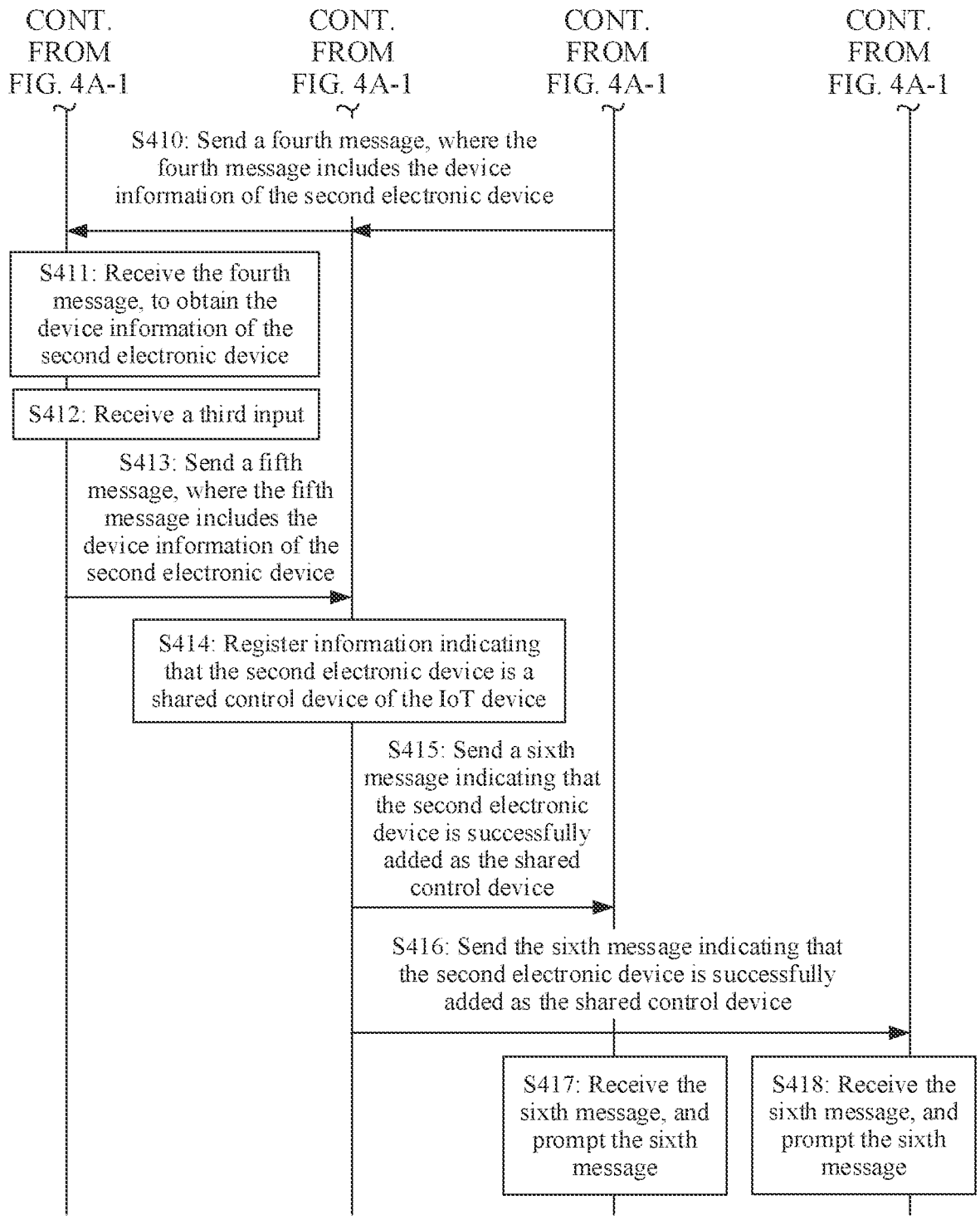

The following describes in detail the technical solutions provided in embodiments of this application with reference to the accompanying drawings. FIG. 4A-1 and FIG. 4A-2 are a schematic flowchart of an IoT device authorization method according to an embodiment of this application. As shown in FIG. 4A-1 and FIG. 4A-2, a first electronic device is a control device of an IoT device, and the method includes the following steps.

S401: The first electronic device receives a first input, where the first input is used to indicate to add a shared control device for the IoT device.

Optionally, the first input may be a user input, or may be an input such as an instruction or a command. When the first input is a user input, the first input is a first user input.

The user performs a network configuration operation on the IoT device in advance by using a first application (for example, an "AI Life" application or an application of the IoT device) on the first electronic device. In this case, the first electronic device is a control device bound to the IoT device, and has permission to control the IoT device and permission to authorize another electronic device to control the IoT device. In other words, a server registers a binding relationship between the IoT device and the first electronic device.

Then, if another electronic device needs to be used to control the IoT device, the shared control device needs to be added for the IoT device by using the first electronic device. In other words, when detecting the first user input, the first electronic device starts a procedure of adding the shared control device for the IoT device. Before the first user input, there may be one or more inputs, or there may be no input.

It should be noted that, in this embodiment of this application, a solution based on a trusted server may be used, that is, a solution of performing server authentication and authorization to control the IoT device. Alternatively, a solution based on an untrusted server may be used, that is, a solution of performing station to station (that is, the control device to the IoT device) authentication and authorization.

In the server authentication and authorization solution, after receiving a control instruction sent by the server, the IoT device may directly execute the control instruction without verifying an identity of a transmit end of the control instruction (that is, whether the control instruction is sent by the control device of the first electronic device). The server may be a cloud server, or may be a local area network server.

In the station to station authentication and authorization solution, after receiving the control instruction sent by the server, the IoT device max verify the identity of the transmit end of the control instruction (that is, whether the control instruction is sent by the control device of the first electronic device). The control instruction is executed after it is determined that the transmit end of the control instruction is a specific control device (for example, the first electronic device). Specifically, when adding or binding the IoT device, the first electronic device exchanges a long-term public key with the IoT device at a near end in advance, for example, based on a password-authenticated key agreement (Password-authenticated key agreement, PAKE). A long-term public key is a long-term valid public key. In other words, the first electronic device stores a long-term public key of the IoT device. In this way, the first electronic device may subsequently perform identity verification on a received message by using the long-term public key of the IoT device. If identity verification performed by using the long-term public key of the IoT device succeeds, it may be determined that the message is sent by the IoT device. In other words, the long-term public key of the IoT device is an identity credential of the IoT device. The IoT device also stores a long-term public key of the first electronic device. Similarly, the long-term public key of the first electronic device is an identity credential of the first electronic device. In this way, when an electronic device subsequently controls the IoT device, the electronic device initiates station to station (Station to Station, STS) negotiation with the IoT device to negotiate a shared key. The IoT device performs identity verification on the electronic device by using the stored long-term public key (the identity credential of the first electronic device). If it is authenticated that the electronic device is the first electronic device, the IoT device decrypts, by using the shared key, a control instruction sent by the electronic device, and executes a corresponding control instruction. Otherwise, the IoT device does not execute the control instruction sent by the electronic device.

Permission of the control device on the IoT device is higher than permission of the shared control device on the IoT device.

S402: The first electronic device sends, to the IoT device by using the server, a first message indicating to add the shared control device.

An instruction (that is, the first message) indicating to add the shared control device delivered by the first electronic device includes device information of the first electronic device. The device information of the first electronic device may include an identifier of the first electronic device. The identifier of the first electronic device includes but is not limited to a MAC address, account information, a user nickname, and the like of the first electronic device.

In an implementation, the first message is sent by the first electronic device to the server. After receiving the first message, the server sends the first message to the IoT device.

S403: After receiving the first message indicating to add the shared control device, the IoT device switches to a second antenna.

Optionally, the IoT device verifies a received message, to verify whether the message is the first message. Specifically, the IoT device may preset a specific identifier of the first message or receive the specific identifier from the server in advance, and identify the first message by using the specific identifier.

In S403, after receiving the first message indicating to add the shared control device sent by the server, the IoT device switches to the second antenna. To be specific, the IoT device switches to a mode for sending a very-short-distance wireless signal.

S404: The IoT device randomly generates a session key.

Then, the IoT device randomly generates the session key for subsequent encryption and decryption. Because the session key is generated randomly, the session key generated each time varies. After randomly generating the session key, the IoT device saves the session key locally.

Optionally, a quantity of session keys stored locally is less than or equal to a preset quantity. If the quantity of randomly generated session keys is greater than the preset quantity, other stored session keys are locally overwritten.

S405: The IoT device sends a second message through the second antenna, where the second message includes the session key and device information of the IoT device.

The IoT device sends the second message through the second antenna. The second message includes the session key and the device information of the IoT device. The second message may also be referred to as a request for adding the shared control device, and the request includes the device information of the IoT device and the session key. For example, when the IoT device has the structure shown in FIG. 3A, the IoT device controls the wireless communication module 340 to connect to the antenna 2. For another example, when the IoT device has the structure shown in FIG. 3B, the IoT device controls a resistance value of the variable resistance circuit module 350 to be a resistance value of 2 (a large resistance value), so that an antenna transmit power of the IoT device is the second transmit power (a low transmit power).

Optionally, the sending includes broadcasting.

Optionally, the device information of the IoT device includes an identifier of the IoT device. The identifier of the IoT device may be a unique identifier of the IoT device.

Further, the device information of the IoT device includes a transmission parameter. The transmission parameter includes but is not limited to a connection protocol (for example, a Bluetooth protocol or a Wi-Fi protocol), a session identifier, and the like.

Optionally, the second message may further include an identifier of the first electronic device.

Further, the identifier of the first electronic device may be a unique identifier of the first electronic device.

Optionally, the identifier of the IoT device includes an identity credential of the IoT device.

It should be noted that a sequence of S403 and S404 may also be interchanged, or S403 and S404 are simultaneously performed. This is not limited in this embodiment of this application.

In an implementation, after the IoT device sends the second message, the IoT device switches to a first antenna. In other words, after S405, S409 is performed. After S409 is performed, the IoT device switches back to a mode for sending a normal wireless signal (a non-very-short-distance wireless signal). For example, when the IoT device has the structure shown in FIG. 3A, the IoT device controls the wireless communication module 340 to connect to the antenna 1. For another example, when the IoT device has the structure shown in FIG. 3B, the IoT device controls a resistance value of the variable resistance circuit module 350 to be a resistance value of 1 (a small resistance value), so that an antenna transmit power of the IoT device is the first transmit power (a high transmit power).

Certainly, S409 may also be performed after another step. For example, S409 is performed after S408, that is, after a third message returned by the second electronic device is received. This is not limited in this embodiment of this application.

It should be noted that this embodiment of this application is described only by using an example in which the IoT device has a capability of sending a very-short-distance wireless signal. To be specific, only the IoT device has the structure in FIG. 3A or FIG. 3B, and neither the first electronic device nor the second electronic device has the structure in FIG. 3A or FIG. 3B. Certainly, if the second electronic device also has the structure in FIG. 3A or FIG. 3B, the second electronic device may also send the third message through the second antenna, or send the third message by using a low transmit power of a same antenna. This is not limited in this embodiment of this application.

In some examples, after receiving the first message indicating to add the shared control device, or after switching to the second antenna, or after sending the second message, the IoT device may display a signal light (for example, blink, or display a different color) or play a voice, to prompt the second electronic device to approach the IoT device, so that the second electronic device receives the very-short-distance wireless signal sent by the IoT device in the transmit distance of the second antenna of the IoT device. Alternatively, or further, when receiving a user instruction to add the shared control device for the IoT device, the first electronic device may notify, in another manner (an SMS message notification, a phone call notification, an instant messaging application notification, or the like), the second electronic device to approach the IoT device.

In an alternative implementation, a maximum quantity of times for which the IoT device sends the second message may be set. For example, it is assumed that the maximum quantity of times for which the IoT device sends the second message is preset to M (M is a positive integer greater than or equal to 1). In this case, after the IoT device switches to the mode for sending the very-short-distance wireless signal, and sends the second message once, the IoT device switches to the mode for sending the normal wireless signal, and prepares to receive a response message returned by the second electronic device. If the IoT device does not receive, within preset duration, the response message returned by the second electronic device, the IoT device increases i whose initial value is 0 by 1, sends the second message again, prepares to receive the response message returned by the second electronic device, and compares values of i and M. If i is less than M, this process repeats until the response message returned by the second electronic device is received after the second message is sent once. If i is equal to M, the IoT device determines that no electronic device is located in a secure distance of the IoT device, and the IoT device may return a failure response to the first electronic device by using the server. In other words, if no response from any electronic device is received in the secure distance of the IoT device, the IoT device switches back to the first antenna. The foregoing response messages are all response messages for the second message. The foregoing second electronic device is merely an example. The foregoing preset duration may be set by a user with permission by using the IoT device or the first electronic device.

Further, if the IoT device receives, within the preset duration after sending the second message for a $P^{th}$ time (P is a positive integer greater than or equal to 1 and less than or equal to M), the response message returned by the second electronic device, the IoT device no longer sends the second message.

S406: The second electronic device receives the second message in the transmit distance of the second antenna.

The second antenna in S406 is the second antenna of the IoT device. To be specific, when the second electronic device is located in the transmit distance of the second antenna of the IoT device, the second electronic device receives the second message. The transmit distance of the second antenna of the IoT device is less than or equal to a preset secure distance. The preset secure distance may be less than or equal to a distance of 30 cm. The preset secure distance may be set or adjusted by the user.

Further, after receiving the second message, the second electronic device displays a related prompt message. The prompt message is used to indicate whether a user of the second electronic device agrees to perform sharing control on the IoT device, so that the second electronic device becomes a shared control device of the IoT device.

S407: The second electronic device receives a second input, encrypts device information of the second electronic device by using the session key, and generates a third message.

Optionally, the second input may be a user input, or may be an input such as an instruction or a command. When the second input is a user input, the second input is a second user input.

In an implementation, the second user input is a confirmation input, which is used to confirm that the second electronic device is the shared control device of the IoT device.

In some examples, after receiving the second message sent by the IoT device, the second electronic device prompts or queries, in at least one of manners such as a text prompt, a voice prompt, a picture prompt, and an animation prompt, whether the user of the second electronic device is willing to use the second electronic device as the shared control device of the IoT device. The second user input may be an input when the user of the second electronic device confirms that the user is willing to use the second electronic device as the shared control device of the IoT device, for example, a touch input of the user of the second electronic device for a specific control, or a specific voice input of the user of the second electronic device.

The device information of the second electronic device is used to identify an identity of the second electronic device. Specifically, the device information of the second electronic device may include an identifier of the second electronic device. For example, the identifier of the second electronic device includes at least one of a MAC address of the second electronic device, a cloud account logged in by a user, a mobile phone number, a user name, and the like.

In an implementation, the second electronic device obtains the device information of the IoT device and the session key from the second message.

Further, the second electronic device further obtains the transmission parameter from the second message. The transmission parameter includes but is not limited to at least one of the session identifier, a transmission protocol, and the like. The second electronic device encrypts the identifier of the second electronic device by using the session key, to generate the third message. Optionally, the identifier of the second electronic device may be a unique identifier of the second electronic device.

In an implementation, the device information of the second electronic device further includes an identity credential of the second electronic device. When the identifier of the IoT device includes the identity credential of the IoT device, and the identity credential of the IoT device is sent to the second electronic device by using the second message, the second electronic device sends the identity credential of the second electronic device to the IoT device. This is because the second message includes the identity credential of the IoT device, which means that when the first electronic device controls the IoT device, the solution based on the untrusted server is used. Therefore, before the second electronic device controls the IoT device, the IoT device and the second electronic device need to exchange the respective identity credentials. In such a scenario, the second electronic device may add the identity credential of the second electronic device to the third message and send the identity credential to the IoT device together with the third message, or separately send the identity credential to the IoT device.

S408: The second electronic device sends the third message to the IoT device.

Specifically, the third message includes but is not limited to at least one of the device information of the second electronic device, the session key, the device information of the IoT device, and the like.

S409: After receiving the third message, the IoT device switches to a first antenna.

For example, when the MT device has the structure shown in FIG. 3A, the IoT device controls the wireless communication module 340 to connect to the antenna 1. For another example, when the IoT device has the structure shown in FIG. 3B, the IoT device controls a resistance value of the variable resistance circuit module 350 to be a resistance value of 1 (a small resistance value), so that an antenna transmit power of the IoT device is the first transmit power (a high transmit power). In this case, a transmit distance of the IoT device is a first distance, and the first distance is greater than the preset secure distance.

In an implementation, if the IoT device further receives the identity credential of the second electronic device, the IoT device stores the identity credential of the second electronic device. It should be noted that, in a network configuration process, the IoT device also exchanges the identity credential with the first electronic device. In other words, the IoT device also stores the identity credential of the first electronic device. In this case, when receiving a control instruction of another electronic device, the IoT device may perform, by using the identity credential of the first electronic device and the identity credential of the second electronic device, identity verification on the electronic device that sends the control instruction. If it is verified that the electronic device is the first electronic device or the second electronic device, identity verification succeeds, and the IoT device executes the control instruction. Otherwise, identity verification fails, and the IoT device does not execute the control instruction.

S410: The IoT device sends a fourth message to the first electronic device by using the server, where the fourth message includes the device information of the second electronic device.

Specifically, the fourth message may be transmitted in an encryption manner. An encryption manner and a decryption manner are preset in the server and the first electronic device.

In an implementation, the fourth message is sent by the IoT device to the server. After receiving the fourth message, the server sends the fourth message to the first electronic device.

S411: After receiving the fourth message, the first electronic device obtains the device information of the second electronic device.

Specifically, the first electronic device may perform decryption in the preset decryption manner, to obtain the device information of the second electronic device based on the fourth message.

Optionally, the first electronic device may further preset the encryption manner. The foregoing encryption manner and decryption manner are the same as or correspond to an encryption manner and a decryption manner preset by the IoT device.

Further, the foregoing encryption manner and decryption manner may be from the cloud server.

S412: The first electronic device receives a third input, where the third input is used to confirm that the second electronic device is added as the shared control device of the IoT device.

Optionally, the third input may be a user input, or may be an input such as an instruction or a command. When the third input is a user input, the third input is a third user input.

In an implementation, after receiving the fourth message forwarded by the server, the first electronic device generates prompt information (for example, at least one of a voice prompt, a text prompt, a picture prompt, and the like), and queries Whether a user of the first electronic device agrees or confirms that the second electronic device is added as the shared control device of the IoT device. After receiving the third user input, the first electronic device performs S413.

The third user input may be an input when the user of the first electronic device confirms that the user agrees to use the second electronic device as the shared control device of the IoT device, for example, a touch input of the user of the first electronic device for a specific control, or a specific voice input of the user of the first electronic device.

S413: The first electronic device sends a fifth message to the server, where the fifth message includes the device information of the second electronic device.

Specifically, the fifth message includes but is not limited to at least one of the device information of the second electronic device, the device information of the first electronic device, information corresponding to the third user input, and the like.

Optionally, after S413 and before S414, the server may further determine whether the information corresponding to the third user input is to agree or not agree. If the information is to agree, S414 is performed; otherwise, S414 is not performed, and a message indicating that the shared control device fails to be added is directly sent to the IoT device and the second electronic device separately.

S414: The server registers information indicating that the second electronic device is the shared control device of the IoT device.

Specifically, the server obtains the device information of the second electronic device, the device information of the IoT device, the device information of the first electronic device, and the like based on the fifth message.

In some embodiments, after the server registers the information indicating that the second electronic device is the shared control device of the IoT device, the server may add the first electronic device and the second electronic device as shared devices for each other by default, or the server may query whether the first electronic device and the second electronic device are added as shared devices for each other. This is not limited in this application.

S415: The server sends, to the IoT device, a sixth message indicating that the second electronic device is successfully added as the shared control device.

S416: The server sends, to the second electronic device, the sixth message indicating that the second electronic device is successfully added as the shared control device.

After registering a shared control relationship between the IoT device and the second electronic device, the server separately pushes, to the IoT device and the second electronic device, the sixth message indicating that the addition succeeds.

For S415 and S416, S415 may be performed first, and then S416 is performed; or S416 may be performed first, and then S415 is performed; or S415 and S416 may be performed simultaneously. An execution sequence of S415 and S416 is not limited in this embodiment of this application.

S417: After receiving the sixth message, the IoT device prompts the sixth message.

In an implementation, after receiving the sixth message, the IoT device performs at least one of displaying a part or all of a text of the sixth message, playing a voice of the sixth message, and the like.

In another implementation, the IoT device may perform at least one of displaying only keywords related to the sixth message, playing a voice of the keywords, and the like.

S418: After receiving the sixth message, the second electronic device prompts the sixth message.

In an implementation, after receiving the sixth message, the second electronic device performs at least one of displaying a part or all of the text of the sixth message, playing the voice of the sixth message, and the like.

In another implementation, the second electronic device may perform at least one of displaying only the keywords related to the sixth message, playing the voice of the keywords, and the like.

Alternatively, not all of S415, S416, S417, and S418 need to be in the IoT device authorization method provided in this embodiment of this application.

In an implementation, this method may include only one of S417 and S418. Specifically, this method includes S401 to S417, and does not include S418. Alternatively, this method includes S401 to S416 and S418, and does not include S417.

In an implementation, this method may include only one of S415 and S416. Specifically, this method includes S401 to S415 and S417, and does not include S416 and S418. Alternatively, this method includes S401 to S414, S416, and S418, and does not include S415 and S417.

In an implementation, this method may not include S415 to S418, that is, include S401 to S414.

In an implementation, this method may not include S417 and S418, that is, include S401 to S416.

In an implementation, this method may not include S416 to S418, that is, include S401 to S415.

In an implementation, this method may not include S415 and S417 to S418, that is, includes S401 to S414 and S416.

In the foregoing, steps, both the IoT device and the second electronic device communicate with each other by using Wi-Fi aware. Alternatively, in the foregoing steps, both the IoT device and the second electronic device communicate with each other by using BLE.

Figure 4B:
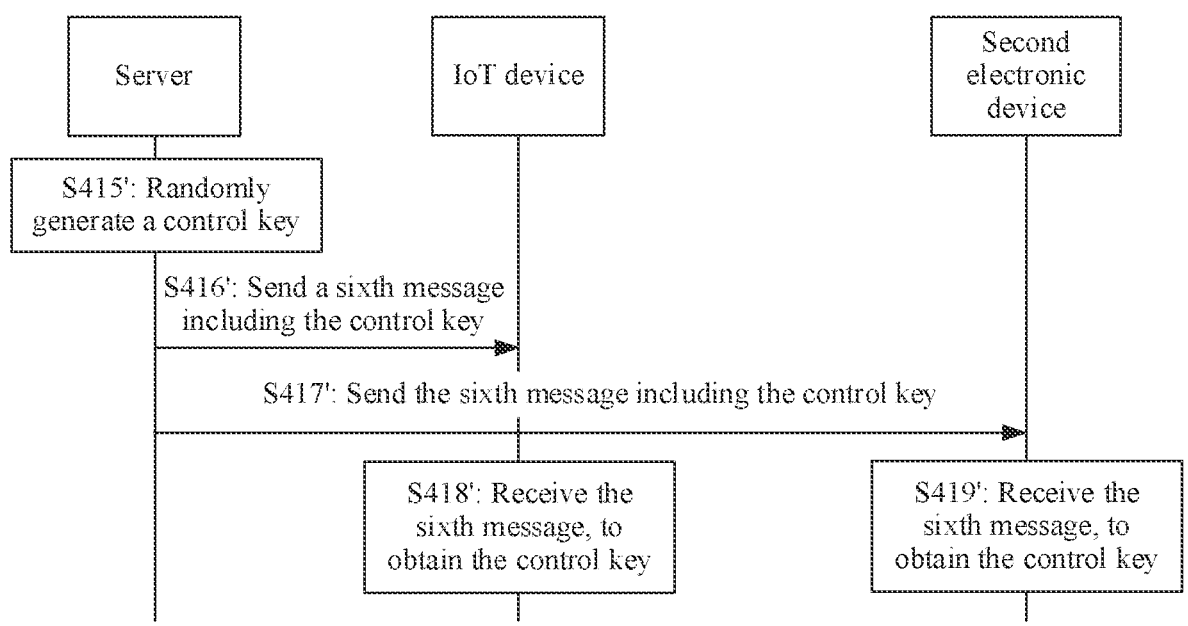
FIG. 4B is a schematic flowchart of some steps in an IoT device authorization method according to an embodiment of this application.

Alternatively, S415 to S418 in FIG. 4A-2 may be replaced with S415' to S419' in FIG. 4B. Specifically, as shown in FIG. 4B, after S414 in FIG. 4A-2, S415' to S430' in FIG. 4B continue to be performed, and S415 to S418 in FIG. 4A-2 are no longer performed. Details are as follows.

S415': The server randomly generates a control key.

S416': The server sends a sixth message including the control key to the IoT device.

S417': The server sends the sixth message including the control key to the second electronic device.

For S416' and S417', S416' may be performed first, and then S417' is performed; or S417' may be performed first, and then S416' is performed; or S416' and S417' may be performed simultaneously. An execution sequence of S416' and S417' is not limited in this embodiment of this application.

S418': After receiving the sixth message, the IoT device obtains the control key.

S419': After receiving the sixth message, the second electronic device obtains the control key.

Similar to the execution sequence of S416' and S417', an execution sequence of S418' and S419' is not limited in this embodiment of this application.

Further, S418' includes prompting the sixth message.

Further, S419' includes prompting the sixth message.

The following further describes how the second electronic device controls the IoT device after being authorized. Specifically, the second electronic device may send a control instruction to the IoT device, to control the IoT device to perform a corresponding operation. As described above, the second electronic device may control the IoT device by using the solution based on the trusted server or the solution based on the untrusted server. Both the solution based on the trusted server and the solution based on the untrusted server include two specific solutions: a local control solution and a remote control solution. The following describes different solutions.

Solution 1: Remote Control Solution Based on the Trusted Server

In Solution 1, the following steps further need to be performed after S418: The second electronic device sends a control instruction for the IoT device to the server, where the control instruction includes the device information of the second electronic device, the identifier of the IoT device, and a specific control operation. After receiving the control instruction, the server performs authentication on the identity of the second electronic device. After authentication succeeds, the server forwards the control instruction to the IoT device or sends the specific control operation to the IoT device, and the IoT device performs a corresponding operation.

In Solution 1, authentication and the control instruction or the specific control operation are performed by using the server. Therefore, Solution 1 is referred to as the remote control solution based on the trusted server.

Solution 2: Local Control Solution Based on the Trusted Server

Figure 4C:
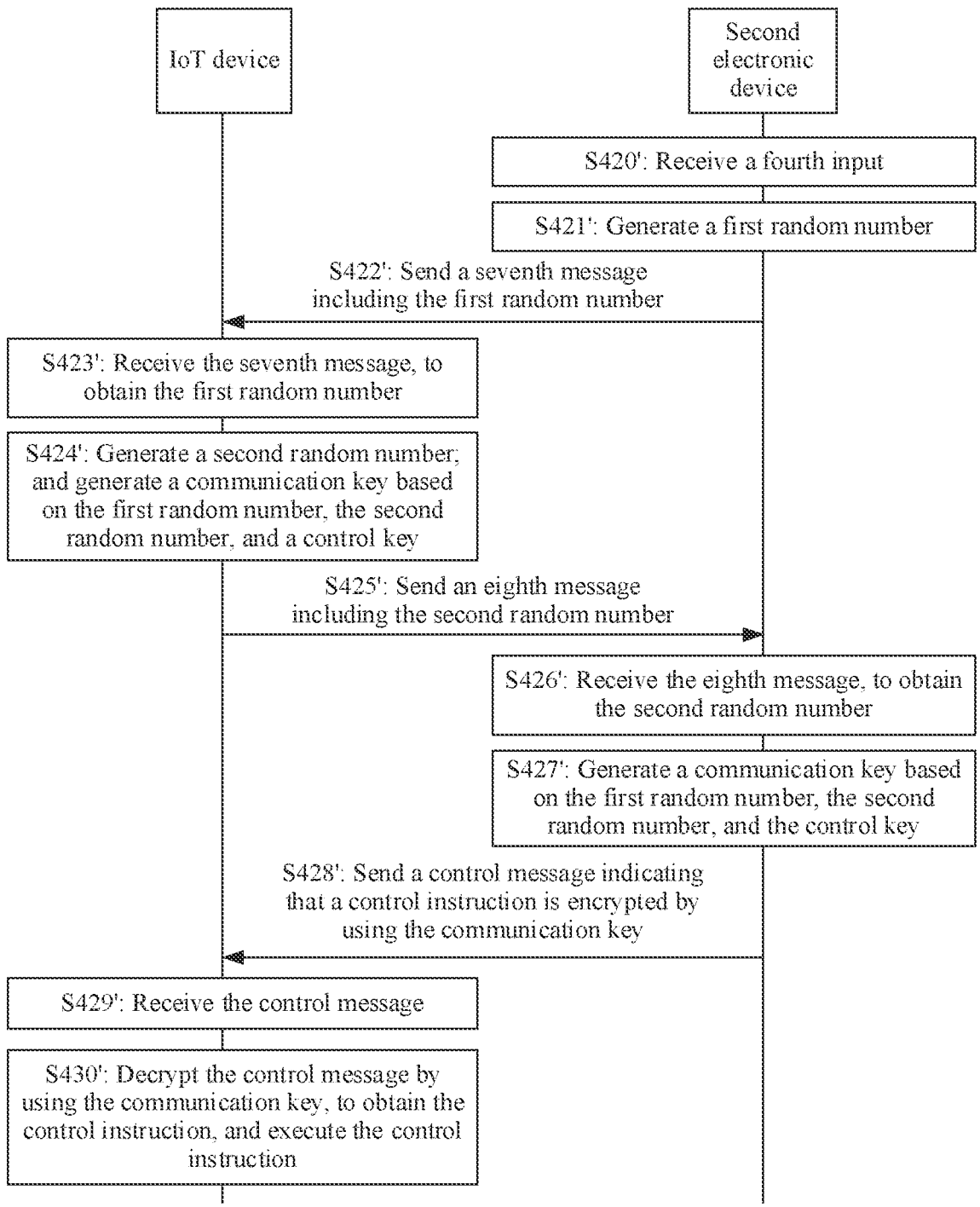
FIG. 4C is a schematic flowchart of an IoT device control method according to an embodiment of this application.

In Solution 2, as shown in FIG. 4C, after S419', S420' to S430' continue to be performed. Details are as follows.

S420': The second electronic device receives a fourth input.

Optionally, the fourth input may be an external input such as a user input, or may be an internal input such as an instruction or a command. When the fourth input is a user input, the fourth input is a fourth user input. In an example, the fourth user input may be a touch input of a control, or a voice input of a specific command, so that the second electronic device executes a corresponding control instruction.

S421': The second electronic device generates a first random number.

The second electronic device generates the first random number, and generates a seventh message based on the first random number. In an implementation, the second electronic device encrypts the generated seventh message.

S422': The second electronic device sends the seventh message including the first random number to the IoT device.

S423': The IoT device receives the seventh message, to obtain the first random number.

S424': The IoT device generates a second random number; and generates a communication key based on the first random number, the second random number, and the control key The IoT device generates the second random number, and generates the communication key based on the first random number, the second random number, and the control key.

S425': The IoT device sends an eighth message including the second random number.

S426': The second electronic device obtains the eighth message, to obtain the second random number.

S427': The second electronic device generates a communication key based on the first random number, the second random number, and the control key.

In this case, the communication key generated by the second electronic device is the same as the communication key generated by the IoT device in S424'.

S428': The second electronic device sends, to the IoT device, a control message indicating that the control instruction is encrypted by using the communication key.

The second electronic device encrypts the control instruction by using the communication key, and generates the control message. Then, the second electronic device sends the control message to the IoT device.

S429': The IoT device receives the control message.

S430': The IoT device decrypts the control message by using the communication key, to obtain the control instruction, and execute the control instruction The IoT device decrypts the control message by using the communication key generated by the IoT device in S424', to obtain the control instruction, and executes the control instruction.

In Solution 2, the eighth message in S425' may be sent through the first antenna or the second antenna of the IoT device.

In Solution 2, because the control keys of the IoT device and the second electronic device are received from the server, the control keys belong to the trusted server, and perform controlling locally. Therefore, Solution 2 is referred to as the local control solution based on the trusted server.

Solution 3: Remote Control Solution Based on the Untrusted Server

As described above, in S405 and S408, the IoT device and the second electronic device exchange the respective identity credentials. Subsequently, when the second electronic device generates the control instruction of the IoT device based on the input, the second electronic device performs encryption on the control instruction by using the identity credential of the second electronic device, and sends an encrypted control instruction to the IoT device by using the server. The IoT device performs decryption by using the stored identity credential of the second electronic device, and if the decryption succeeds, executes the corresponding control instruction.

In Solution 3, the encryption and the decryption are respectively performed by the second electronic device and the IoT device, and are not performed by the server. However, during control, transmission is performed by using the server. Therefore, Solution 3 is referred to as the remote control solution based on the untrusted server.

Solution 4: Local Control Solution Based on the Untrusted Server

As described above, in S405 and S408, the IoT device and the second electronic device exchange the respective identity credentials. Subsequently, when the second electronic device generates the control instruction of the IoT device based on the input, the second electronic device performs encryption on the control instruction by using the identity credential of the second electronic device, and directly sends an encrypted control instruction to the IoT device. The IoT device performs decryption by using the stored identity credential of the second electronic device, and if the decryption succeeds, executes the corresponding control instruction.

In Solution 4, encryption and decryption are performed by the second electronic device and the IoT device respectively, and are not performed by the server. In addition, transmission is not performed by using the server. Therefore, Solution 4 is referred to as the local control solution based on the untrusted server.

In addition after the second electronic device obtains authorization from the IoT device, the first electronic device may cancel authorization for the second electronic device. In other words, the IoT device authorization method further includes an authorization cancellation procedure. The following describes an example of the authorization cancellation procedure with reference to FIG. 5A and FIG. 5B.

Figure 5A:
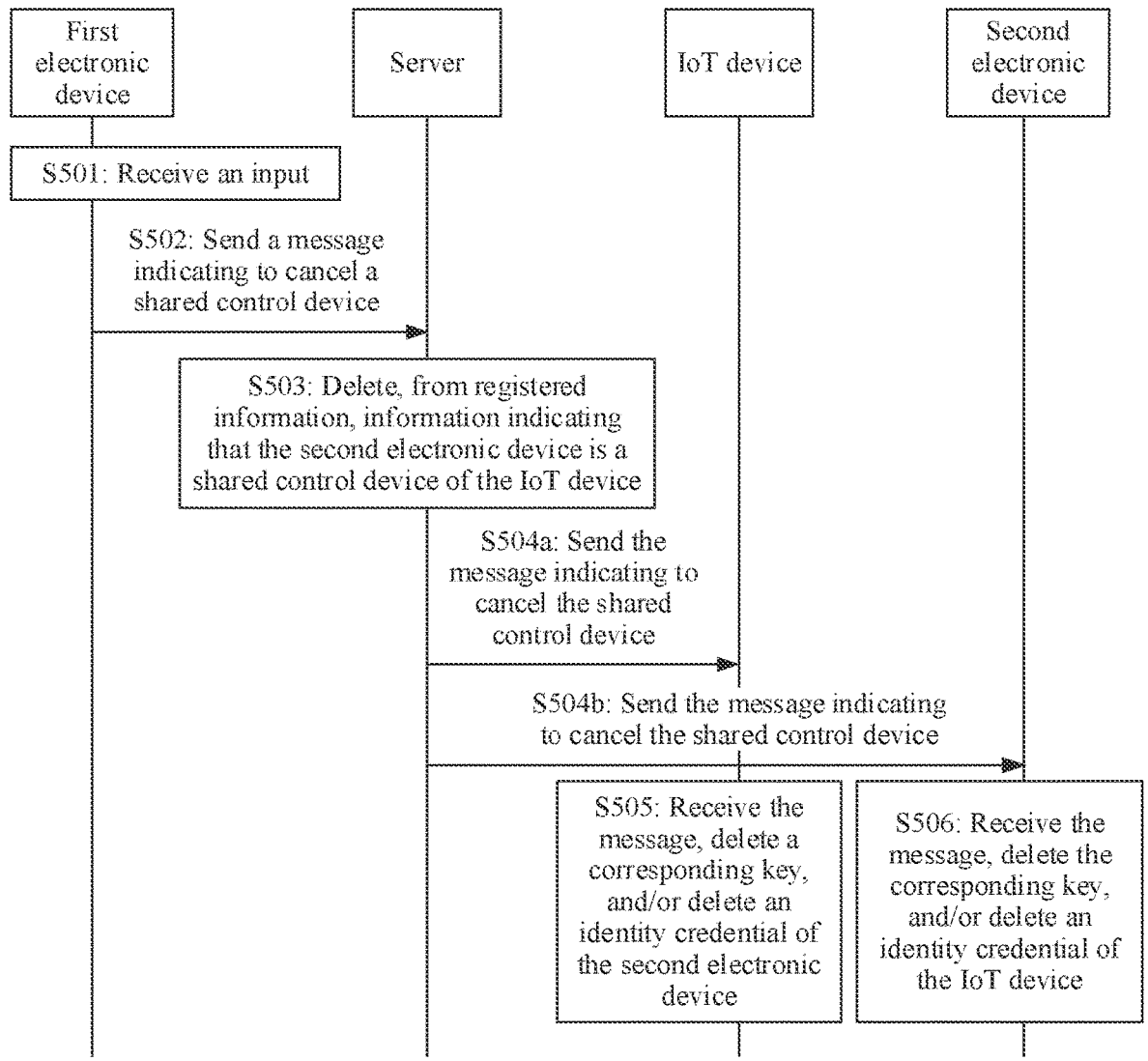
FIG. 5A is a schematic flowchart of some steps in an IoT device authorization method according to an embodiment of this application.

As shown in FIG. 5A, the authorization cancellation procedure specifically includes the following steps.

S501: The first electronic device receives an input.

Optionally, the input may be an external input such as a user input, or may be an internal input such as an instruction or a command. In an implementation, the user input is used to trigger the first electronic device to send a message indicating to cancel the shared control device, and the message is used to indicate to no longer use the second electronic device as the shared control device of the IoT device.

S502: The first electronic device sends the message indicating to cancel the shared control device to the server.

Optionally, the message indicating to cancel the shared control device includes the identifier of the IoT device, the identifier of the second electronic device, and the like. The identifier of the second electronic device is, for example, the device information of the second electronic device.

S503: The server deletes, from registered information, information indicating that the second electronic device is the shared control device of the IoT device S504a: The server sends, to the IoT device, a message indicating that the second electronic device is not the shared control device of the IoT device.

S504b: The server sends, to the second electronic device, the message indicating that the second electronic device is not the shared control device of the IoT device.

For S504a and S504b, S504a may be performed first, and then S504b is performed; or S504b may be performed first, and then S504a is performed; or S504a and S504b may be performed simultaneously. An execution sequence of S504*a* and S504*b* is not limited in this embodiment of this application.

S505: After receiving the message, the IoT device deletes a corresponding key, and/or deletes the identity credential of the second electronic device.

The corresponding key may include but is not limited to at least one of the session key, the control key, and the communication key.

S506: The second electronic device receives the message, and deletes the corresponding key, and/or deletes the identity credential of the IoT device.

The corresponding key may include but is not limited to at least one of the session key, the control key, and the communication key.

S505 corresponds to S504*a* and S506 corresponds to S504*b*.

Alternatively, the authorization cancellation procedure may include only S501 to S503, S504*a*, and S505, and does not include S504*b* and S506; or include only S501 to S503, S504*b*, and S506, and does not include S504*a* and S505.

Alternatively, the authorization cancellation procedure may include only S501 to S504*a*, and does not include S504*b*, S505, and S506. In this case, the second electronic device sends the control message to the IoT device by using the server. Because the server cannot find, from the registered information, the information indicating that the second electronic device is the shared control device of the IoT device, the server sends a control failure response message to the second electronic device. After receiving the response message, the second electronic device deletes the corresponding key and/or deletes the identity credential of the IoT device.

Alternatively, in an implementation, the authorization cancellation procedure does not include S504*a*, S504*b*, S505, and S506 in FIG. 5A. If the second electronic device needs to control the IoT device, the second electronic device needs to send the control message to the server. If the server cannot find, from the registered information, the information indicating that the second electronic device is the shared control device of the IoT device, the server sends a control failure response message to the second electronic device. After receiving the response message, the second electronic device deletes the corresponding key, and/or deletes the identity credential of the IoT device.

Figure 5B:
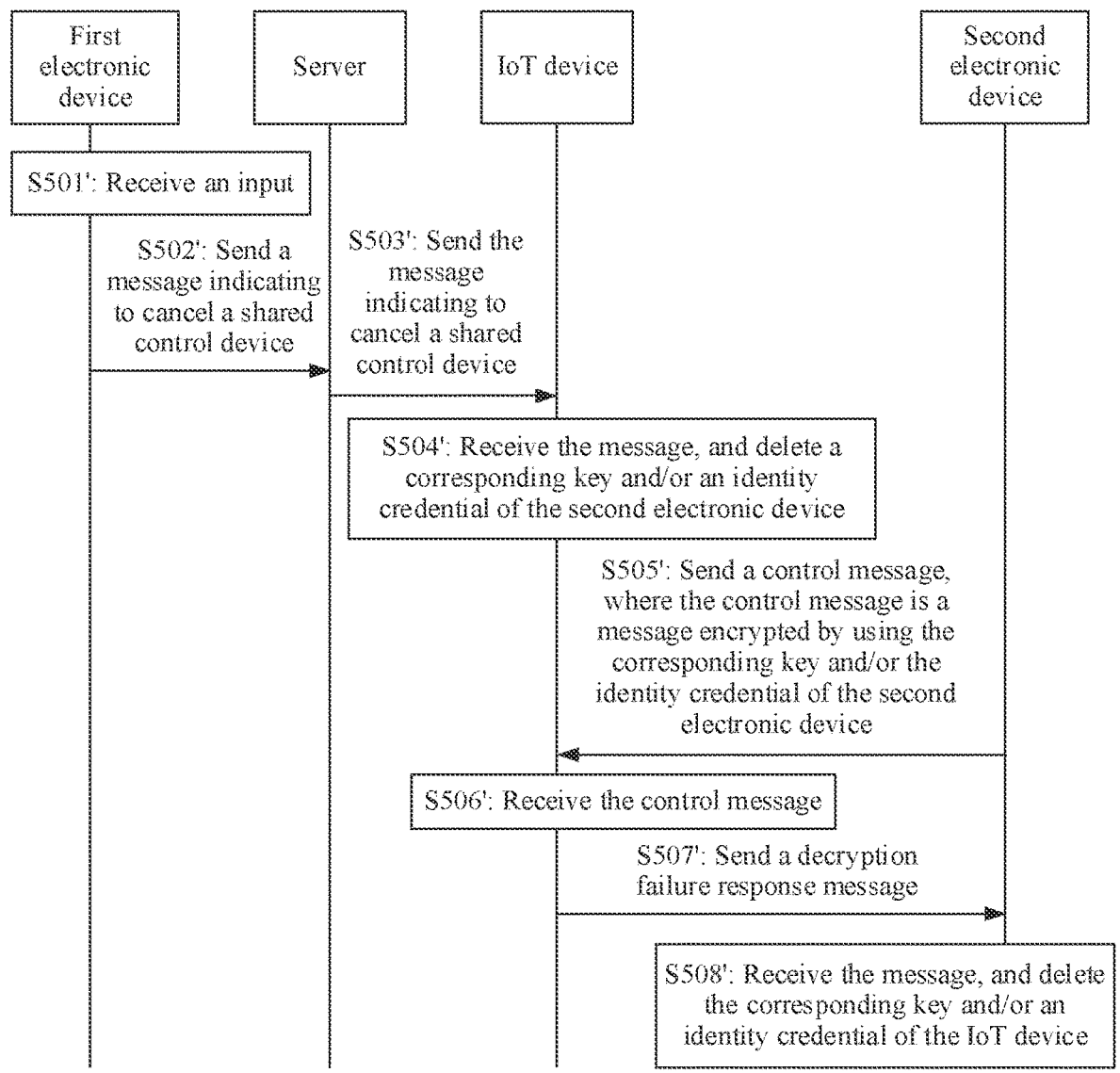
FIG. 5B is a schematic flowchart of some steps in an IoT device authorization method according to an embodiment of this application.

As shown in FIG. 5B, the authorization cancellation procedure specifically includes the following steps.

S501': The first electronic device receives an input.

Optionally, the input may be an external input such as a user input, or may be an internal input such as an instruction or a command. In an implementation, the user input is used to trigger the first electronic device to send a message indicating to cancel the shared control device, and the message is used to indicate to no longer use the second electronic device as the shared control device of the IoT device.

S502': The first electronic device sends the message indicating to cancel the shared control device to the server.

Optionally, the message indicating to cancel the shared control device includes the identifier of the IoT device, the identifier of the second electronic device, and the like. The identifier of the second electronic device is, for example, the device information of the second electronic device.

S503': The server sends the message indicating to cancel the shared control device to the IoT device.

S504': After receiving the message, the IoT device deletes a corresponding key, and/or deletes the identity credential of the second electronic device.

The corresponding key may include but is not limited to at least one of the session key, the control key, and the communication key.

S505': The second electronic device sends a control message to the IoT device.

Specifically, the control message is a message encrypted by using the corresponding key and/or the identity credential of the second electronic device.

S506': The IoT device receives the control message sent by the second electronic device.

S507': The IoT device fails in decryption, and sends a decryption failure response message to the second electronic device.

S508': After receiving the response message, the second electronic device deletes the corresponding key and/or the identity credential of the IoT device.

The corresponding key may include but is not limited to at least one of the session key, the control key, and the communication key.

It should be noted that the implementation corresponding to FIG. 5A, the implementation corresponding to FIG. 5B, and the corresponding alternative manner are merely examples for description, and are not intended to limit the scope of this application.

The following describes user interfaces related to IoT device authorization by using examples.

An example in which the first electronic device is a mobile phone 1, the second electronic device is a mobile phone 2, the mobile phone 1 is a control device of a smart speaker, and the mobile phone 1 grants permission to the mobile phone 2 to be a shared control device of the smart speaker is used for description.

Figure 6A:
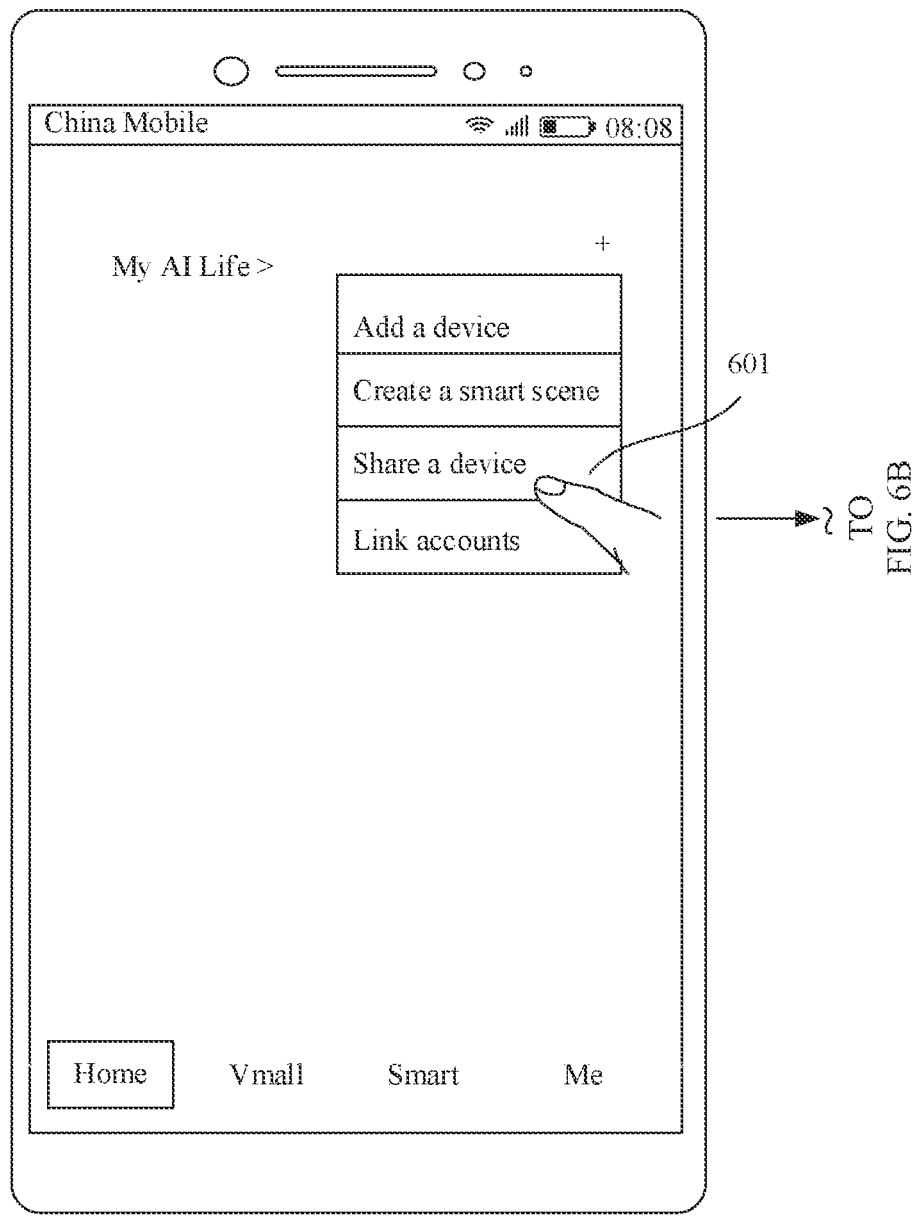
Figure 6B:
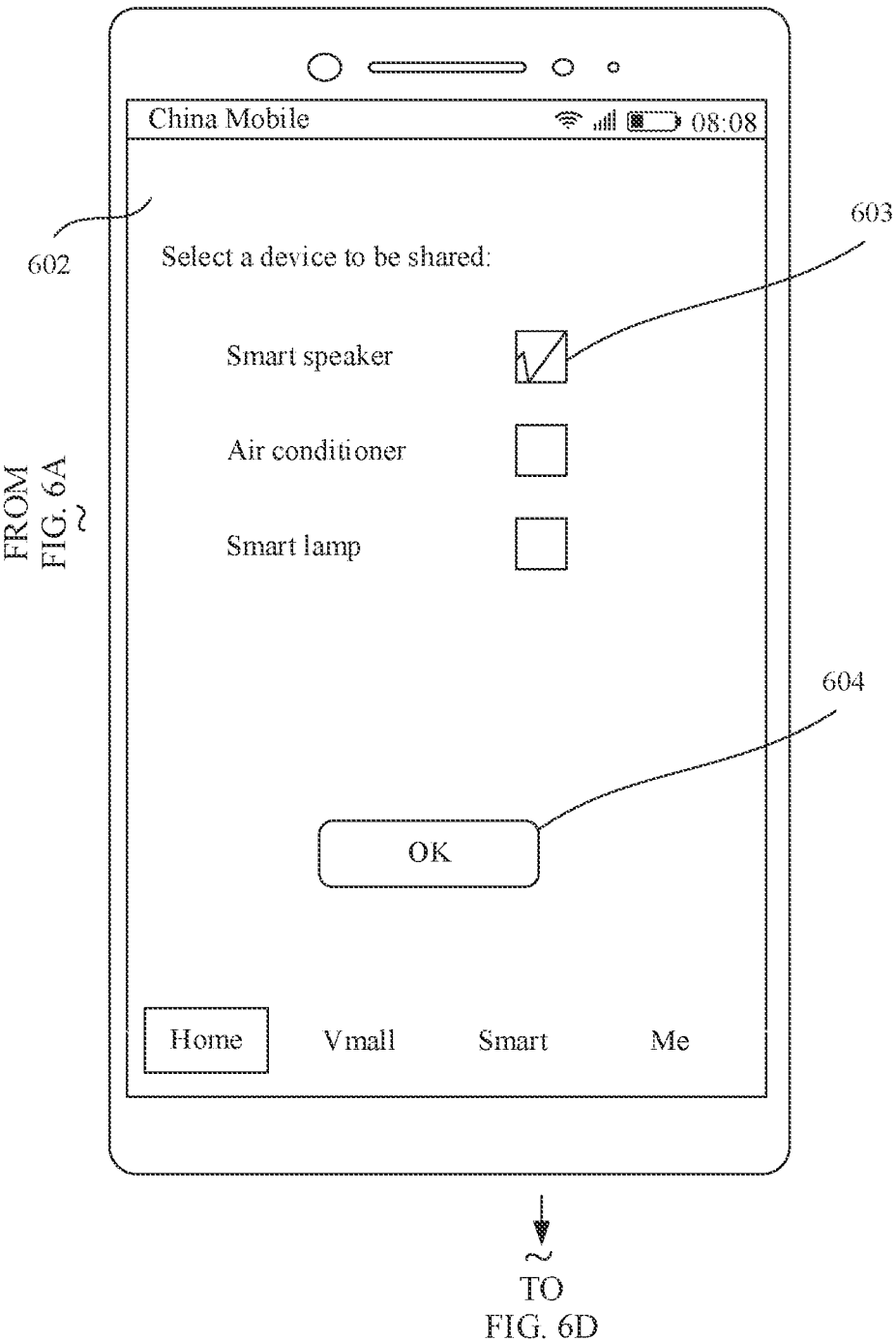

If the mobile phone 2 needs to be used to control the smart speaker, the mobile phone 2 needs to be added as the shared control device of the smart speaker by using the mobile phone 1. For example, as shown in FIG. 6A, in response to selecting a "Share a device" control 601 by a user, the mobile phone 1 displays an interface 602 that includes a list of bound devices shown in FIG. 6B. Further, in response to selecting a smart speaker control 603 and tapping an "OK" control 604 by the user, the mobile phone 1 sends, to a server, a message or an instruction indicating to add a shared control device for the smart speaker. Optionally, in a process in which the mobile phone 2 adds the shared control device for the smart speaker, the mobile phone 1 may display an interface 607 shown in FIG. 6D, where a prompt information 608 is used to indicate that the shared control device is being added for the smart speaker.

Figure 6C:
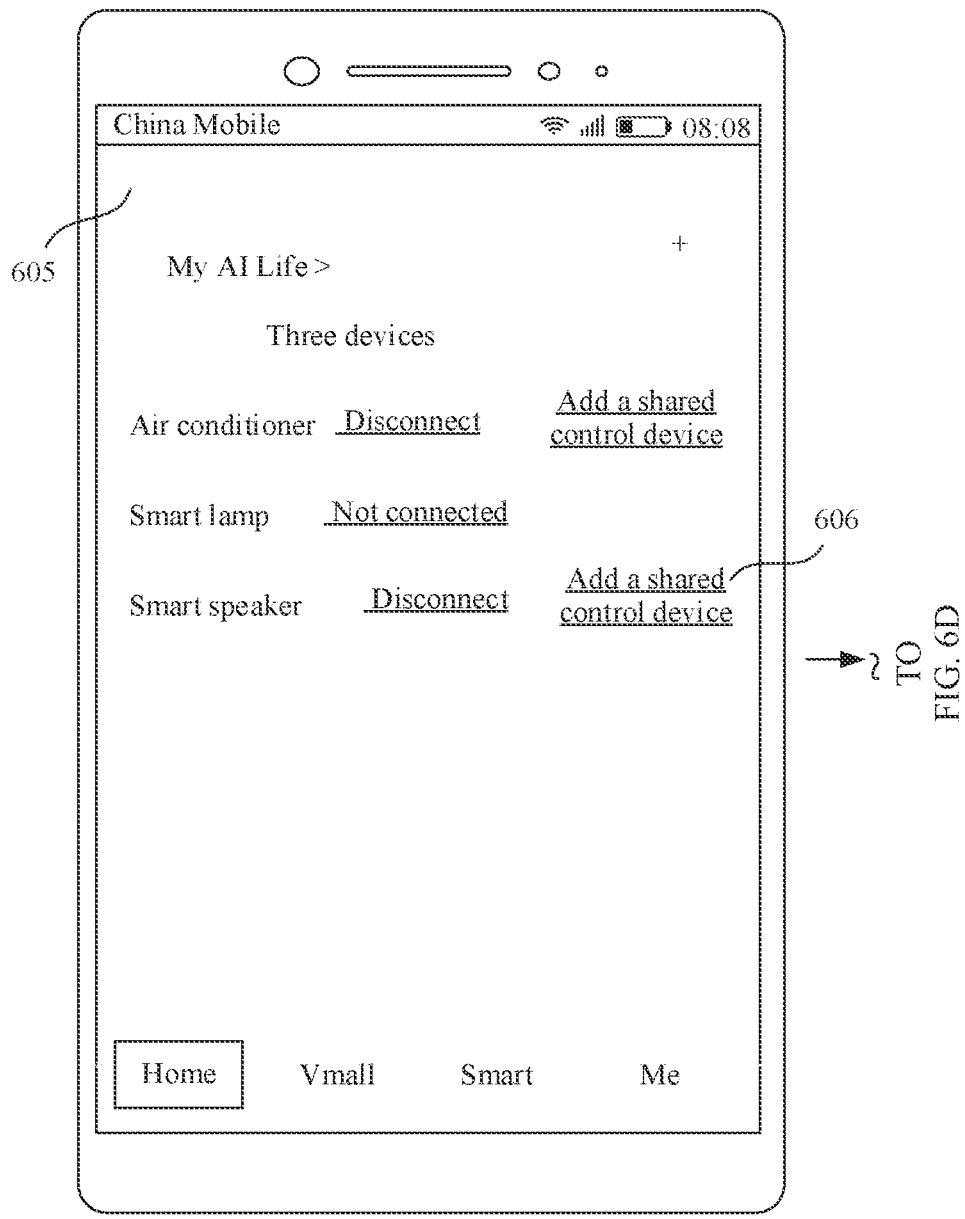

For another example, FIG. 6C shows a main interface 605 of an "AI Life" application displayed on the mobile phone 1. The main interface 605 includes a list of IoT devices bound to the mobile phone 1, and displays operation controls corresponding to the IoT devices, for example, "Disconnect" and "Add a shared control device" (the operation controls may further include a "Cancel a shared control device" control, which is not shown in the figure). In response to a case in which the "Add a shared control device" control 606 is touched, the mobile phone 1 sends, to the server, the message or the instruction indicating to add a shared control device for the smart speaker. Optionally, in the process in which the mobile phone 2 adds the shared control device for the smart speaker, the mobile phone 1 may display the interface 607 shown in FIG. 6D, where the prompt information 608 is used to indicate that the shared control device is being added for the smart speaker.

Then, the mobile phone 1 starts a procedure of adding a shared control device for the "Smart speaker", that is, performs the procedure performed by the first electronic device in the foregoing IoT device authorization method. For example, FIG. 4A-1 is used as an example, that is, S402 to S406 in FIG. 4A-1 are performed.

Figure 7:
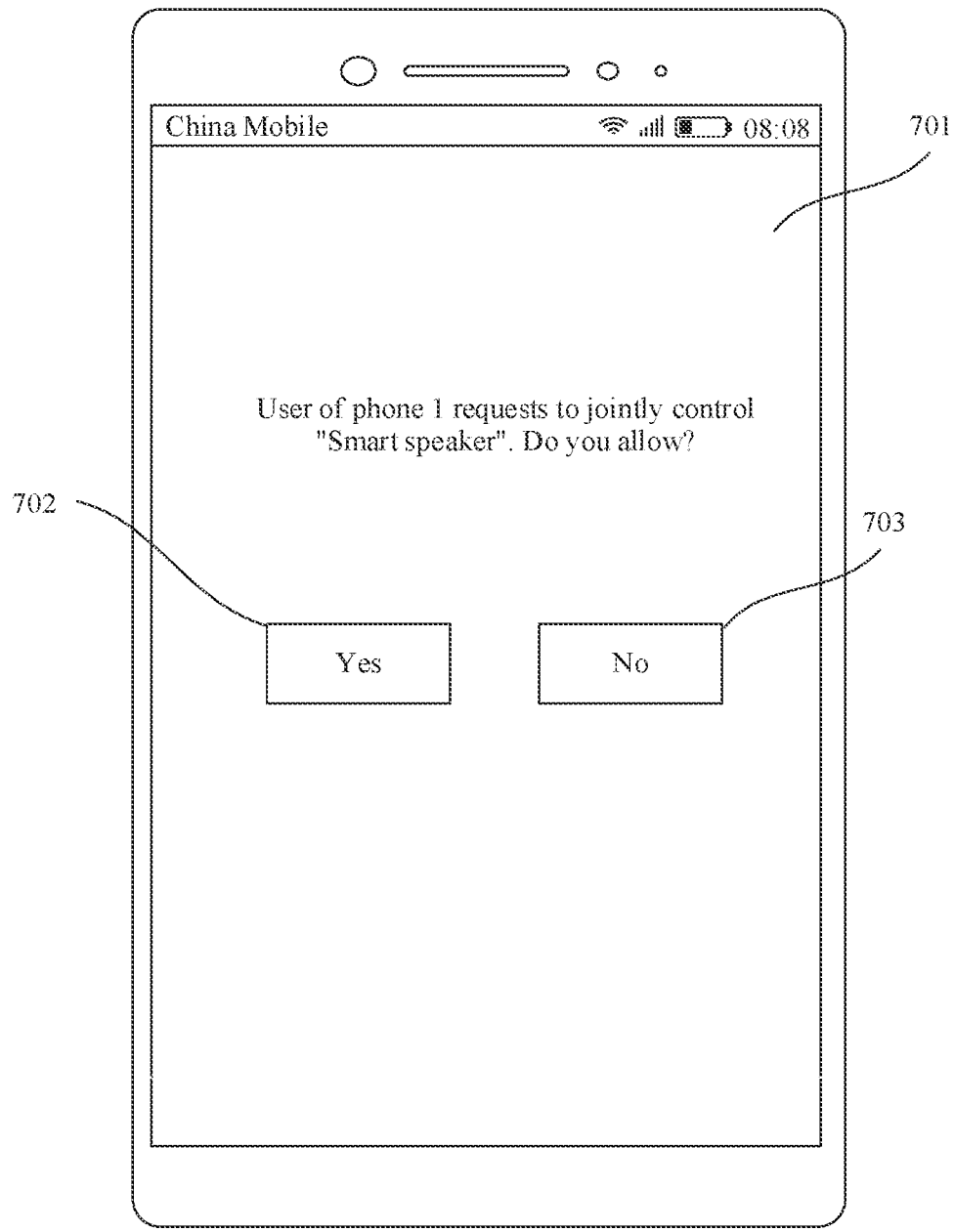
FIG. 7 is a schematic diagram of a user interface of an electronic device according to an embodiment of this application.

After receiving a second message indicating addition, the mobile phone 2 obtains, from the second message indicating addition, device information of the mobile phone 1, device information of the smart speaker, and the like, and generates prompt information. FIG. 7 shows a prompt interface 701 displayed on the mobile phone 2. In response to detecting that a "Yes" control 702 is touched, the mobile phone 2 returns device information of the mobile phone 2 to the smart speaker, that is, performs the procedure performed by the second electronic device in the foregoing IoT device authorization method. For example, FIG. 4A-1 and FIG. 4A-2 are used as an example, that is, S408 to S411 are performed. In response to detecting that a "No" control 703 is touched, the mobile phone 2 does not return the device information of the mobile phone 2 to the smart speaker, or returns, to the smart speaker, a message indicating that the mobile phone 2 refuses to control the smart speaker, and the procedure of adding the shared control device ends.

Figure 8:
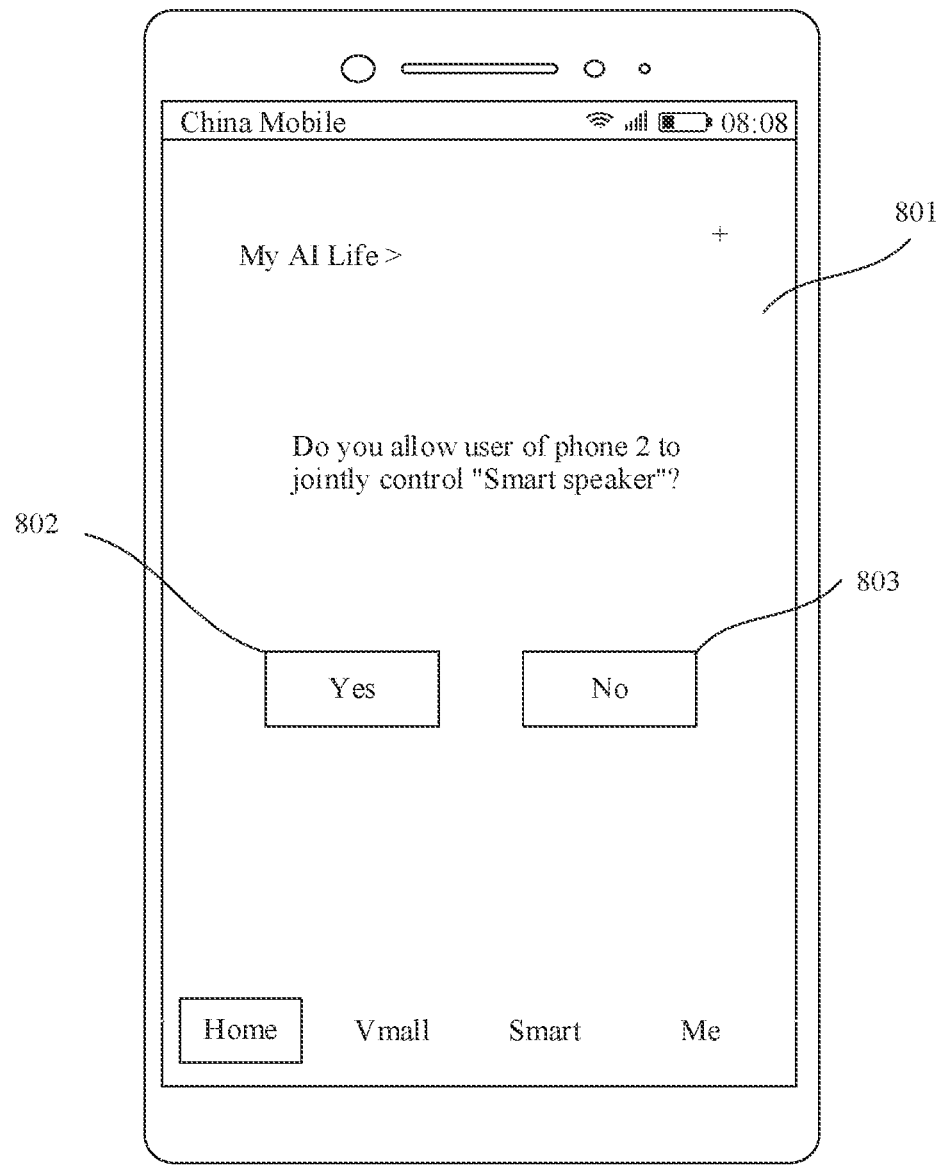
FIG. 8 is a schematic diagram of a user interface of an electronic device according to an embodiment of this application.

Further, after the mobile phone 1 receives the device information of the mobile phone 2, the mobile phone 1 may display a prompt interface 801 shown in FIG. 8. In response to detecting that a "Yes" control 802 is touched, the mobile phone 1 sends, to the server, a message or an instruction indicating to add the mobile phone 2 as the shared control device of the smart speaker. Then, the mobile phone 1 continues to perform the procedure corresponding to the first electronic device in the foregoing IoT device authorization method. For example, FIG. 4A-2 is used as an example to perform S413 and subsequent steps. In response to detecting that a "No" control 803 is touched, the mobile phone 1 sends, to the server, a message or an instruction indicating to reject to add the mobile phone 2 as the shared control device of the smart speaker, and the procedure of adding the shared control device ends.

Further, after the server registers the mobile phone 2 as the shared control device of the smart speaker, the server may add the mobile phone 1 and the mobile phone 2 as shared devices for each other by default, or the server may query whether the mobile phone 1 and the mobile phone 2 are added as shared devices for each other.

Figure 9A:
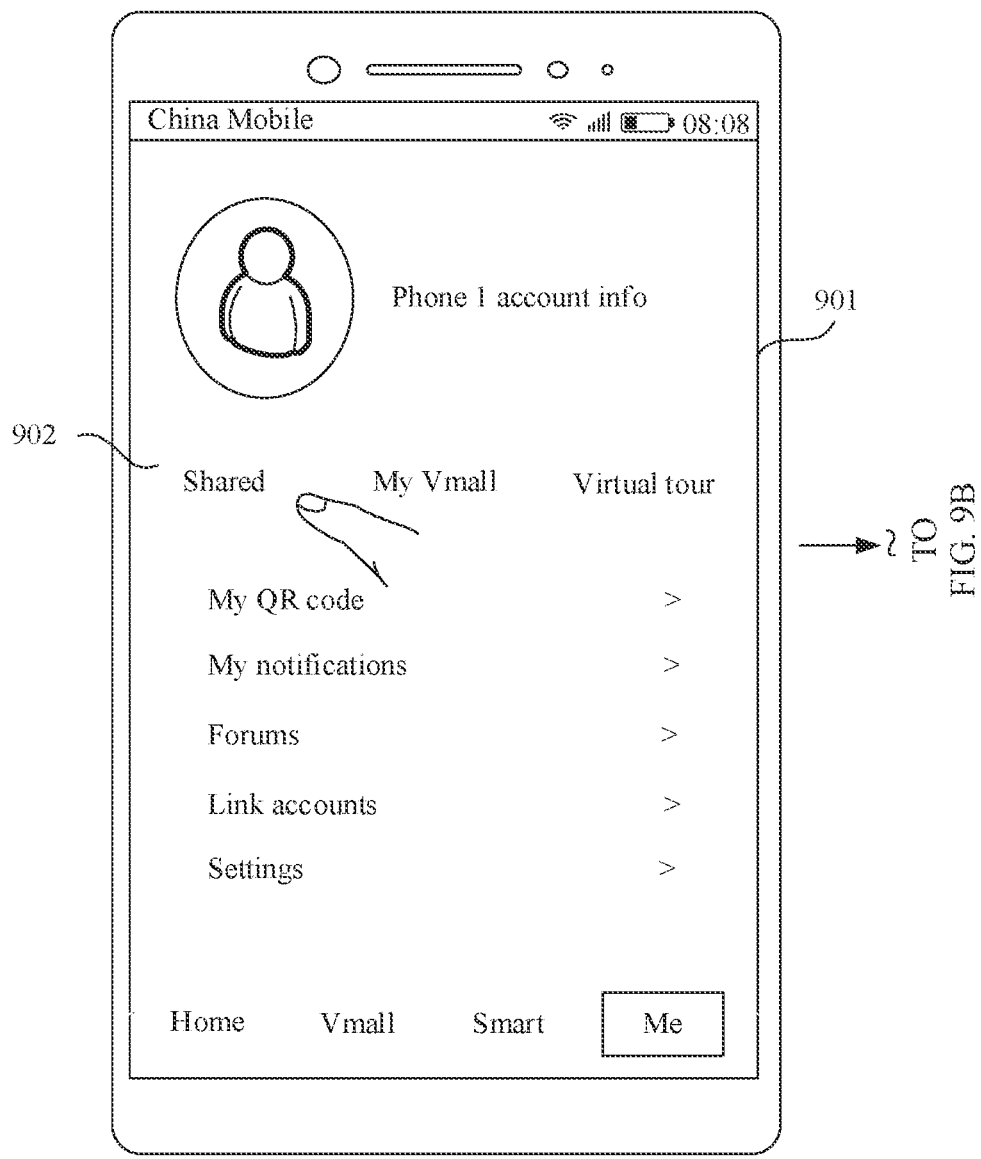
FIG. 9A to FIG. 9C are schematic diagrams of some user interfaces of an electronic device according to an embodiment of this application.
Figure 9B:
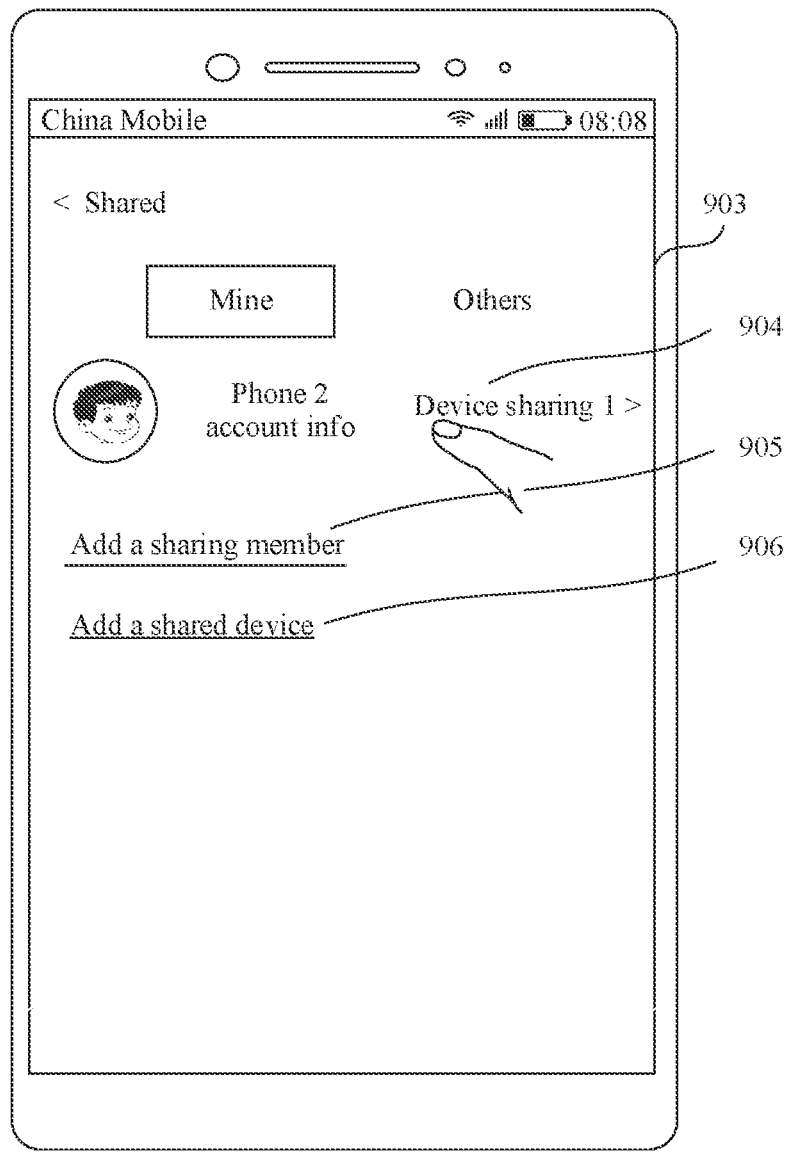

For example, FIG. 9A shows an interface 901 displayed on the mobile phone 1. In response to a case in which a "Shared" control 902 is touched, the mobile phone 1 displays an interface 903 shown in FIG. 9B. A user may view the mobile phone 2 and a shared IoT device by using the interface 903. For example, newly added shared information 904 is displayed under "Mine", and the shared information includes the device information of the mobile phone 2 and a quantity of IoT devices shared by the mobile phone 1 and the mobile phone 2. In response to a touch of "Device sharing 1", device information of the IoT device shared by the mobile phone 1 and the mobile phone 2 may be viewed. Correspondingly, in the mobile phone 2, "Others" displays the device information of the mobile phone 1, the device information of the shared IoT device, and the like (not shown in the figure). In addition, the user may further add a new sharing member or IoT device by using an "Add a sharing member" control 905 and an "Add a shared control device" control 906.

Figure 9C:
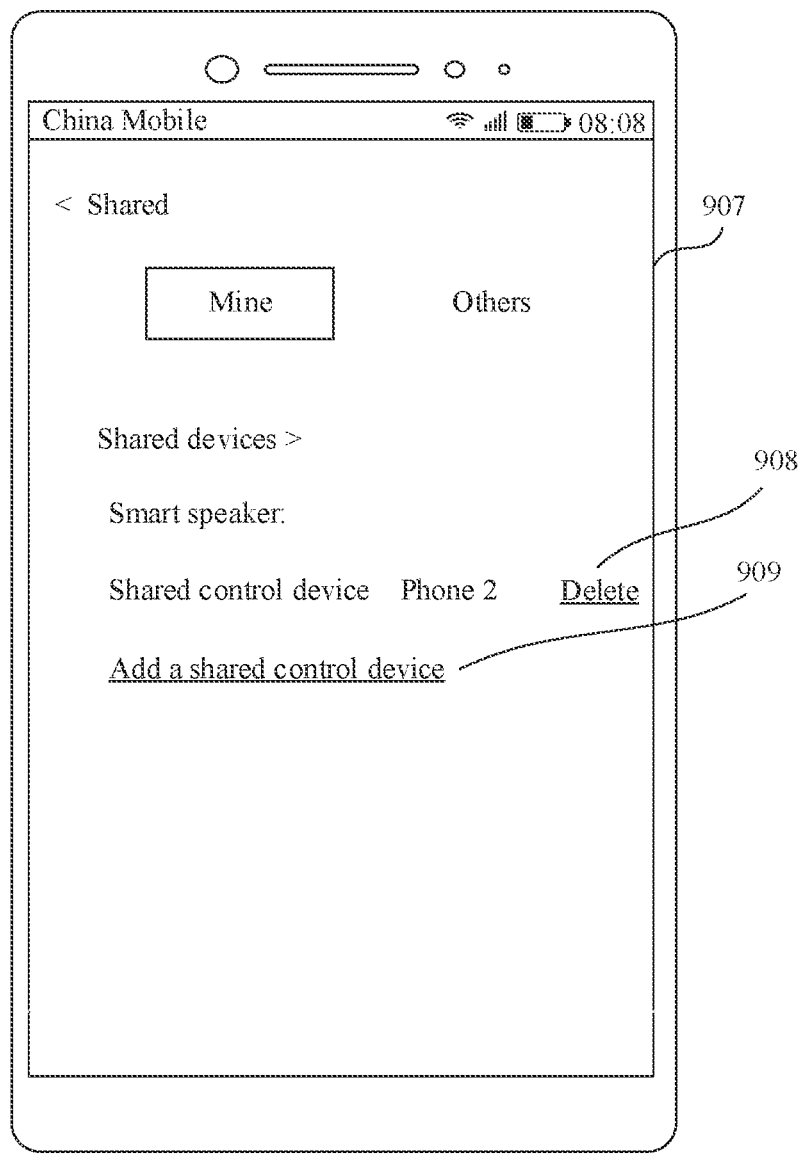

In response to a case in which the shared information 904 is touched, the mobile phone 1 may display an interface 907 shown in FIG. 9C. The interface 907 includes device information of the shared device of the mobile phone 1, for example, the device information of the smart speaker and the device information of the mobile phone 2. The interface 907 further includes a "Delete" control 908, configured to delete the mobile phone 2 from the shared control device of the smart speaker. For example, in response to a case in which the "Delete" control 908 is touched, the mobile phone 1 starts a process of deleting the mobile phone 2 from the shared control device of the smart speaker. For example, in FIG. 5A, step S502 and subsequent steps are performed. Optionally, the interface 907 may further include a shared control device adding control 909, configured to continue to add another shared control device for the smart speaker.

In addition, in some examples, when indicating to add the second electronic device as the shared control device of the IoT device, the first electronic device may specify temporary control duration and/or a quantity of temporary control times for the shared control device. In still some examples, when confirming that the second electronic device is added as the shared control device of the IoT device, the second electronic device may confirm or specify the temporary control duration and/or the quantity of temporary control times. In some other examples, after the first electronic device obtains the device information of the second electronic device, when confirming that the second electronic device is added as the shared control device of the IoT device, the first electronic device confirms or specifies the temporary control duration and/or the quantity of temporary control times.

Figures 1, 10A:
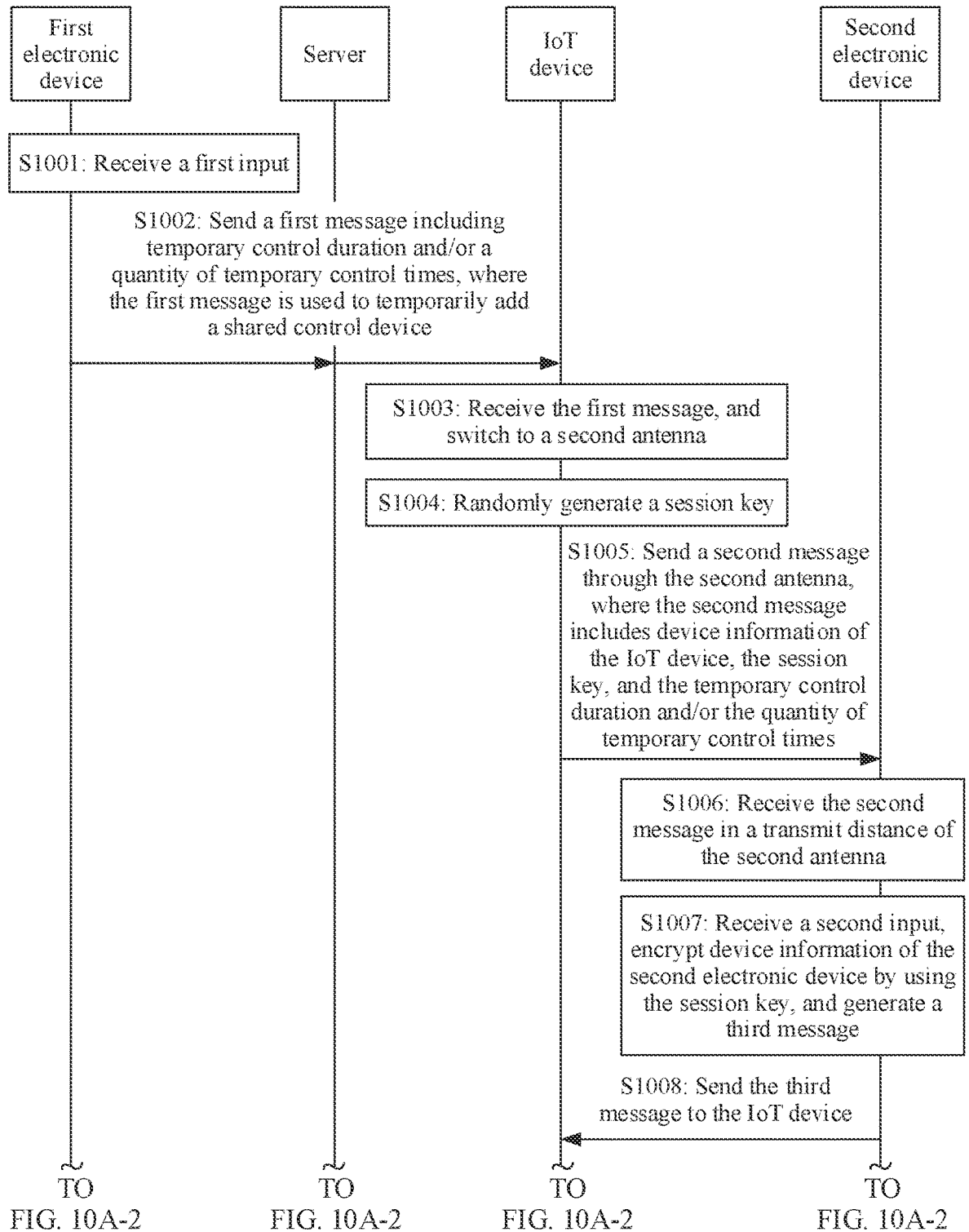
Figures 2, 10A:
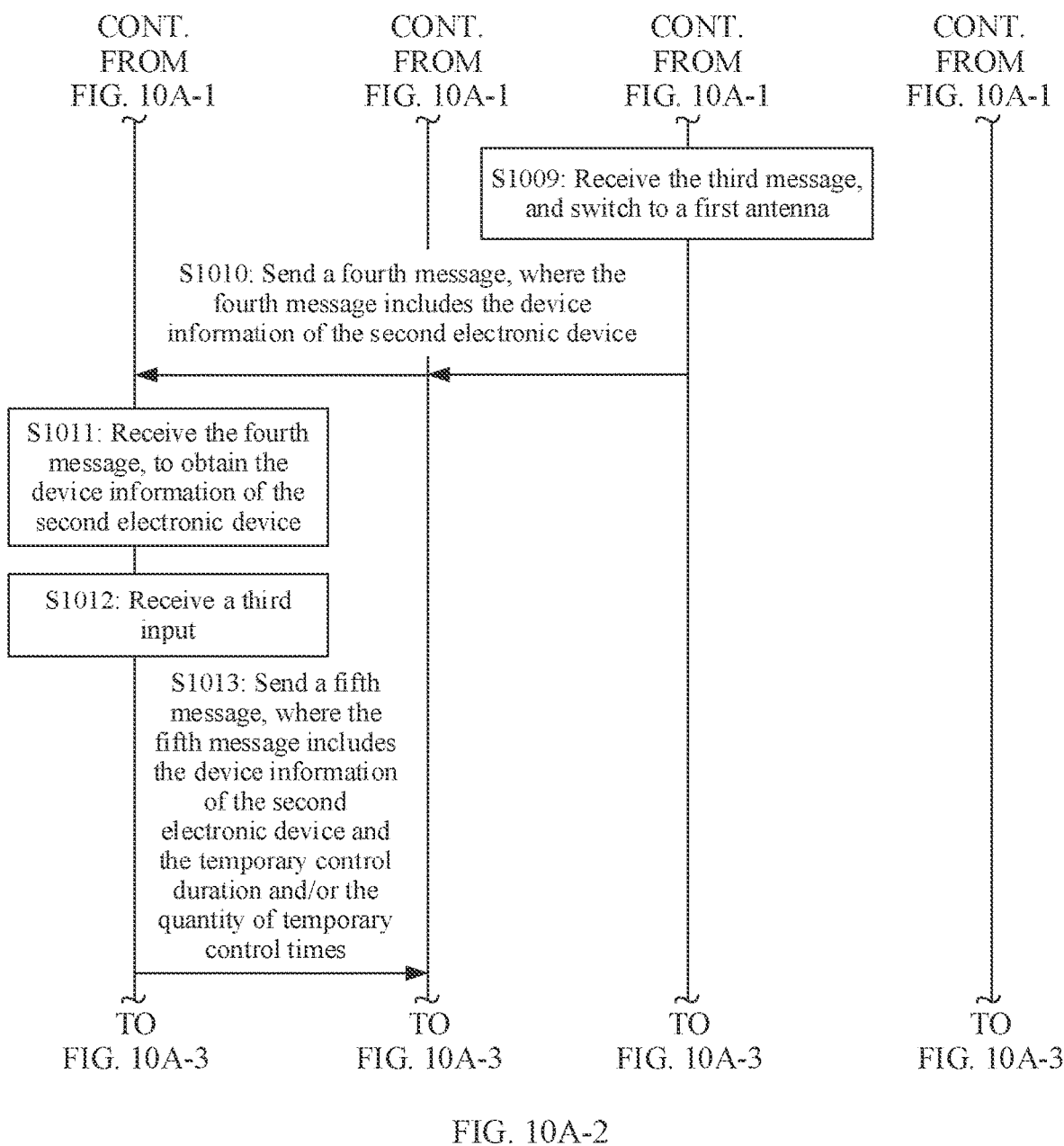
Figures 3, 10A:
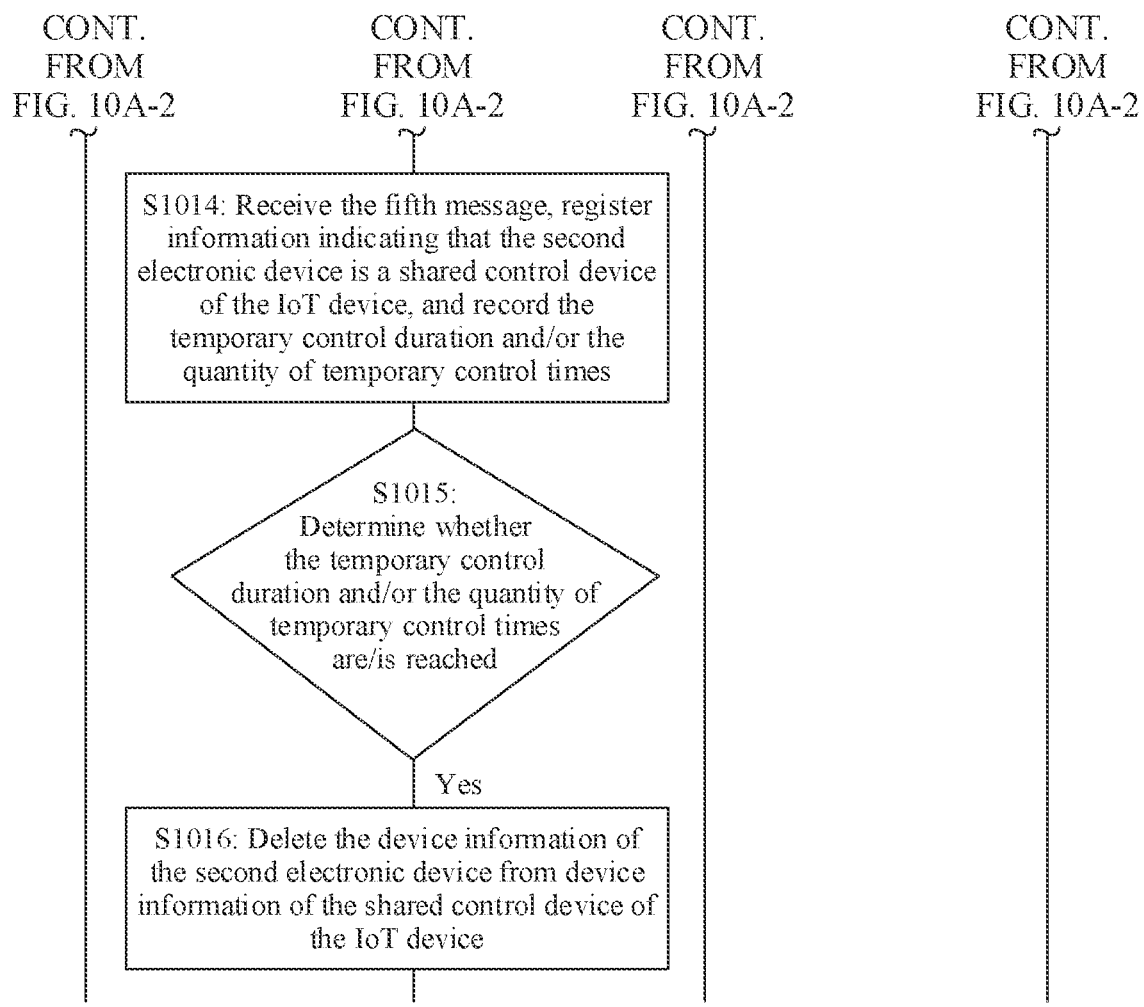

In some embodiments of this application, the first electronic device may alternatively specify temporary control duration and/or a quantity of temporary control times for the second electronic device to control the IoT device. In other words, the first electronic device controls time validity for the second electronic device to control the IoT device. FIG. 10A-1 to FIG. 10A-3 are a flowchart of an IoT device authorization method according to an embodiment of this application. As shown in FIG. 10A-1 to FIG. 10A-3, the method includes the following steps.

S1001: A first electronic device receives a first input.

Optionally, the first input may be an external input such as a user input, or may be an internal input such as an instruction or a command. In an implementation, the user input is used to trigger the first electronic device to send a first message including temporary control duration and/or a quantity of temporary control times, and the first message is used to indicate to temporarily add a second electronic device as a shared control device of an IoT device.

Figures 11A, 11B:
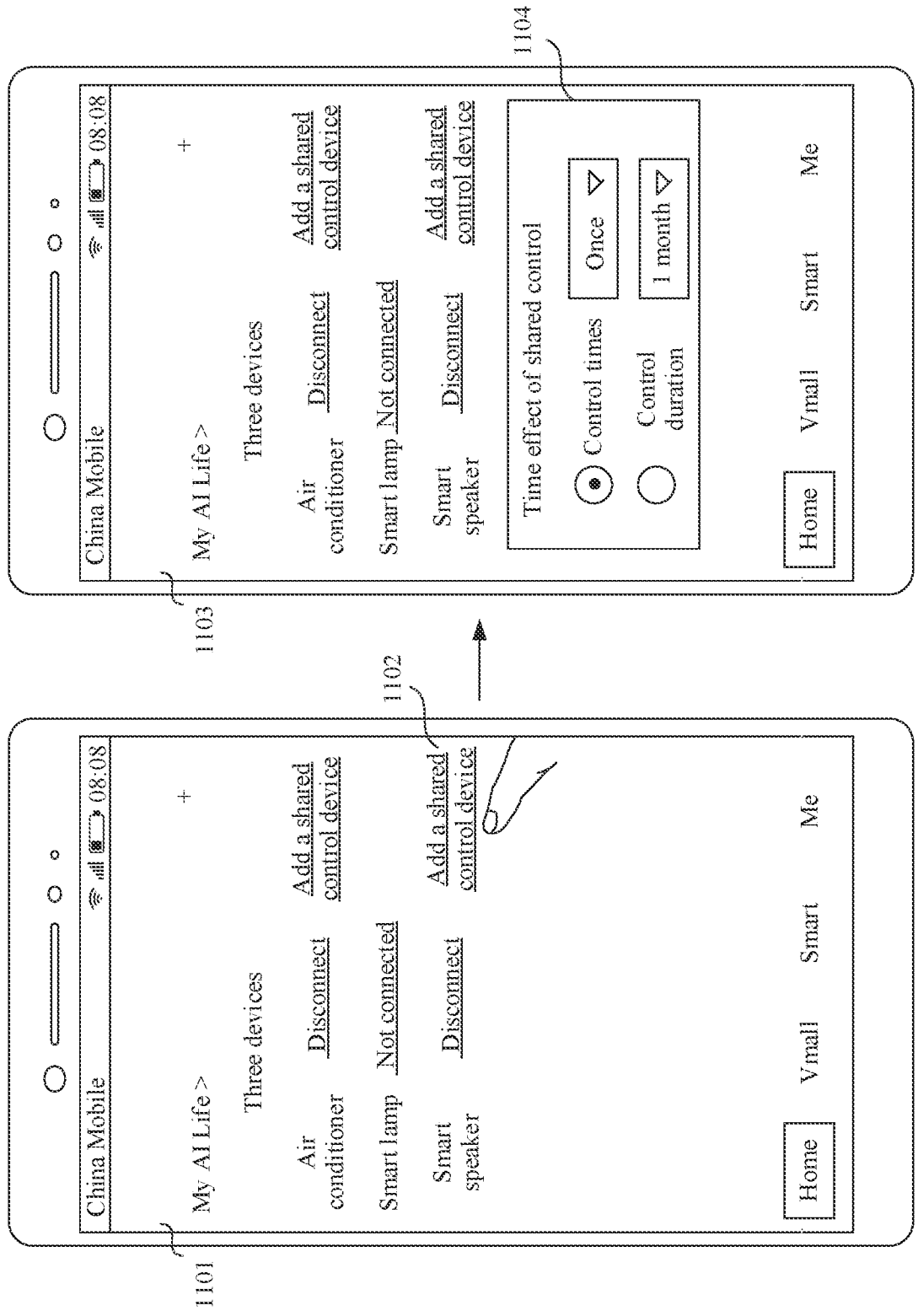
FIG. 11A and FIG. 11B are schematic diagrams of user interfaces of an electronic device according to an embodiment of this application.

For example, FIG. 11A shows an interface 1101 of adding a shared control device displayed on a mobile phone 1. In response to detecting that an "Add a shared control device" control 1102 is touched, the mobile phone displays an interface 1103 shown in FIG. 11B. The interface 1103 includes a sharing control time validity control 1104 for setting sharing control. A user may select a total quantity of times for which the shared control device controls the IoT device, for example, once or five times. The user may select duration for which the shared control device controls the IoT device, for example, one month, one week, or one day.

S1002: The first electronic device sends, to the IoT device by using a server, the first message including the temporary control duration and/or the quantity of temporary control times, where the first message is used to temporarily add the shared control device.

S1003: After receiving the first message indicating to add the shared control device, the IoT device switches to a second antenna.

S1004: The IoT device randomly generates a session key.

S1005: The IoT device sends a second message through the second antenna, where the second message includes device information of the IoT device, the session key, and the temporary control duration and/or the quantity of temporary control times.

Optionally, the sending includes broadcasting.

S1006: The second electronic device receives the second message in a transmit distance of the second antenna.

S1007: The second electronic device receives a second user input, encrypts device information of the second electronic device by using the session key, and generates a third message.

S1008: The second electronic device sends the third message to the IoT device.

S1009: After receiving the third message, the IoT device switches to a first antenna.

S1010: The IoT device sends a fourth message to the first electronic device by using the server, where the fourth message includes the device information of the second electronic device.

S1011: After receiving the fourth message, the first electronic device obtains the device information of the second electronic device.

S1012: The first electronic device receives a third input.

Optionally, the third input may be an external input such as a user input, or may be an internal input such as an instruction or a command. In an implementation, the user input is used to trigger the first electronic device to send a fifth message, and the fifth message is used to indicate to temporarily add the second electronic device as the shared control device of the IoT device.

In an implementation, after receiving the fourth message forwarded by the server, the first electronic device generates and displays prompt information (for example, at least one of a voice prompt, a text prompt, a picture prompt, and the like), and queries whether a user of the first electronic device agrees or confirms that the second electronic device is added as the shared control device that has the temporary control duration and/or the quantity of temporary control times and that is of the IoT device. After receiving the third user input, the first electronic device performs S1013. The third user input may be a touch input of the user of the first electronic device for a specific control, or a specific voice input of the user of the first electronic device.

S1013: The first electronic device sends a fifth message to the server, where the fifth message includes the device information of the second electronic device and the temporary control duration and/or the quantity of temporary control times.

In an alternative example, the server already stores the temporary control duration and/or the quantity of temporary control times in S1002; and when S1013 is performed, the fifth message may alternatively not carry the temporary control duration and/or the quantity of temporary control times.

S1014: After receiving the fifth message, the server registers the second electronic device as the shared control device of the IoT device, and records the temporary control duration and/or the quantity of temporary control times.

S1015: The server determines whether the temporary control duration and/or the quantity of temporary control times are/is reached.

Optionally, on the premise of the temporary control duration and the quantity of temporary control times, whichever expiring first prevails. This is the same in the following, and details are not described again.

S1016: After the temporary control duration and/or the quantity of temporary control times are/is reached, the server deletes the device information of the second electronic device from account information of the shared control device of the IoT device.

Alternatively, after the temporary control duration and/or the quantity of temporary control times are/is reached, the server configures the second electronic device to not control the IoT device anymore, until the server receives a new fifth message.

In S1014 to S1016, after adding the second electronic device as the shared control device of the IoT device, the server records and monitors whether the temporary control duration and/or the quantity of temporary control times for the second electronic device expire/expires. For example, after adding the second electronic device as the shared control device that has the temporary control duration and/or the quantity of temporary control times and that is of the IoT device, the server starts to count duration or count a quantity of times for which the second electronic device controls the IoT device, to determine whether the temporary control duration and/or the quantity of temporary control times for the second electronic device expire/expires. After the temporary control duration and/or the quantity of temporary control times for the second electronic device expire/expires, the server deletes the device information of the second electronic device from the account information of the shared control device of the IoT device. Optionally, the server separately sends a cancellation notification to the first electronic device and the second electronic device.

After S1016, for related content, refer to the foregoing descriptions of corresponding content in FIG. 5A and FIG. 5B. Details are not described herein again.

Unless otherwise specified, related content in S1001 to S1014 is the same as related content in S401 to S414. Details are not described herein again.

In some embodiments, the IoT device may also monitor the temporary control duration and/or the quantity of temporary control times for the second electronic device. For example, the following separately describes specific procedures with reference to FIG. 10B-1 to FIG. 10B-3 and FIG. 10C-1 to FIG. 10C-3.

Figures 1, 10B:
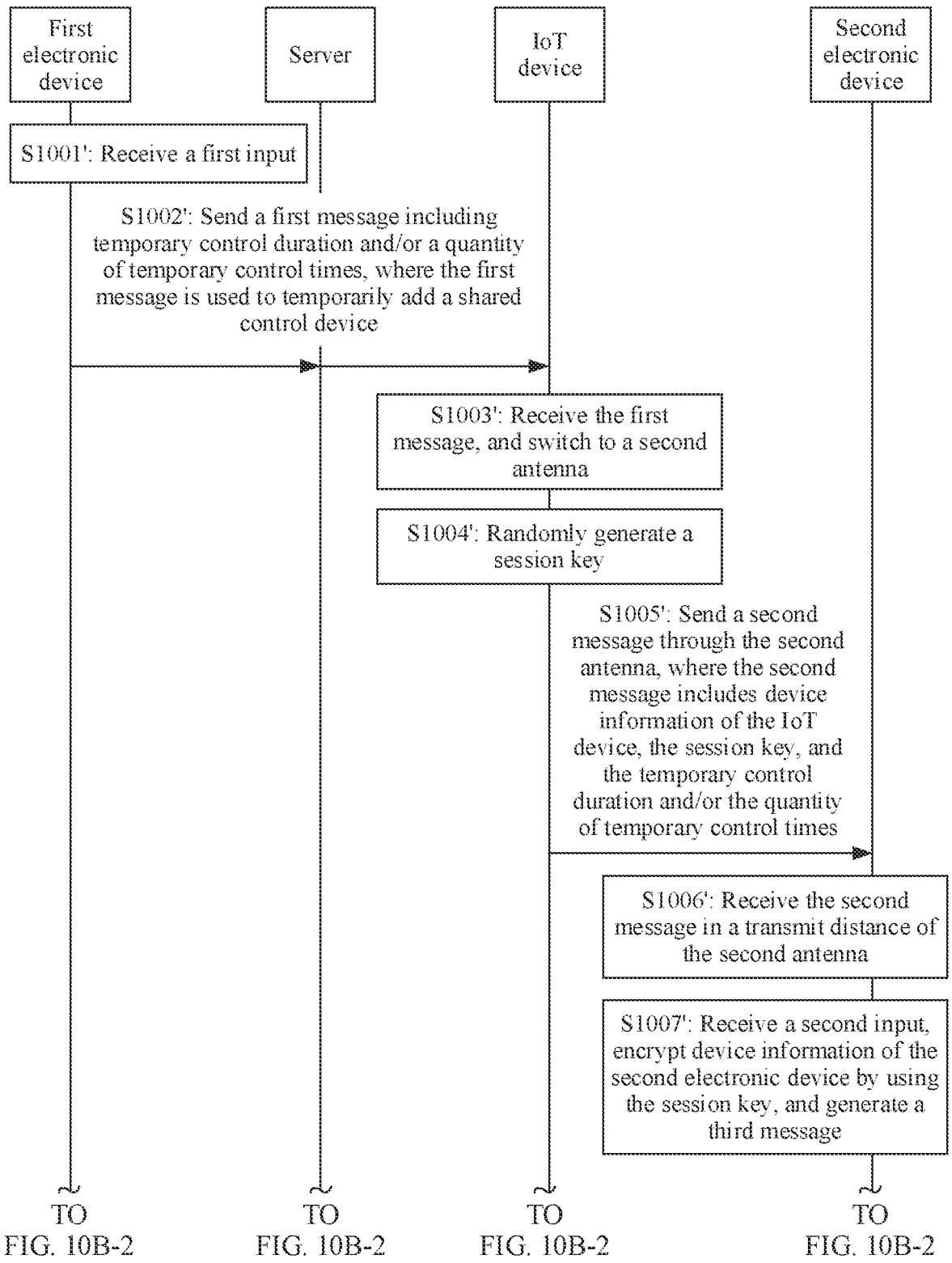
Figures 2, 10B:
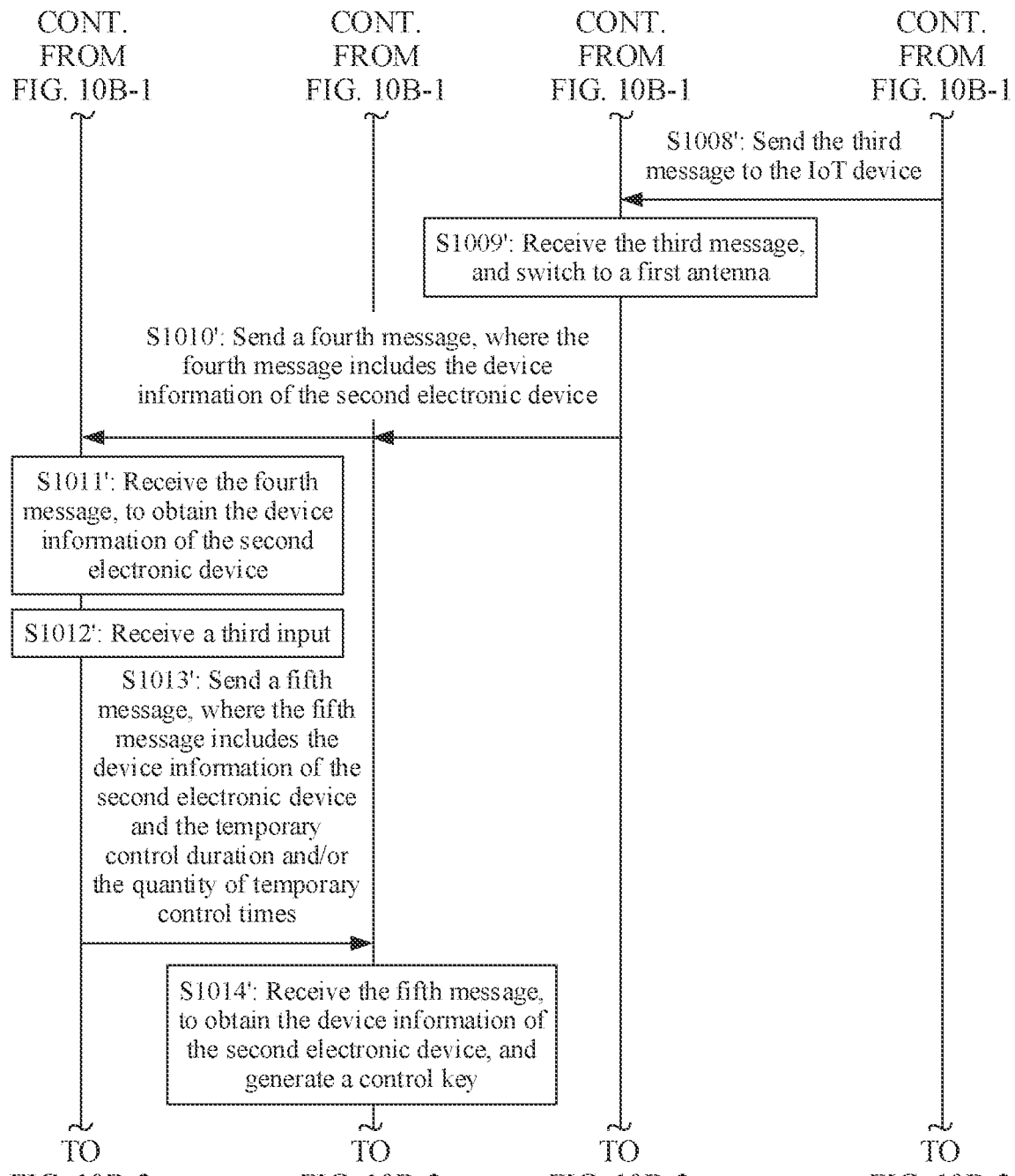
Figures 3, 10B:
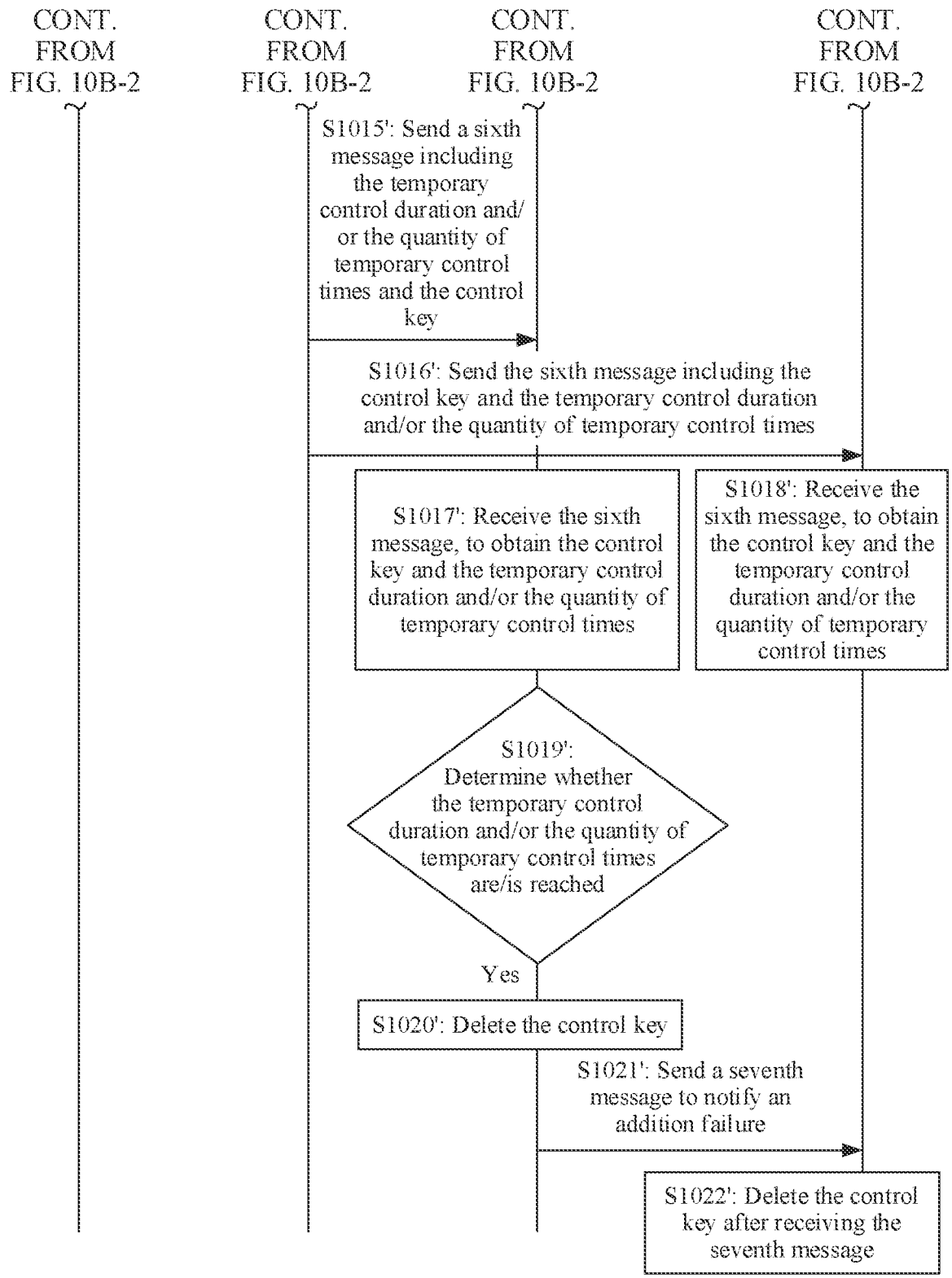

As shown in FIG. 10B-1 to FIG. 10B-3, an IoT device authorization method includes S1001' to S1022'. Related content of S1001' to S1013' is the same as related content of S1001 to S1013. Details are not described herein again.

S1014': The server receives the fifth message, to obtain the device information of the second electronic device, and generates a control key.

S1015': The server sends a sixth message including the temporary control duration and/or the quantity of temporary control times and the control key.

S1016': The server sends the sixth message including the temporary control duration and/or the quantity of temporary control times and the control key to the second electronic device.

It should be noted that an execution sequence of S1015' and S1016' is not limited in this embodiment of this application.

S1017': The IoT device receives the sixth message, to obtain the control key and the temporary control duration and/or the quantity of temporary control times.

S1018': The second electronic device receives the sixth message, to obtain the control key and the temporary control duration and/or the quantity of temporary control times.

It should be noted that an execution sequence of S1017' and S1018' is not limited in this embodiment of this application.

S1019': The IoT device determines whether the temporary control duration and/or the quantity of temporary control times are/is reached.

S1020': If it is determined that the temporary control duration and/or the quantity of temporary control times are/is reached, the IoT device deletes the control key.

S1021': The IoT device sends a seventh message to the second electronic device, to notify an addition failure.

S1022': The second electronic device deletes the control key after receiving the seventh message.

Figures 1, 10C:
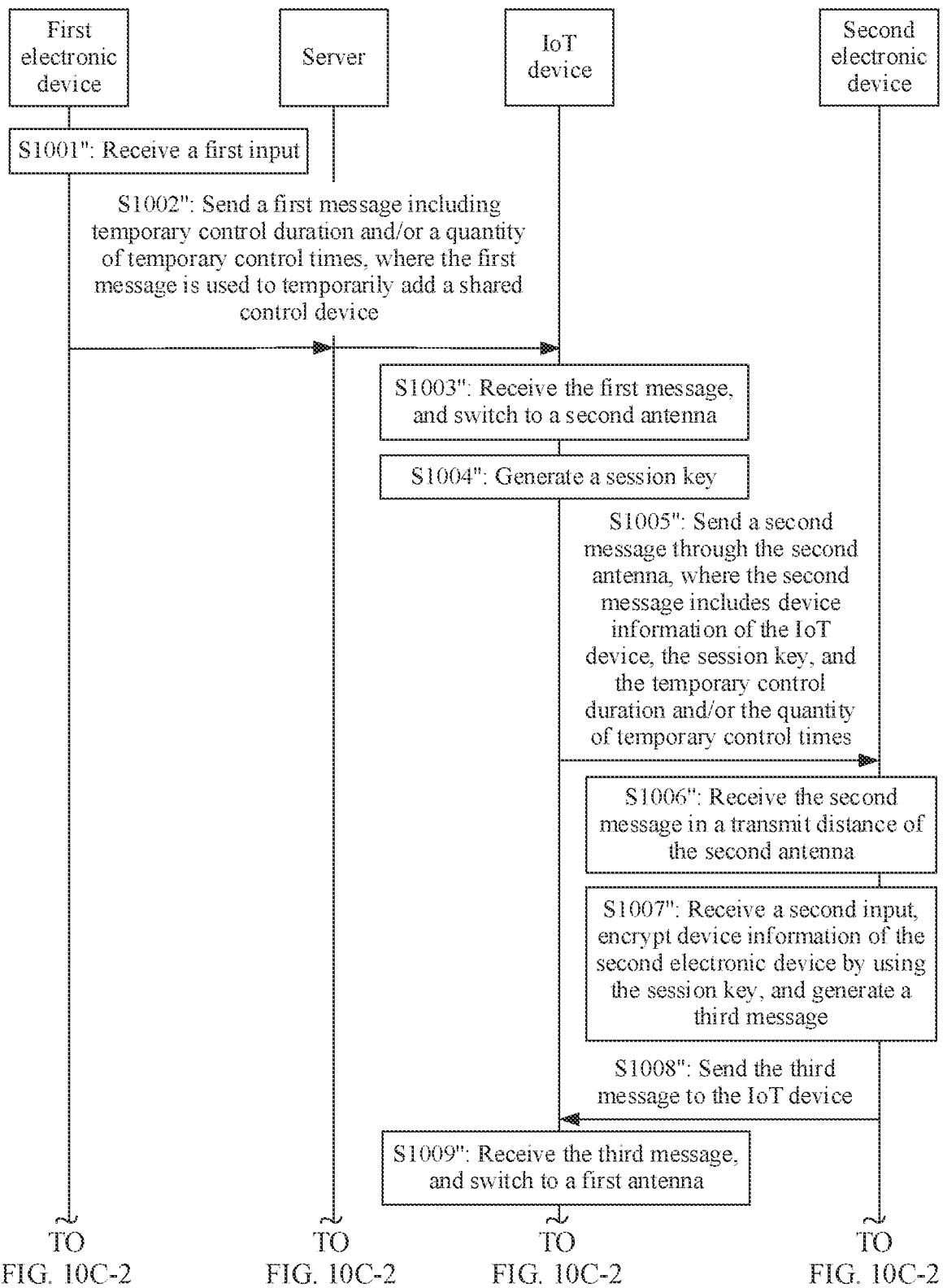
Figures 2, 10C:
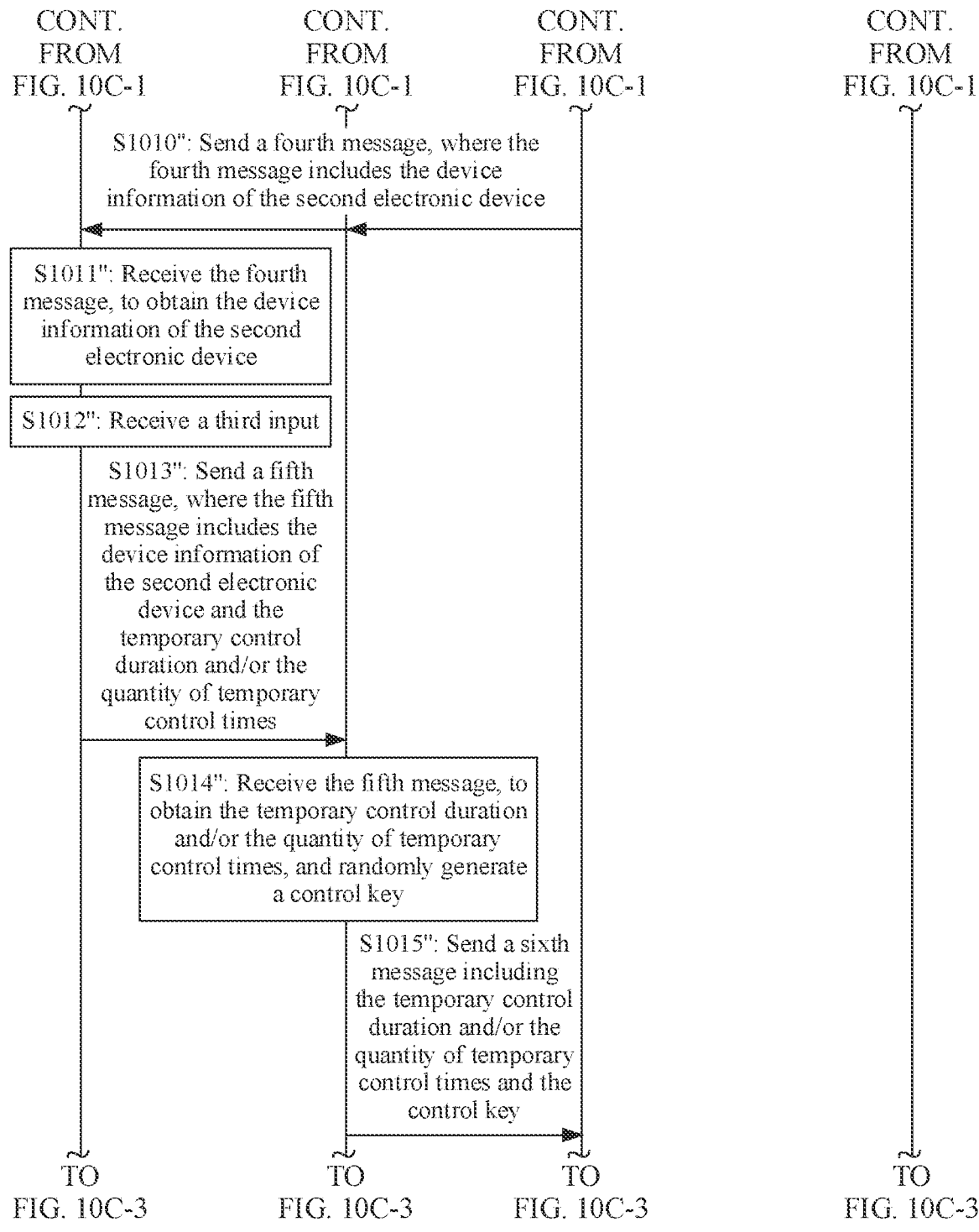

As shown in FIG. 10C-1 to FIG. 10C-3, an IoT device authorization method includes S1001" to S1024". Related content of S1001" to S1013" is the same as related content of S1001 to S1013, and related content of S1014" to S1020" is the same as related content of S1014' to S1020'. Details are not described herein again.

S1021": The second electronic device sends, to the IoT device, a control message encrypted by using the control key.

S1022": The IoT device receives the control message.

S1023": The IoT device sends, to the second electronic device, a response message indicating that the control key expires.

In an alternative implementation, the IoT device sends, to the second electronic device, the response message indicating that the control key expires, or a decryption failure response message, or a response message indicating to refuse execution of a control instruction, or a response message indicating that the second electronic device fails to control an identity.

S1024": The second electronic device receives the response message, and deletes the control key.

Figures 1, 12A:
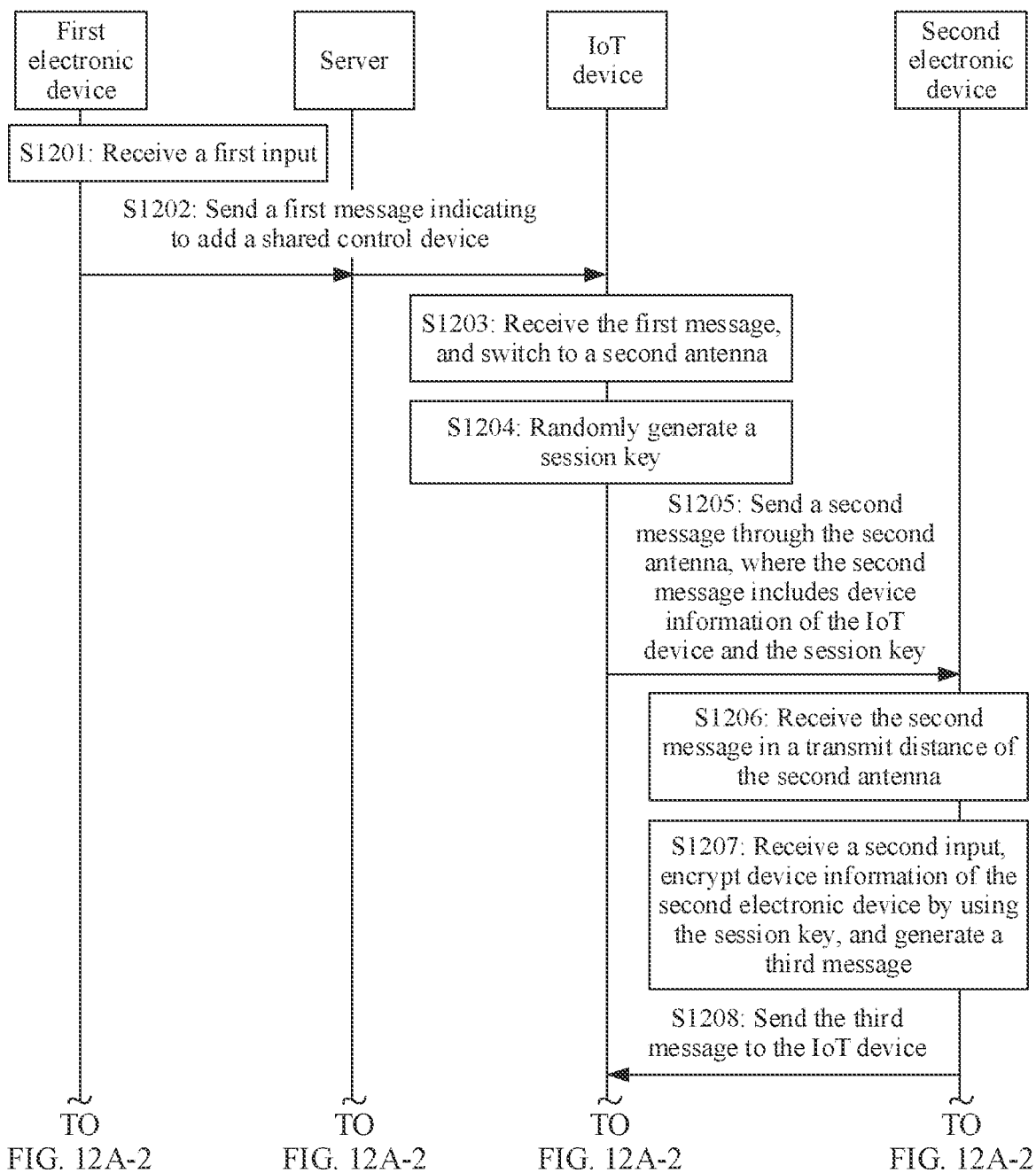
Figures 2, 12A:
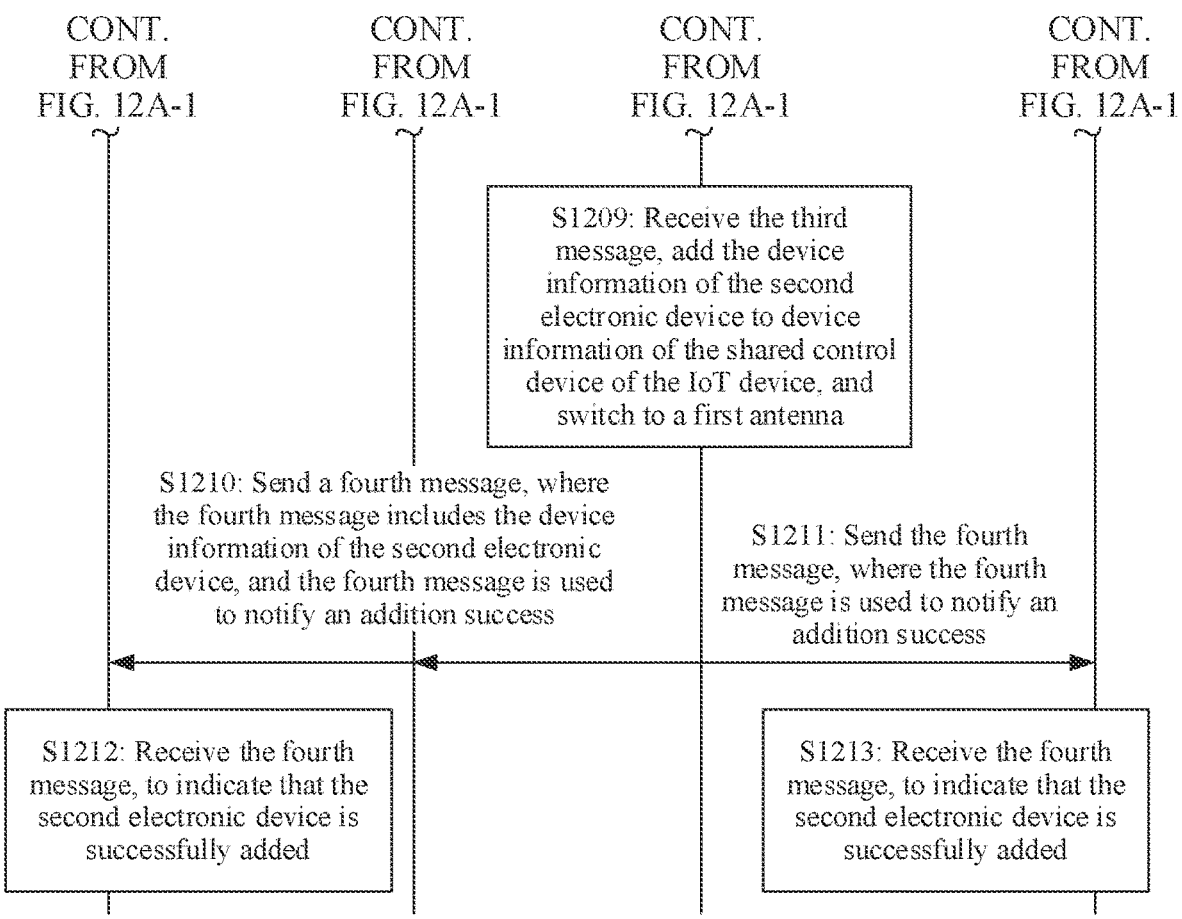
Figures 1, 12B:
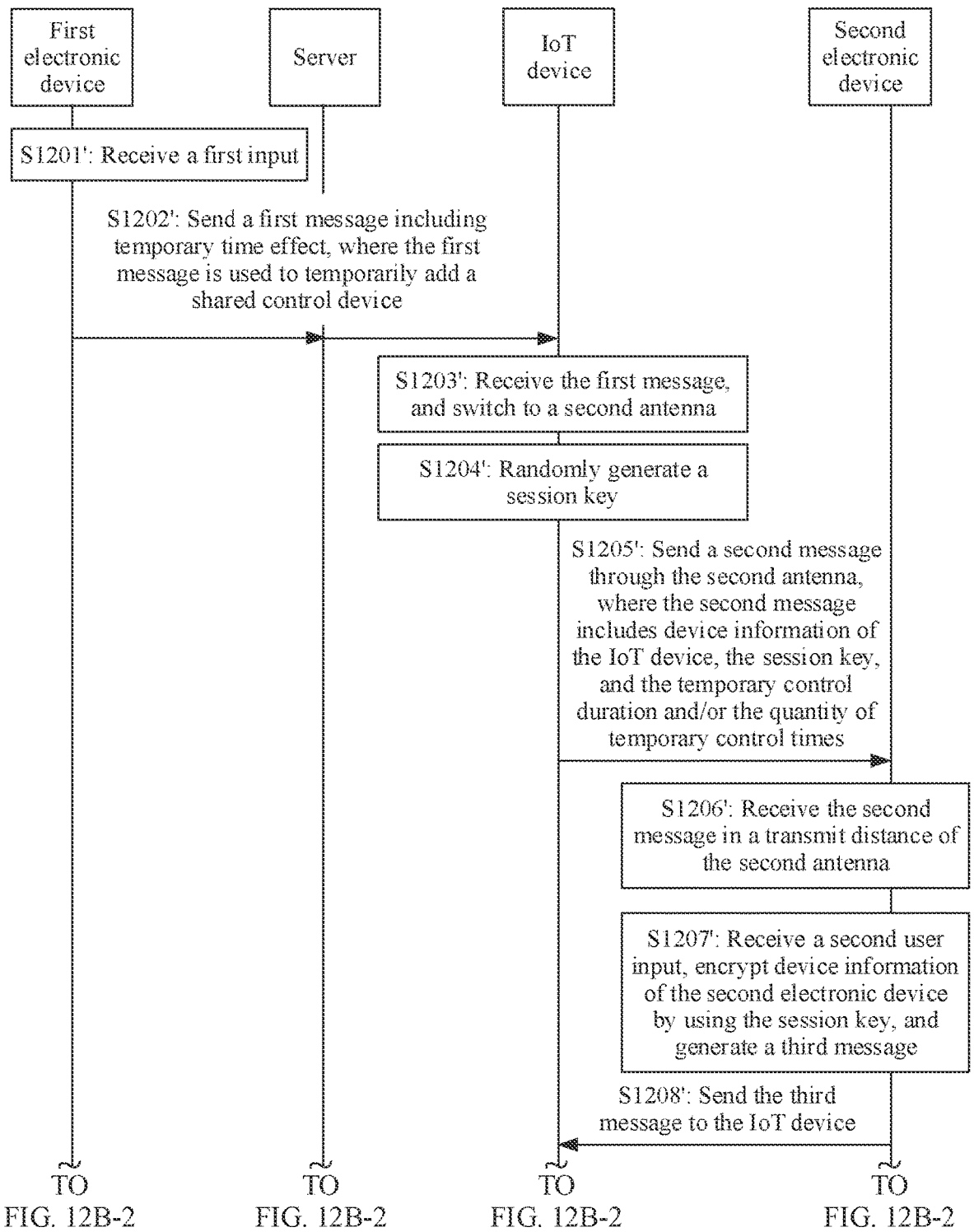
Figures 2, 12B:
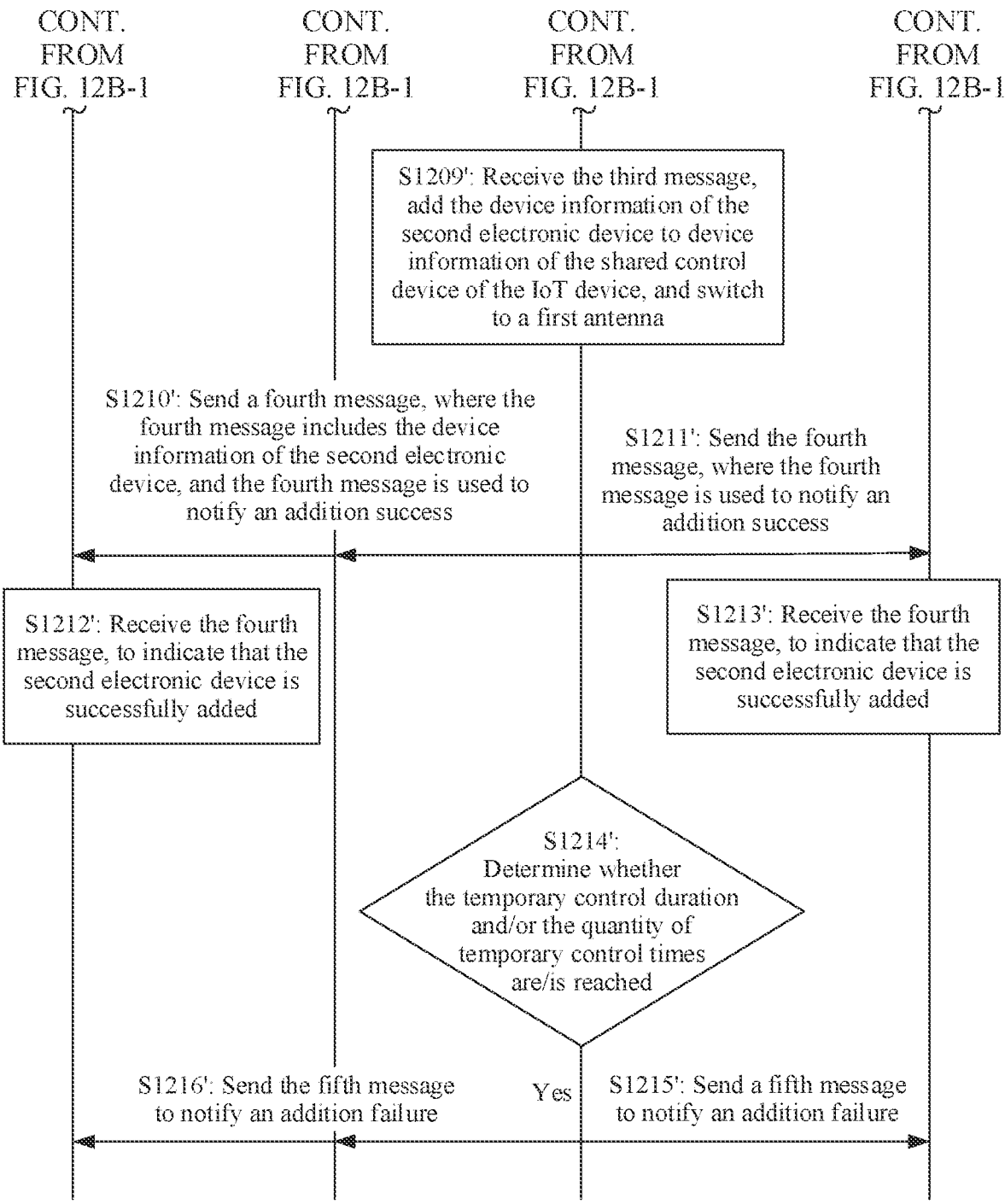

In addition, a simplified IoT device authorization method may be further provided. The following separately describes specific procedures with reference to FIG. 12A-1, FIG. 12A-2, FIG. 12B-1, and FIG. 12B-2. As shown in FIG. 12A-1 and FIG. 12A-2, an IoT device authorization method includes the following steps.

S1201: A first electronic device receives a first input.

Optionally, the first input may be an external input such as a user input, or may be an internal input such as an instruction or a command. In an implementation, the user input is used to trigger the first electronic device to send a first message, and the first message is used to indicate to add a second electronic device as a shared control device of an IoT device.

S1202: The first electronic device sends, to the IoT device by using the server, a first message indicating to add the shared control device.

In an implementation, the first message is sent by the first electronic device to the server.

After receiving the first message, the server sends the first message to the IoT device.

S1203: After receiving the first message indicating to add the shared control device, the IoT device switches to a second antenna.

S1204: The IoT device randomly generates a session key.

S1205: The IoT device sends, through the second antenna, a second message including device information of the IoT device and the session key.

Optionally, the sending includes broadcasting:

S1206: The second electronic device receives the second message in a transmit distance of the second antenna.

S1207: The second electronic device receives a second input, encrypts device information of the second electronic device by using the session key, and generates a third message.

S1208: The second electronic device sends the third message to the IoT device.

For specific content of S1201 to S1208, refer to the descriptions of related content in S401 to S408. Details are not described herein again.

S1209: After receiving the third message, the IoT device adds the device information of the second electronic device to account information of the shared control device of the IoT device, and switches to a first antenna.

In other words, the IoT device locally maintains account information of a control device of the IoT device and the account information of the shared control device of the IoT device.

S1210: The IoT device sends a fourth message to the first electronic device by using the server, where the fourth message includes the device information of the second electronic device, and the fourth message is used to notify an addition success of the second electronic device.

S1211: The IoT device sends the fourth message to the second electronic device, where the fourth message is used to notify an addition success of the second electronic device.

A sequence of S1210 and S1211 is not limited in this embodiment of this application.

S1212: The first electronic device receives the fourth message, to indicate that the second electronic device is successfully added.

S1213: The second electronic device receives the fourth message, to indicate that the second electronic device is successfully added.

An execution sequence of S1212 and S1213 is not limited in this embodiment of this application.

Unless otherwise specified, specific content of S1201 to S1208 is the same as specific content of S401 to S408. Details are not described herein again.

As shown in FIG. 2B-1 and FIG. 12B-2, an IoT device authorization method includes the following steps.

S1201': A first electronic device receives a first input.

Optionally, the first input may be an external input such as a user input, or may be an internal input such as an instruction or a command. In an implementation, the user input is used to trigger the first electronic device to send a first message including temporary control duration and/or a quantity of temporary control times, and the first message is used to indicate to temporarily add a second electronic device as a shared control device of an IoT device.

S1202': The first electronic device sends, to the IoT device by using a server, the first message including the temporary control duration and/or the quantity of temporary control times, where the first message is used to temporarily add the shared control device of the IoT device.

S1203': After receiving the first message, the IoT device switches to a second antenna.

S1204': The IoT device randomly generates a session key.

S1205': The IoT device sends, through the second antenna, a second message including device information of the IoT device, the session key, and the temporary control duration or the quantity of temporary control times.

Optionally, the sending includes broadcasting.

S1206': The second electronic device receives the second message in a transmit distance of the second antenna.

S1207': The second electronic device receives a second input, encrypts device information of the second electronic device by using the session key, and generates a third message.

S1208': The second electronic device sends the third message to the IoT device.

S1209': After receiving the third message, the IoT device adds the device information of the second electronic device to account information of the shared control device of the IoT device, and switches to a first antenna.

In other words, the IoT device locally maintains account information of a control device of the IoT device and the account information of the shared control device of the IoT device.

S1210': The IoT device sends a fourth message to the first electronic device by using the server, where the fourth message includes the device information of the second electronic device, and the fourth message is used to notify an addition success.

S1211': The IoT device sends the fourth message to the second electronic device', where the fourth message is used to notify an addition success.

S1212': The first electronic device receives the fourth message, to indicate that the second electronic device is successfully added.

Specifically, a message indicating that the second electronic device is successfully added may be displayed, and/or a voice indicating that the second electronic device is successfully added may be played.

S1213': The second electronic device receives the fourth message, to indicate that the second electronic device is successfully added.

Specifically, the message indicating that the second electronic device is successfully added may be displayed, and/or the voice indicating that the second electronic device is successfully added may be played.

S1214': The IoT device determines whether the temporary control duration and/or the quantity of temporary control times are/is reached.

S1215': If the temporary control duration and/or the quantity of temporary control times are is reached, the IoT device sends a fifth message to the second electronic device, to notify an addition failure.

S1216': If the temporary control duration and/or the quantity of temporary control times are/is reached, the IoT device sends the fifth message to the first electronic device by using the server, to notify an addition failure.

Unless otherwise specified, specific content of S1201' to S1208' is the same as specific content of S1201 to S1208, and specific content of S1209' to S1213' is the same as specific content of S1209 to S1213. Details are not described herein again.

In the foregoing embodiment, an example in which the first electronic device adds a shared control device for one IoT device is used for description. In still some embodiments of this application, the first electronic device may alternatively add a shared control device for a plurality of IoT devices. A difference between adding a shared control device for one IoT device and adding a shared control device for a plurality of IoT devices is described herein.

Figure 13:
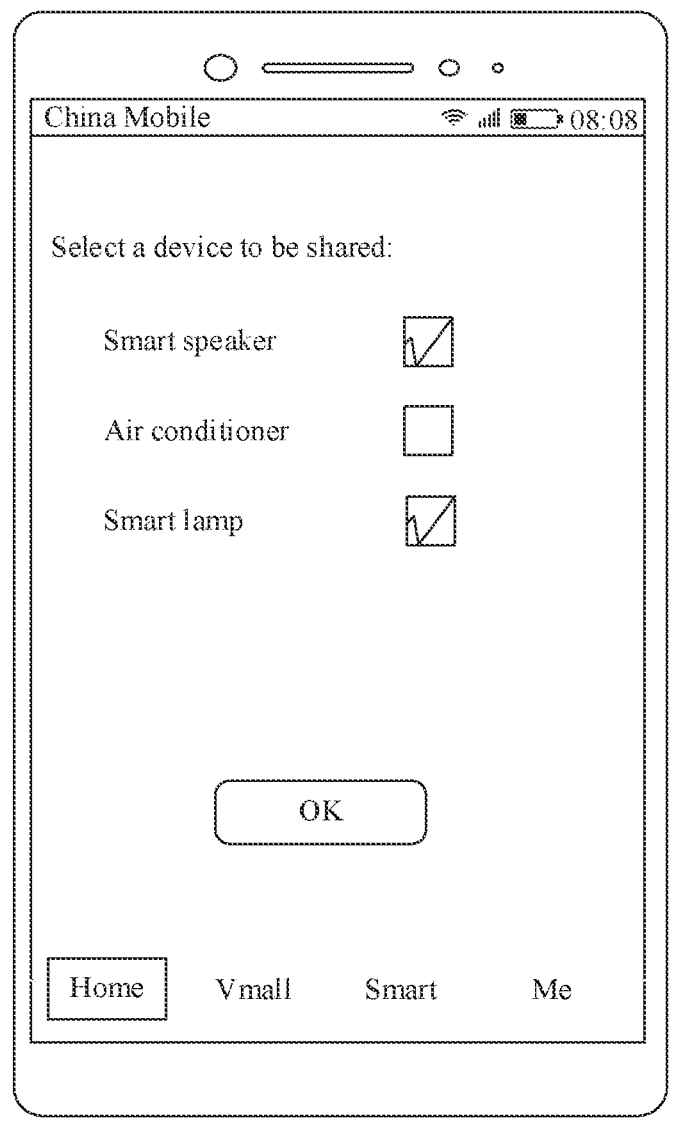
FIG. 13 is a schematic diagram of a user interface of an electronic device according to an embodiment of this application.

First, the first electronic device receives a user input indicating by the user to add a shared control device for a plurality of IoT devices. For example, as shown in FIG. 13, when adding a shared control device for an IoT device, the user may select R IoT devices (for example, a "Smart speaker" and a "Smart lamp"), where R is a positive integer greater than or equal to 1.

In some examples, the first electronic device may send, to the R IoT devices by using a server, a message or an instruction indicating to add the shared control device. Optionally, the server may alternatively select S IoT devices from the R IoT devices. S is a positive integer greater than or equal to 1 and less than or equal to R. The server sends, to the S IoT devices, the message or the instruction indicating to add the shared control device. In this case, the message or the instruction indicating to add the shared control device includes device information of the plurality of IoT devices. In this case, after receiving the message or the instruction indicating to add the shared control device, the R or S IoT devices switch to a second antenna, and send a request for adding the shared control device. Optionally, the sending includes broadcasting. In this case, the request includes information about the R IoT devices or the S IoT devices. After receiving a response sent by the second electronic device, any IoT device may obtain an identifier of the second electronic device from the response. The IoT device forwards the identifier of the second electronic device to the first electronic device by using the server. After receiving an input of determining to add the second electronic device as a shared control device, the first electronic device indicates the server to add the second electronic device as the shared control device of the R IoT devices (for example, the "Smart speaker" and the "Smart lamp") or the S IoT devices, so that the user can add the shared control device for the plurality of IoT devices by using one operation, that is, add the shared control device for the plurality of IoT devices in batches.

In still some embodiments of this application, the first electronic device may first add the second electronic device as a shared control device of any one of the R IoT devices. Then, the server automatically adds the second electronic device as the shared control device of the first electronic device. Then, the first electronic device may specify the second electronic device as a shared control device of another IoT device, that is, specify the second electronic device as a shared control device of other R−1 IoT devices.

It should be noted that if the IoT device uses a solution based on an entrusted server, the R IoT devices further need to exchange identity credentials with the second electronic device. For example, after the second electronic device sends the identity credential of the second electronic device to an IoT device that sends a very-short-distance wireless signal, the IoT device may forward the identity credential of the second electronic device to the first electronic device or another transit device (for example, a router jointly connected to the R IoT devices). Then, the first electronic device or the transit device may forward the identity credential of the second electronic device to the remaining R−1 IoT devices. Because the first electronic device stores the identity credentials of the R IoT devices, the first electronic device may send the identity credentials of the R−1 IoT devices to the second electronic device by using the server or the transit device. A method for exchanging identity credentials between the IoT device and the second electronic device is not limited in this embodiment of this application.

In still some embodiments of this application, the first electronic device may alternatively add a plurality of shared control devices for one IoT device. In this case, when the IoT device switches to the first antenna, if device information of at least two second electronic devices is received within a preset time period, all or a part of the device information of the at least two second electronic devices may be returned to the first electronic device by using the server. After the first electronic device performs confirmation, the server may add at least two shared control devices for one IoT device at the same time.

The following provides examples of some specific application scenarios.

For example, a mobile phone of a user A is bound to a smart television (an example of an IoT device) at home. In other words, the mobile phone of the user A is a control device of the smart television. When the user A is not at home, a user B comes to the user A's home, and the user B wants to control the smart television. In this case, the user A may remotely grant a mobile phone of the user B permission to control the smart television. Specifically, the user A adds the mobile phone of the user B as a shared control device of the smart television by using the mobile phone. For a specific procedure, refer to the related procedure in the foregoing embodiment. Details are not described herein again. Optionally, the mobile phone of the user A may also grant the mobile phone of the user B permission to temporarily control the smart television, that is, set temporary control duration and/or a quantity of temporary control times. For example, the mobile phone of the user A authorizes the mobile phone of the user B to control the smart television for two hours.

For another example, the mobile phone of user A is bound to a smart lock at home. In other words, the mobile phone of the user A is a control device of the smart lock. When the user A is not at home, and a user C needs to unlock the smart lock, the user A may remotely grant a mobile phone of the user C permission to control the smart lock, for example, grant the mobile phone of the user C permission to control the smart lock for only one or more times; or grant the mobile phone of the user C permission to control the smart lock for only two hours.

It can be learned that the control device (for example, the mobile phone of the user A) may remotely add a shared control device for the IoT device (for example, the smart television or the smart lock), and security of communication between the IoT device and the shared control device (for example, the mobile phone of the user B or the mobile phone of the user C) is ensured by using a secure distance. It may be further noted that, in an authorization process, both a user operation on a control device side and a user operation on a shared control device side are simple.

Unless otherwise specified, all steps or features in embodiments of this application may be freely combined with steps or features in other embodiments.

Figure 14:
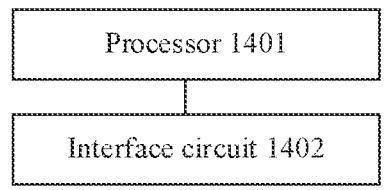
FIG. 14 is a schematic diagram of a structure of a chip system according to an embodiment of this application.

An embodiment of this application further provides a chip system. As shown in FIG. 14, the chip system includes at least one processor 1401 and at least one interface circuit 1402. The processor 1401 and the interface circuit 1402 may be connected to each other through a line. For example, the interface circuit 1402 may be configured to receive a signal from another apparatus (for example, a memory of an IoT device 300). For another example, the interface circuit 1402 may be configured to send a signal to another apparatus (for example, the processor 1401). For example, the interface circuit 1402 may read instructions stored in the memory, and send the instructions to the processor 1401. When the instructions are executed by the processor 1401, the chip system is enabled to perform the steps performed by the IoT device in the foregoing embodiments. Certainly, the chip system may further include another discrete device. This is not specifically limited in this embodiment of this application.

An embodiment of this application further provides an apparatus. The apparatus is included in an electronic device, and the apparatus has a function of implementing behavior of the electronic device in any method in the foregoing embodiments. The function may be implemented by hardware, or may be implemented by hardware executing corresponding software. The hardware or the software includes at least one module or unit corresponding to the foregoing function, for example, a detection module or unit, a display module or unit, a determining module or unit, and a calculation module or unit.

An embodiment of this application further provides a computer storage medium, including computer instructions. When the computer instructions are run on an electronic device, the electronic device is enabled to perform any method in the foregoing embodiments.

An embodiment of this application further provides a computer program product. When the computer program product runs on a computer, the computer is enabled to perform any method in the foregoing embodiments.

An embodiment of this application further provides a graphical user interface on an electronic device. The electronic device includes a display, a camera, a memory, and one or more processors. The one or more processors are configured to execute one or more computer programs stored in the memory; and the graphical user interface includes a graphical user interface displayed when the electronic device performs any method in the foregoing embodiments.

It may be understood that to implement the foregoing functions, the terminal or the like includes corresponding hardware structures and/or software modules for performing the functions. A person skilled in the art should be easily aware that, in combination with the examples described in embodiments disclosed in this specification, units, algorithms, and steps may be implemented by hardware or a combination of hardware and computer software in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of the present invention.

In embodiments of this application, the terminal or the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that in embodiments of the present invention, module division is an example, and is merely a logical function division. During actual implementation, another division manner may be used.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, such as a flash memory, a removable hard disk, a read-only memory, a random access memory a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An Internet of Things (IoT) device comprising:
a first antenna configured for a first transmit distance;
a second antenna configured for a second transmit distance that is less than or equal to a preset secure transmit distance, and wherein the second transmit distance is less than the first transmit distance; and
a processor coupled to the first antenna and the second antenna and configured to:
receive, from a first electronic device, a first message instructing to add a shared control device for the IoT device;
switch, in response to the first message, from using the first antenna to using the second antenna;
send, through the second antenna, a second message comprising first device information of the IoT device;
receive, from a second electronic device, in response to the second message, a third message comprising second device information of the second electronic device;
switch, in response to the third message, from using the second antenna to using the first antenna; and
send, to the first electronic device through the first antenna, a fourth message comprising the second device information,
wherein a first permission of the control device on the IoT device is higher than a second permission of the shared control device on the IoT device.

2. The IoT device of claim 1, wherein after sending the fourth message, the processor is further configured to receive an addition success message indicating that the second electronic device is added as the shared control device.

3. The IoT device of claim 1, wherein the processor is further configured to:
receive, after sending the fourth message, a fifth message comprising at least one of a key corresponding to the second electronic device or an identity credential of the second electronic device, wherein the key or the identity credential enables the second electronic device to control the IoT device; and
delete at least one of the key or the identity credential after a temporary control duration or a quantity of temporary control times is reached.

4. The IoT device of claim 1, wherein the processor is further configured to:
receive, after sending the fourth message, a fifth message comprising a randomly generated control key; and
obtain, in response to the fifth message, the randomly generated control key, wherein a key corresponding to the second electronic device comprises the randomly generated control key.

5. The IoT device of claim 4, wherein the processor is further configured to:
receive a sixth message comprising a first random number;
randomly generate, in response to the sixth message, a second random number;
generate, based on the first random number, the second random number, and the randomly generated control key, a communication key, wherein the key comprises the communication key;
send, to the second electronic device, a seventh message comprising the second random number;
receive, from the second electronic device, a control message;
decrypt, in response to the control message and based on the communication key, the control message to obtain a control instruction; and
execute the control instruction.

6. The IoT device of claim 2, wherein the processor is further obtaining configured to obtain at least one of a key corresponding to the second electronic device or an identity credential of the second electronic device after receiving the addition success message, and wherein the key or the identity credential enables the second electronic device to control the IoT device.

7. The IoT device of claim 6, wherein the processor is further configured to:
receive a cancellation message of the first electronic device, wherein the cancellation message instructs to cancel authorization for the second electronic device; and
delete, in response to the cancellation message, at least one of the key or the identity credential.

8. The IoT device of claim 6, wherein the processor further causes the IoT device to randomly generate a session key, wherein the second message comprises the session key, wherein the third message is a response message of the second electronic device to the second message, wherein the key comprises at least one of the session key, a randomly generated control key, or a communication key, and wherein the processor is further configured to:
receive the first message using one or more servers; and
send, to the first electronic device using the one or more servers through the first antenna, the fourth message.

9. An Internet of Things (IoT) device comprising:
an antenna configured for a transmitting distance, wherein the transmitting distance at a first transmit power is a first distance, wherein the first distance is greater than a preset safety distance, wherein the transmitting distance at a second transmit power is a second distance, wherein the second distance is less than or equal to the preset safety distance, and wherein the first transmit power is greater than the second transmit power; and a processor coupled to the antenna and configured to:
- receive, from a first electronic device, a first message instructing to add a shared control device for the IoT device, wherein the first electronic device is a control device of the IoT device, and wherein first permission of the control device is higher than second permission of the shared control device;
- send, using the antenna at the second transmit power and in response to the first message, a second message comprising first device information of the IoT device;
- receive, from a second electronic device, in response to the second message, a third message comprising second device information of the second electronic device; and
- send, to the first electronic device, using the antenna, and at the first transmit power in response to the third message, a fourth message comprising the second device information.

10. The IoT device of claim 9, wherein after sending the fourth message, the processor is further configured to receive an addition success message indicating that the second electronic device is added as the shared control device.

11. The IoT device of claim 9, wherein the processor is further configured to:
- receive, after sending the fourth message, a fifth message comprising at least one of a key corresponding to the second electronic device or an identity credential of the second electronic device, wherein the key and the identity credential enable the second electronic device to control the IoT device; and
- delete at least one of the key or the identity credential after a temporary control duration or a quantity of temporary control times is reached.

12. The IoT device of claim 10, wherein after receiving the addition success message, the processor is further configured to obtain at least one of a key corresponding to the second electronic device or an identity credential of the second electronic device, and wherein the key and the identity credential enable the second electronic device to control the IoT device.

13. The IoT device of claim 12, wherein the processor is further configured to:
- receive a cancellation message of the first electronic device, wherein the cancellation message instructs to cancel authorization for the second electronic device; and
- delete, in response to the cancellation message, at least one of the key or the identity credential.

14. A computer program product comprising computer-executable instructions that are stored on a non-transitory computer-readable storage medium and that, when executed by a processor, cause an Internet of Things (IoT) device to:
- receive from a first electronic device, a first message instructing to add a shared control device for the IoT device, wherein the first electronic device is a control device of the IoT device, and wherein first permission of the control device on the IoT device is higher than second permission of the shared control device on the IoT device;
- switch, in response to the first message, to a second antenna of the IoT device, wherein a second transmit distance of the second antenna is less than or equal to a preset secure transmit distance;
- send, through the second antenna, a second message comprising first device information of the IoT device;
- receive, from a second electronic device, in response to the second message, a third message comprising second device information of the second electronic device;
- switch, in response to the third message, to a first antenna of the IoT device, wherein the second transmit distance is less than a first transmit distance of the first antenna; and
- send, to the first electronic device through the first antenna, a fourth message comprising the second device information.

15. The computer program product of claim 14, wherein the computer-executable instructions further cause the IoT device to:
- receive, after sending the fourth message, a fifth message comprising at least one of a key corresponding to the second electronic device or an identity credential of the second electronic device, wherein the key and the identity credential enable the second electronic device to control the IoT device; and
- delete at least one of the key or the identity credential after a temporary control duration or a quantity of temporary control times is reached.

16. A computer program product comprising computer-executable instructions that are stored on a non-transitory computer-readable storage medium and that, when executed by a processor, cause an IoT device to:
- send, based on a first periodicity using an antenna of the IoT device at a first transmit power, a first message that is an encrypted ciphertext, wherein a transmitting distance of the antenna at the first transmit power is a first distance, wherein the first distance is greater than a preset safety distance, wherein the transmitting distance at a second transmit power is a second distance, wherein the second distance is less than or equal to the preset safety distance, and wherein the first transmit power is greater than the second transmit power;
- receive a first response message of a mobile device;
- send, in response to the first response message, based on a second periodicity, and using the antenna at the second transmit power, a second message that is an unencrypted plaintext;
- receive a second response message of the mobile device; and
- control, in response to the second response message, a door or a lock to execute a specific function.

17. The computer program product of claim 16, wherein after sending the first message, the computer-executable instructions further cause the IoT device to receive an addition success message indicating that an electronic device is added as a shared control device of the IoT device.

18. The computer program product of claim 16, wherein the computer-executable instructions further cause the IoT device to:
- receive, after sending the first message, a third message comprising at least one of a key corresponding to an electronic device or an identity credential of the electronic device, wherein the key and the identity credential enable the electronic device to control the IoT device; and delete at least one of the key or the identity credential after a temporary control duration or a quantity of temporary control times is reached.

19. The computer program product of claim 17, wherein after receiving the addition success message, the computer-executable instructions further cause the IoT device to obtain at least one of a key corresponding to the electronic device and an identity credential of the electronic device, and wherein the key and the identity credential enable the electronic device to control the IoT device.

20. The computer program product of claim 19, wherein the computer-executable instructions further cause the IoT device to:
- receive a cancellation message of the mobile device, wherein the cancellation message instructs to cancel authorization for the electronic device; and
- delete, in response to the cancellation message, at least one of the key or the identity credential.

* * * * *